United States Patent
Hirayama

(10) Patent No.: US 9,352,798 B1
(45) Date of Patent: May 31, 2016

(54) VEHICLE

(71) Applicant: YAMAHA HATSUDOKI KABUSHIKI KAISHA, Iwata-shi, Shizuoka (JP)

(72) Inventor: Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,375

(22) PCT Filed: Jun. 30, 2014

(86) PCT No.: PCT/JP2014/067478
§ 371 (c)(1),
(2) Date: Dec. 28, 2015

(87) PCT Pub. No.: WO2015/002165
PCT Pub. Date: Jan. 8, 2015

(30) Foreign Application Priority Data

Jul. 1, 2013 (JP) .................................. 2013-138481

(51) Int. Cl.
*B60G 21/00* (2006.01)
*B62K 5/10* (2013.01)
*B62K 21/18* (2006.01)
(Continued)

(52) U.S. Cl.
CPC . *B62K 5/10* (2013.01); *B62J 15/00* (2013.01); *B62K 5/027* (2013.01); *B62K 5/05* (2013.01); *B62K 5/08* (2013.01); *B62K 21/18* (2013.01); *B62K 25/04* (2013.01); *B62L 5/006* (2013.01); *B62K 2005/001* (2013.01)

(58) Field of Classification Search
CPC ............ B62K 5/00; B62K 5/027; B62K 5/05; B62K 5/08; B62K 5/10; B62K 25/08
USPC ............... 280/5.509, 93.502, 93.508, 93.511, 280/124.103
See application file for complete search history.

(56) References Cited

U.S. PATENT DOCUMENTS 7,073,806 B2 * 7/2006 Bagnoli ................... B62K 5/05
　　　　　　　　　　　　　　　　　　　　　　　　　180/210
D547,242 S　　7/2007 Lambri
(Continued)

FOREIGN PATENT DOCUMENTS

EP　　2 368 729 A1　　9/2011
JP　　2011-42225 A　　3/2011
(Continued)

OTHER PUBLICATIONS

Official Communication issued in International Application PCT/JP2014/067478, mailed on Sep. 22, 2014.
(Continued)

*Primary Examiner* — Toan To
(74) *Attorney, Agent, or Firm* — Keating and Bennett, LLP

(57) ABSTRACT

A body cover includes an outer surface covering portion that covers at least a portion of an outer peripheral surface of a link mechanism excluding an upper surface and a lower surface thereof. When the vehicle is in the upright state, at least portions of a leaning associated deforming portion of a brake controlling operation transmission member that deform in association with the leaning of a body frame are positioned between the outer peripheral surface of the link mechanism, excluding the upper surface and the lower surface thereof, and the outer surface covering portion.

12 Claims, 36 Drawing Sheets

(51) Int. Cl.
*B62K 5/08* (2006.01)
*B62K 5/027* (2013.01)
*B62K 5/05* (2013.01)
*B62J 15/00* (2006.01)
*B62L 5/00* (2006.01)
*B62K 25/04* (2006.01)
*B62K 5/00* (2013.01)

(56) References Cited

U.S. PATENT DOCUMENTS

| | | | |
|---|---|---|---|
| D598,328 S * | 8/2009 | Lambri | D12/110 |
| 9,216,790 B2 * | 12/2015 | Takano | B60G 17/005 |
| 9,238,494 B2 * | 1/2016 | Iizuka | B62K 5/027 |
| 9,278,711 B2 * | 3/2016 | Takano | B62K 5/05 |
| 9,296,420 B2 * | 3/2016 | Sasaki | B62D 9/02 |
| 2010/0044977 A1 * | 2/2010 | Hughes | B60G 1/007 280/5.509 |
| 2014/0375015 A1 * | 12/2014 | Yu | B62K 5/027 280/267 |

FOREIGN PATENT DOCUMENTS

| | | |
|---|---|---|
| JP | 2011-195099 A | 10/2011 |
| JP | 2012-56503 A | 3/2012 |
| JP | 2012-96703 A | 5/2012 |
| JP | 2012-101702 A | 5/2012 |

OTHER PUBLICATIONS

Iizuka et al.; "Vehicle"; U.S. Appl. No. 14/653,369, filed Jun. 18, 2015.

Iizuka et al.; "Vehicle"; U.S. Appl. No. 14/653,383, filed Jun. 18, 2015.

Piaggio, "Catalogo Parti Di Ricambio", NTRC000U01, MP3 300 ie LT Mod. ZAPM64102, 116 pages.

* cited by examiner

VEHICLE

BACKGROUND OF THE INVENTION

1. Field of the Invention

The present invention relates to a vehicle including a body frame that leans and two front wheels.

2. Description of the Related Art

As a vehicle including a body frame that leans and two front wheels, for example, U.S. Design Pat. No. 547,242 and Catalogo parti di ricambio, MP3 300 ie LT Mod. ZAPM64102, Piaggio disclose a vehicle which includes two front wheels and one rear wheel.

In general, the vehicle including the body frame that leans and the two front wheels is a vehicle that turns with the body frame leaning from a vertical direction. More specifically, the body frame leans to the right when the vehicle turns right, whereas when the vehicle turns left, the body frame leans to the left. In the vehicle including the body frame that leans and the two front wheels, a distance defined between the two wheels that are aligned in a left-and-right direction of the body frame is narrower than that of a general four-wheeled vehicle so as to ensure that the body frame leans as required. The vehicle including the two front wheels and the body frame that leans is a vehicle which is compact in size in relation to the left-and-right direction.

In the vehicle including the body frame that leans and the two front wheels, a brake master cylinder is provided on a handlebar, and brake calipers are provided at lower portions of the suspension devices. The master cylinder and the brake calipers are connected by a brake hose. The brake hose includes a leaning associated deforming portion which deforms in association with the leaning of the body frame and a wheel turning associated deforming portion which deforms in association with the turning of the two front wheels.

In the vehicles described in U.S. Design Pat. No. 547,242 and Catalogo parti di ricambio, MP3 300 ie LT Mod. ZAPM64102, Piaggio which include the body frame that leans and the two front wheels, both the leaning associated deforming portion and the wheel turning associated deforming portion are provided directly above a link mechanism. The interference of the brake hose with the link mechanism is avoided by collecting the deforming portions of the brake hose to a location lying directly above the link mechanism. This prevents interference of an upper cross portion and a lower cross portion which move largely up and down when they are activated with the brake hose.

In the vehicles described in U.S. Design Pat. No. 547,242 and Catalogo parti di ricambio, MP3 300 ie LT Mod. ZAPM64102, Piaggio which include the body frame that leans and the two front wheels, however, since the deforming portions of the brake hose are located directly above an upper surface of the link mechanism, a large space is necessary directly above the upper surface of the link mechanism so as to allow the brake hose to deflect. Then, it is necessary to secure a large space between the location lying directly above the upper surface of the link mechanism and an upper surface of a cover. This increases the space between the link mechanism and the cover, eventually increasing the size of the cover and, as a result, the size of a front portion of the vehicle.

SUMMARY OF THE INVENTION

Preferred embodiments of the present invention provide a vehicle including a body frame that leans and two front wheels which prevents an enlargement in the size of a front portion of the vehicle by devising the layout of a braking operation transmission member such as a brake hose.

According to a preferred embodiment of the present invention, a vehicle includes a body frame that leans to a right of the vehicle when the vehicle turns right and that leans to a left of the vehicle when the vehicle turns left; a right front wheel and a left front wheel that are aligned in a left-and-right direction of the body frame; a right suspension device that supports the right front wheel at a lower portion thereof and that absorbs an upward displacement of the right front wheel in an up-and-down direction of the body frame; a left suspension device that supports the left front wheel at a lower portion thereof and that absorbs an upward displacement of the left front wheel in the up-and-down direction of the body frame; a link mechanism which includes a right side portion that supports an upper portion of the right suspension device so as to turn about a right steering axis that extends in the up-and-down direction of the body frame, a left side portion that supports an upper portion of the left suspension device so as to turn about a left steering axis that is parallel to the right steering axis, an upper cross portion that supports an upper portion of the right side portion at a right end portion thereof so as to turn about an upper right axis that extends in a front-and-rear direction of the body frame and supports an upper portion of the left side portion at a left end portion thereof so as to turn about an upper left axis that is parallel to the upper right axis and that is supported on the body frame at a middle portion thereof so as to turn about an upper middle axis that is parallel to the upper right axis and the upper left axis, and a lower cross portion that supports a lower portion of the right side portion at a right end portion so as to turn about a lower right axis that is parallel to the upper right axis and supports a lower portion of the left side portion at a left end portion thereof so as to turn about a lower left axis that is parallel the upper left axis and that is supported on the body frame at a middle portion thereof so as to turn about a lower middle axis that is parallel to the upper middle axis; a body cover that is provided at least directly ahead of, directly behind, directly on a left of, or directly on a right of an outer peripheral surface of the link mechanism excluding an upper surface and a lower surface thereof; a brake device that is provided below the link mechanism to apply a braking force to at least one of the right front wheel and the left front wheel; a brake controller that is provided above the link mechanism to control the brake device; and a brake controlling operation transmission member that connects the brake controller with the brake device to transmit a brake controlling operation that is inputted into the brake controller to the brake device; wherein the body cover includes an outer surface covering portion that covers at least a portion of the outer peripheral surface of the link mechanism excluding the upper surface and the lower surface thereof; and when the vehicle is in an upright state, at least a portion of a leaning associated deforming portion of the brake controlling operation transmission member that deforms in association with the leaning of the body frame is positioned between the outer peripheral surface of the link mechanism, excluding the upper surface and the lower surface thereof, and the outer surface covering portion.

Incidentally, when the link mechanism is activated to operate, the upper cross portion, the lower cross portion, the right side portion, and the left side portion turn individually about axes that extend in the front-and-rear direction relative to the body frame and body portions that are fixed to the body frame. Because of this, a space is provided between the link mechanism and the body frame and the body portions so as to avoid the interference therebetween to secure the space that permits the operation of the link mechanism. When attempting to dispose an additional member in this space, a careful design is necessary so as to prevent the interference of the additional member with the other members, and hence, this space is a space where no additional member is desired to be disposed. Because of this, in general, the deforming portions of the brake controlling operation transmission member such as the brake hose are desired not to be disposed in those spaces.

In the vehicles of U.S. Design Pat. No. 547,242 and Catalogo parti di ricambio, MP3 300 ie LT Mod. ZAPM64102, Piaggio, the deforming portions of the brake hose are located directly above the upper cross portion. Because of this, the brake hose is laid out compactly.

In the vehicles of U.S. Design Pat. No. 547,242 and Catalogo parti di ricambio, MP3 300 ie LT Mod. ZAPM64102, Piaggio, however, although the brake hose itself is laid out compactly, the front portion of the vehicle is enlarged.

Then, the inventor studied in detail the movement of the brake controlling operation transmission member and the operation of the link mechanism with a view to finding out another method of avoiding the interference of the brake controlling operation transmission member such as the brake hose with the link mechanism.

The inventor studied in detail the movement of the brake controlling operation transmission member and the operation of the link mechanism with a view to finding out another method of preventing interference of the brake controlling operation transmission member such as the brake hose with the link mechanism.

The link mechanism includes the right side portion, the left side portion, the upper cross portion, and the lower cross portion.

The right side portion supports the upper portion of the right suspension device so as to turn about the right steering axis that extends in the up-and-down direction of the body frame.

The left side portion supports the upper portion of the left suspension device so as to turn about the left steering axis that is parallel to the right steering axis.

The upper cross portion supports the upper portion of the right side portion at the right end portion thereof so as to turn about the upper right axis that extends in the front-and-rear direction of the body frame and supports the upper portion of the left side portion at the left end portion thereof so as to turn about the upper left axis that is parallel to the upper right axis and is supported on the body frame at the middle portion thereof so as to turn about the upper middle axis that is parallel to the upper right axis and the upper left axis.

The lower cross portion supports the lower portion of the right side portion at the right end portion so as to turn about the lower right axis that is parallel to the upper right axis and supports the lower portion of the left side portion at the left end portion thereof so as to turn about the lower left axis that is parallel the upper left axis and that is supported on the body frame at the middle portion thereof so as to turn about the lower middle axis that is parallel to the upper middle axis.

Because of this, when the link mechanism is activated to operate, although the upper cross portion, the lower cross portion, the right side portion, and the left side portion are displaced largely in the up-and-down direction of the body frame, they are not displaced largely in the left-and-right direction of the body frame. Namely, the inventors discovered that the link mechanism does not move largely in the front-and-rear and left-and-right directions of the body frame when the link mechanism is activated to operate. Additionally, the inventors discovered that the constituent members of the link mechanism do not project significantly or at all to the front, rear, right, and left of the outer peripheral surface of the link mechanism excluding the upper surface and the lower surface thereof.

In addition, the leaning associated deforming portion is provided between portions of the brake controlling operation transmission member which are fixed to two points (for example, one point on the body frame and one point on the lower cross portion) which are relatively displaced in association with the operation of the link mechanism. The portion that deforms when the relative positions of the two points change largely in the up-and-down direction of the body frame defines the leaning associated deforming portion. Since the link mechanism turns about the axes that extend in the front-and-rear direction of the body frame, although the leaning associated deforming portion is changed in the up-and-down direction of the body frame, the leaning associated deforming portion has a small change in directions other than the up-and-down direction of the body frame. For example, the leaning associated deforming portion has a small change in the front-and-rear and left-and-right directions of the body frame by causing the brake controlling operation transmission member to deform along a plane that is perpendicular or substantially perpendicular to the front-and-rear direction or a plane that is perpendicular or substantially perpendicular to the left-and-right direction of the body frame.

The inventor discovered and developed, based on the knowledge obtained as explained above, a layout in which the brake controlling operation transmission member and the link mechanism are positively aligned near each other so as to prevent interference of the brake controlling operation transmission member with the link mechanism.

According to a preferred embodiment of the present invention, the body cover includes the outer surface covering portion that covers at least a portion of the outer peripheral surface of the link mechanism excluding the upper surface and the lower surface thereof. In addition, with the vehicle in the upright state, at least a portion of the leaning associated deforming portion of the brake controlling operation transmission member that deforms in association with the leaning of the body frame is positioned between the outer peripheral surface of the link mechanism excluding the upper surface and the lower surface thereof and the outer surface covering portion.

As described above, when the link mechanism is activated to operate, the link mechanism changes its posture largely in the up-and-down direction but does not change its posture largely in the left-and-right and front-and-rear directions of the body frame, and the leaning associated deforming portion also changes its posture largely in the up-and-down direction but does not change its posture largely in the left-and-right and front-and-rear directions of the body frame. Namely, when the link mechanism is activated to operate, since the link mechanism and the leaning associated deforming portion tend to change their postures in similar directions, even though the leaning associated deforming portion is disposed between the outer peripheral surface of the link mechanism excluding the upper surface and the lower surface thereof and the outer surface covering portion, it is easy to prevent the interference of the link mechanism with the leaning associated deforming portion. That the link mechanism and the leaning associated deforming portion tend to change their postures in similar directions means that the directions in which the link mechanism and the leaning associated deforming portion change their postures largely and the directions in which they change their postures minimally are similar and that the timings at which the link mechanism and the leaning associated deforming portion change their postures are similar. Additionally, since both the link mechanism and the leaning associated deforming portion change their postures largely in the up-and-down direction of the body frame, it is possible to provide the leaning associated deforming portion using the space that is provided to permit the operation of the link mechanism. In other words, even though the leaning associated deforming portion is provided, the expansion of the space that permits the operation of the link mechanism is prevented. Further, since the leaning associated deforming portion is provided between the front, rear, right, or left of the outer peripheral surface of the link mechanism, excluding the upper surface and the lower surface thereof, to which the constituent members of the link mechanism minimally project even when the link mechanism is activated to operate and the outer surface covering portion, even though the link mechanism and the leaning associated deforming portion are disposed near each other, they are prevented from interfering with each other so that the enlargement of the front portion of the vehicle is prevented.

This provides the vehicle including the body frame that leans and the two front wheels in which enlargement of the front portion thereof is prevented.

In vehicles according to various preferred embodiments of the present invention, the following configurations are preferably used.

The leaning associated deforming portion deforms at least along a plane that is perpendicular or substantially perpendicular to the front-and-rear direction of the body frame in response to the leaning of the body frame.

As described above, since the constituent members of the link mechanism turn about the axes that extend in the front-and-rear direction, although the constituent members of the link mechanism are displaced largely in the up-and-down direction of the body frame, the constituent members are not displaced largely in the front-and-rear direction. Then, in the event that the leaning associated deforming portion is caused to deform in the left-and-right direction along the plane that is perpendicular or substantially perpendicular to the front-and-rear direction of the body frame, the leaning associated deforming portion changes its posture minimally in the front-and-rear direction of the body frame. Since the link mechanism and the leaning associated deforming portion tend to change their postures in similar directions, the interference of the link mechanism with the leaning associated deforming portion is prevented more easily. Namely, although the leaning associated deforming portion is provided, the expansion of the space provided to permit the operation of the link mechanism is prevented.

In the vehicles according to various preferred embodiments of the present invention, the following configurations are preferably used.

The outer surface covering portion is provided directly ahead of or directly behind the outer peripheral surface of the link mechanism excluding the upper surface and the lower surface thereof.

As described above, when the body frame leans to activate the link mechanism to operate, the constituent members of the link mechanism turn about the axes that extend in the front-and-rear direction. Because of this, the link mechanism is not displaced largely in the front-and-rear direction even though the link mechanism operates. Then, in the event that the outer surface covering portion is provided directly ahead of or directly behind the outer peripheral surface of the link mechanism and at least a portion of the leaning associated deforming portion is positioned between the outer surface covering portion and the front surface or the rear surface of the link mechanism, the leaning associated deforming portion is provided in the location closer to the link mechanism while avoiding the interference of the link mechanism with the leaning associated deforming portion. Because of this, even though the leaning associated deforming portion is provided, an enlargement in the size of the vehicle is prevented.

In the vehicles according to preferred embodiments of the present invention, the following configurations are preferably used.

At least a portion of the leaning associated deforming portion is positioned between the right side portion and the left side portion when viewed from the direction of the upper middle axis.

The leaning associated deforming portion does not project significantly or at all farther rightwards than the right side portion and farther leftwards than the left side portion in relation to the left-and-right direction of the body frame, and hence, the vehicle is compact in relation to the left-and-right direction of the body frame.

In the vehicles according to various preferred embodiments of the present invention, the following configurations are preferably used.

The leaning associated deforming portion deforms at least along a plane that is perpendicular or substantially perpendicular to the left-and-right direction of the body frame in response to the leaning of the body frame.

As described above, when the body frame leans to activate the link mechanism to operate, the constituent members of the link mechanism turn about the axes that extend in the front-and-rear direction. Because of this, although the constituent members of the link mechanism are displaced largely in the up-and-down direction of the body frame when the link mechanism is activated to operate, the constituent members are not displaced largely in the left-and-right direction. Then, in the event that the leaning associated deforming portion is caused to deform along the plane that is perpendicular or substantially perpendicular to the left-and-right direction of the body frame, the leaning associated deforming portion changes its posture by a significantly reduced amount or minimally in the left-and-right direction, so that it becomes easy to further prevent the interference of the link mechanism with the leaning associated deforming portion. Namely, although the leaning associated deforming portion is provided, the expansion of the space provided to permit the operation of the link mechanism is prevented.

In the vehicle according to a preferred embodiment of the present invention, the following configurations are preferably used.

The outer surface covering portion is provided at least directly on the right or directly on the left of the outer peripheral surface of the link mechanism excluding the upper surface and the lower surface thereof.

As described above, when the body frame leans to activate the link mechanism to operate, the constituent members of the link mechanism turn about the axes that extend in the front-and-rear direction of the body frame. Because of this, the link mechanism is not displaced largely in the left-and-right direction even though the link mechanism operates. Then, in the event that the outer surface covering portion is provided at least directly on the right or directly on the left of the outer peripheral surface of the link mechanism and at least a portion of the leaning associated deforming portion is positioned between the outer surface covering portion and at least either of the front surface and the rear surface of the link mechanism, the leaning associated deforming portion is provided in the location closer to the link mechanism while avoiding the interference of the link mechanism with the leaning associated deforming portion. Because of this, even though the leaning associated deforming portion is provided, an enlargement in the size of the vehicle is prevented.

In the vehicles according to various preferred embodiments of the present invention, the following configurations are preferably used.

The vehicle preferably includes a steering shaft that is supported on the body frame between the right suspension device and the left suspension device in the left-and-right direction of the body frame so as to turn about a middle steering axis that extends in the up-and-down direction of the body frame; a handlebar that is provided at an upper end portion of the steering shaft; and a wheel turning operation transmission mechanism that turns the right suspension device about the right steering axis and turns the left suspension device about the left steering axis in association with the turning of the steering shaft that is activated in response to the operation of the handlebar; wherein the right front wheel and the left front wheel are turned by the wheel turning operation transmission mechanism; and the brake controlling operation transmission member includes a wheel turning associated deforming portion that deforms in response to the turning of the right front wheel and the left front wheel, at least a portion of which is disposed below the lower cross portion.

The wheel turning associated deforming portion is provided between portions of the brake controlling operation transmission member which are fixed to two points (for example, one point on the upper cross portion and one point on the right front wheel) which are displaced relatively and largely in association with the turning of the right front wheel and the left front wheel. Since the right front wheel turns about the right steering axis and the left front wheel turns about the left steering axis, the portion of the brake controlling operation transmission member which deforms when the relative positions of the two points in the front-and-rear or left-and-right direction of the body frame change largely define the wheel turning associated deforming portion. Because of this, the wheel turning associated deforming portion changes its posture largely in the front-and-rear or left-and-right direction of the body frame but changes its posture by a significantly reduced amount or minimally in the up-and-down direction of the body frame. For example, in the event that the brake controlling operation transmission member is caused to deform along a plane that is perpendicular or substantially perpendicular to the up-and-down direction when the distance between the two points in the left-and-right direction or the front-and-rear direction is narrowed, the change in posture of the wheel turning associated deforming portion is significantly reduced or minimal in the up-and-down direction.

On the other hand, as described above, although the leaning associated deforming portion changes its posture largely in the up-and-down direction, the leaning associated deforming portion changes its posture by a significantly reduced amount or minimally in the directions other than the up-and-down direction. Because of this, the leaning associated deforming portion deforms by a significantly reduced amount or minimally in the directions other than the up-and-down direction and the wheel turning associated deforming portion deforms by a significantly reduced amount or minimally in the up-and-down direction by separating the leaning associated deforming portion from the wheel turning associated portion.

Further, the right front wheel turns about the right steering axis that extends in the up-and-down direction of the body frame. The left front wheel turns about the left steering axis that extends in the up-and-down direction of the body frame. Then, a space is secured below the lower cross portion to prevent the interference of the lower cross portion with the right front wheel and the right suspension device that supports the right front wheel, and the left front wheel and the left suspension device that supports the left front wheel. The right front wheel and the left front wheel move largely in the front-and-rear or left-and-right direction relative to the link mechanism but do not move largely in the up-and-down direction relative to the link mechanism.

In this way, the wheel turning associated deforming portion and the right front wheel or the left front wheel are also displaced largely in the front-and-rear direction or the left-and-right direction relative to the link mechanism but are not displaced largely in the up-and-down direction. Namely, the wheel turning associated deforming portion and the right front wheel or the left front wheel tend to change their postures in similar directions. Because of this, even though at least a portion of the wheel turning associated deforming portion is provided below the lower cross portion, it is easy to prevent the interference of the wheel turning associated deforming portion with the right front wheel or the left front wheel. In this way, it is possible to provide the wheel turning associated deforming portion by using the space provided to permit the displacement of the right front wheel or the left front wheel. In other words, even though the wheel turning associated deforming portion is provided, the expansion of the space that permits the displacement of the right front wheel or the left front wheel is prevented.

In the vehicles according to various preferred embodiments of the present invention, the following configurations are preferably used.

A first restrictor that prevents the movement of the brake controlling operation transmission member is provided at a portion of the wheel turning operation transmission mechanism that moves to maintain a parallel relationship with the lower cross portion when the body frame leans.

When the right front wheel and the left front wheel are turned, the wheel turning operation transmission mechanism that moves to maintain the parallel relationship with the lower cross portion is activated to operate. When the link mechanism is activated to operate, a portion of the wheel turning operation transmission mechanism that moves to maintain the parallel relationship with the lower cross portion is displaced. Namely, a portion of the wheel turning operation transmission mechanism that moves to maintain the parallel relationship with the lower cross portion moves either of when the body frame leans and when the right front wheel and the left front wheel are turned.

Then, in the event that the first restrictor is provided at a portion of the wheel turning operation transmission mechanism that moves to maintain the parallel relationship with the lower cross portion, it is easy to cause the brake controlling operation transmission member to deform in association with the leaning of the body frame and the turning of the right front wheel and the left front wheel. Based on this configuration, the leaning associated deforming portion is deformed in the directions other than the up-and-down direction of the body frame, and the wheel turning associated deforming portion is caused to deform in the up-and-down direction of the body frame, so that the individual deforming portions is significantly reduced or minimal.

In the vehicles according to various preferred embodiments of the present invention, the following configurations are preferably used.

At least a portion of the leaning associated deforming portion is positioned between the brake controller and the first restrictor, and at least a portion of the wheel turning associated deforming portion is positioned between the first restrictor and the brake device.

A portion of the wheel turning operation transmission mechanism where the brake controller and the first restrictor are provided changes its relative position when the body frame leans. Because of this, in the event that the leaning associated deforming portion is provided therebetween, the leaning associated deforming portion deforms easily in response to the leaning of the body frame.

Additionally, a portion of the wheel turning operation transmission mechanism where the first restrictor is provided and the brake device tend to change their relative positions when the right front wheel and the left front wheel are turned. Because of this, when the wheel turning associated deforming portion is provided therebetween, the wheel-turning associated deforming portion is caused to deform easily in response to the turning of the right front wheel and the left front wheel.

Because of this, both the leaning associated deforming portion and the wheel turning associated deforming portion are easily significantly reduced or minimized in size, facilitating the compactness of the vehicle.

In the vehicles according to various preferred embodiments of the present invention, the following configurations are preferably used.

A second restrictor that prevents the movement of the brake controlling operation transmission member is provided on the upper cross portion or the lower cross portion, and at least a portion of the leaning associated deforming portion is positioned between the second restrictor and the first restrictor.

The second restrictor allows the brake controlling operation transmission member to deform together with the upper cross portion or the lower cross portion that turns about the axes that extend in the front-and-rear direction. Because of this, at least a portion of the leaning associated deforming portion that is positioned between the second restrictor and the first restrictor deforms along a plane that is perpendicular or substantially perpendicular to the front-and-rear direction, thus restricting easily the interference of the link mechanism with the leaning associated deforming portion. Namely, although the leaning associated deforming portion is provided, the expansion of the space provided to permit the operation of the link mechanism is further prevented.

In the vehicles according to preferred embodiments of the present invention, the following configurations are preferably used.

A third restrictor that prevents the movement of the brake controlling operation transmission member is provided on the body frame.

When the body frame leans, the brake device moves relative to the body frame. Because of this, the leaning associated deforming portion deforms easily in response to the leaning of the body frame by the third restrictor that is provided on the body frame. Because of this, the interference of the link mechanism with the leaning associated deforming portion is prevented more easily. Namely, although the leaning associated deforming portion is provided, the expansion of the space provided to permit the operation of the link mechanism is prevented.

In the vehicles according to preferred embodiments of the present invention, the following configurations are preferably used.

The vehicle includes a steering shaft that is supported on the body frame between the right suspension device and the left suspension device in the left-and-right direction of the body frame and that turns about a middle steering axis that extends in the up-and-down direction of the body frame, and a fourth restrictor that prevents the movement of the brake controlling operation transmission member is provided on the steering shaft or a member that moves together with the steering shaft.

When the steering shaft is turned about the middle steering axis, the right front wheel and the left front wheel are turned. The wheel turning associated deforming portion is caused to easily deform in response to the turning of the right front wheel and the left front wheel by the fourth restrictor that is provided on the steering shaft or the member that moves together with the steering shaft. This prevents more easily the interference of the right front wheel and the left front wheel with the wheel turning associated deforming portion. Namely, even though the wheel turning associated deforming portion is provided, the expansion of the space that permits the turning of the right front wheel and the left front wheel is prevented.

The above and other elements, features, steps, characteristics and advantages of the present invention will become more apparent from the following detailed description of the preferred embodiments with reference to the attached drawings.

SUMMARY OF THE PRESENT INVENTION

DETAILED DESCRIPTION OF THE PREFERRED EMBODIMENTS

First Preferred Embodiment

Hereinafter, referring to the accompanying drawings, an example of a vehicle 1 according to a first preferred embodiment of the present invention will be described.

In this preferred embodiment, a vehicle 1 including two front wheels and one rear wheel will be illustrated as an example of the vehicle 1.

Figure 1:
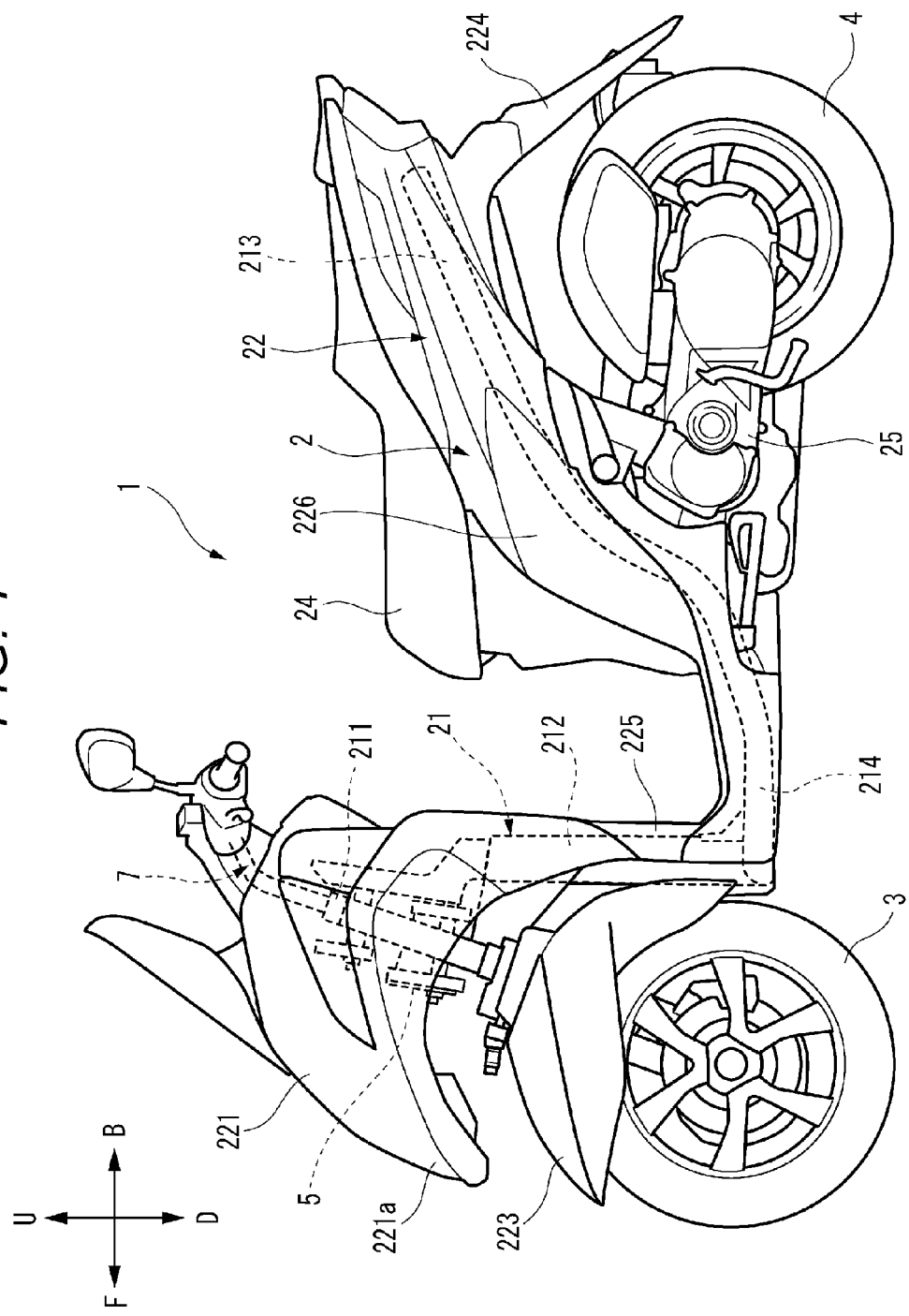
FIG. 1 is an overall side view of a vehicle according to a first preferred embodiment of the present invention.

FIG. 1 is an overall side view of a vehicle seen from the left of the vehicle 1. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward and rightward directions as seen from a rider of the vehicle 1. An up-and-down direction means a vertical direction and also a substantially up-and-down direction which inclines from the vertical direction. A left-and-right direction means a horizontal direction and also a substantially left-and-right direction which inclines from the horizontal direction. A center in a vehicle's width direction means a central position of the vehicle 1 in the vehicle's width direction. The right in the vehicle's width direction means a direction directed from the center in the vehicle's width direction towards the right. A left in the vehicle's width direction means a direction from the center in the vehicle's width towards left. An unloaded state of the vehicle means a state in which the vehicle 1 is in the upright state with front wheels neither steered nor caused to lean in such a state that no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The headstock 211 is disposed at a front portion of the vehicle 1. When the vehicle 1 is viewed from a side thereof, the headstock 211 is slightly inclined relative to a vertical direction so that an upper portion is positioned slightly farther rearwards than a lower portion thereof. The steering mechanism 7 and the link mechanism 5 are disposed around the headstock 211. A steering shaft 60 of the steering mechanism 7 is inserted into the headstock 211 so as to be turned therein. The headstock 211 supports the link mechanism 5.

The headstock 211 is a portion of the body frame 21 and is allowed to lean to the right of the vehicle 1 when the vehicle 1 turns right and to lean to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearwards from the lower portion of the down frame 212. The rear frame 213 is disposed behind the under frame 214 and extends obliquely rearwards and upwards. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, a center cover 226, and a rear mudguard 224.

The front cover 221 is positioned ahead of the seat 24. The front cover 221 covers at least portions of the steering mechanism 7 and the link mechanism 5. The front cover 221 includes a front portion 221a that is disposed ahead of the link mechanism 5. In a side view of the vehicle 1 in an unloaded state, the front portion 221a of the front cover 221 is provided above the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 is disposed so as to cover the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed below the center cover 226 and the rear mudguard 224.

Figure 2:
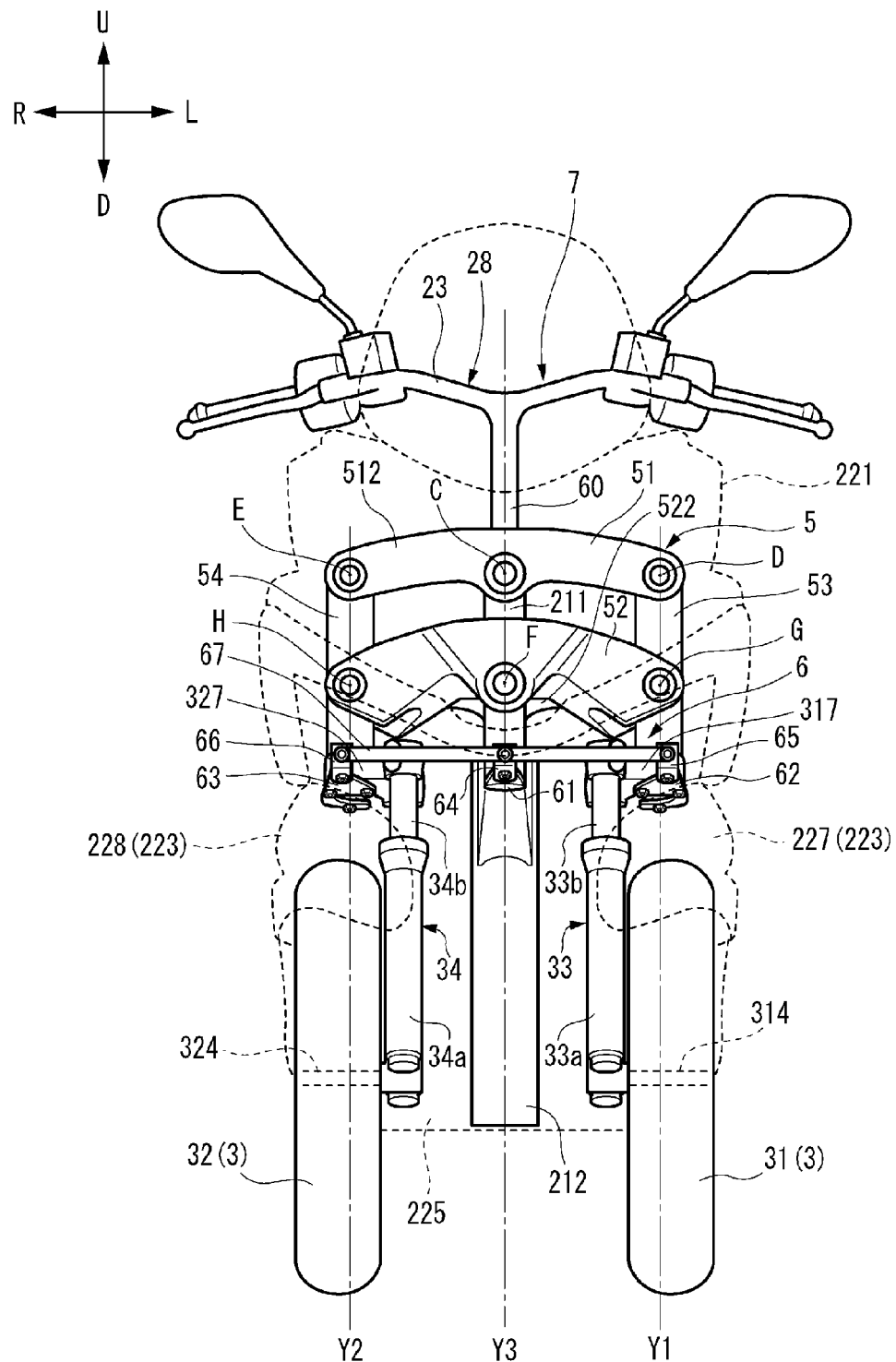
FIG. 2 is a front view of a front portion of the vehicle shown in FIG. 1.
Figure 3:
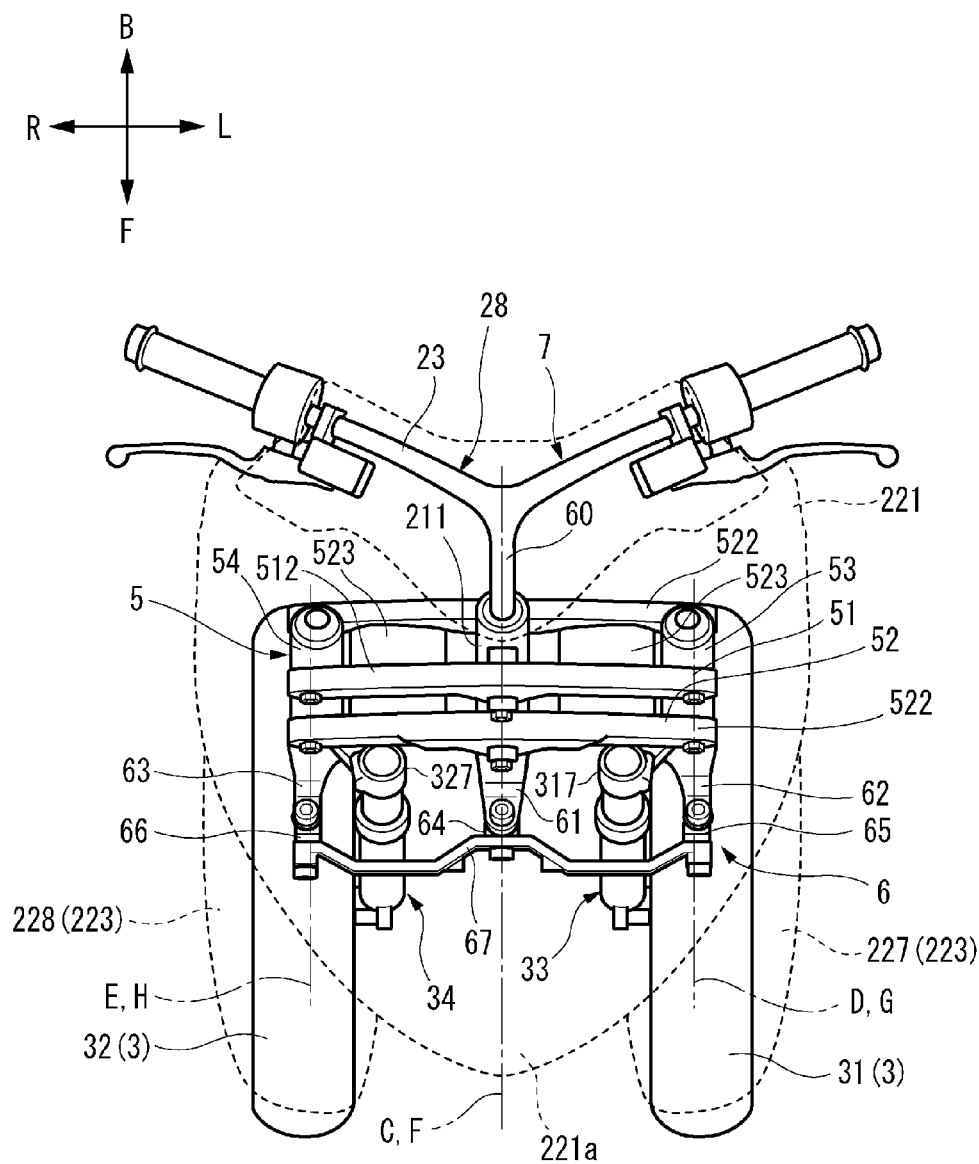
FIG. 3 is a plan view of the front portion of the vehicle shown in FIG. 1.

FIG. 2 is a front view of the front portion of the vehicle 1 shown in FIG. 1 when viewed from the front thereof. FIG. 3 is a plan view of the front portion of the vehicle 1 shown in FIG. 1 when viewed from thereabove. FIGS. 2 and 3 show the front portion of the vehicle 1 as seen through the body cover 22.

As shown in FIGS. 2 and 3, the steering mechanism 7 includes a wheel turning operation transmission mechanism 6, a left shock absorber 33, a right shock absorber 34, and a pair of left and right front wheels 3.

The pair of right and left front wheels 3 includes the left front wheel 31 and the right front wheel 32. The left front wheel 31 and the right front wheel 32 are arranged in a left-and-right direction of the body frame 21. Of the pair of left and right front mudguards 223, a first front mudguard 227 is disposed directly above the left front wheel 31. Of the pair of left and right front mudguards 223, a second front mudguard 228 is disposed directly above the right wheel 32. The left front wheel 31 is supported by the left shock absorber 33. The right front wheel 32 is supported by the right shock absorber 34.

The left shock absorber 33 (an example of a left suspension device) is preferably a so-called telescopic shock absorber and dampens vibration from a road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The first upper-side portion 33b is disposed at an upper side of the first lower-side portion 33a in such a state that the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317.

Figure 5:
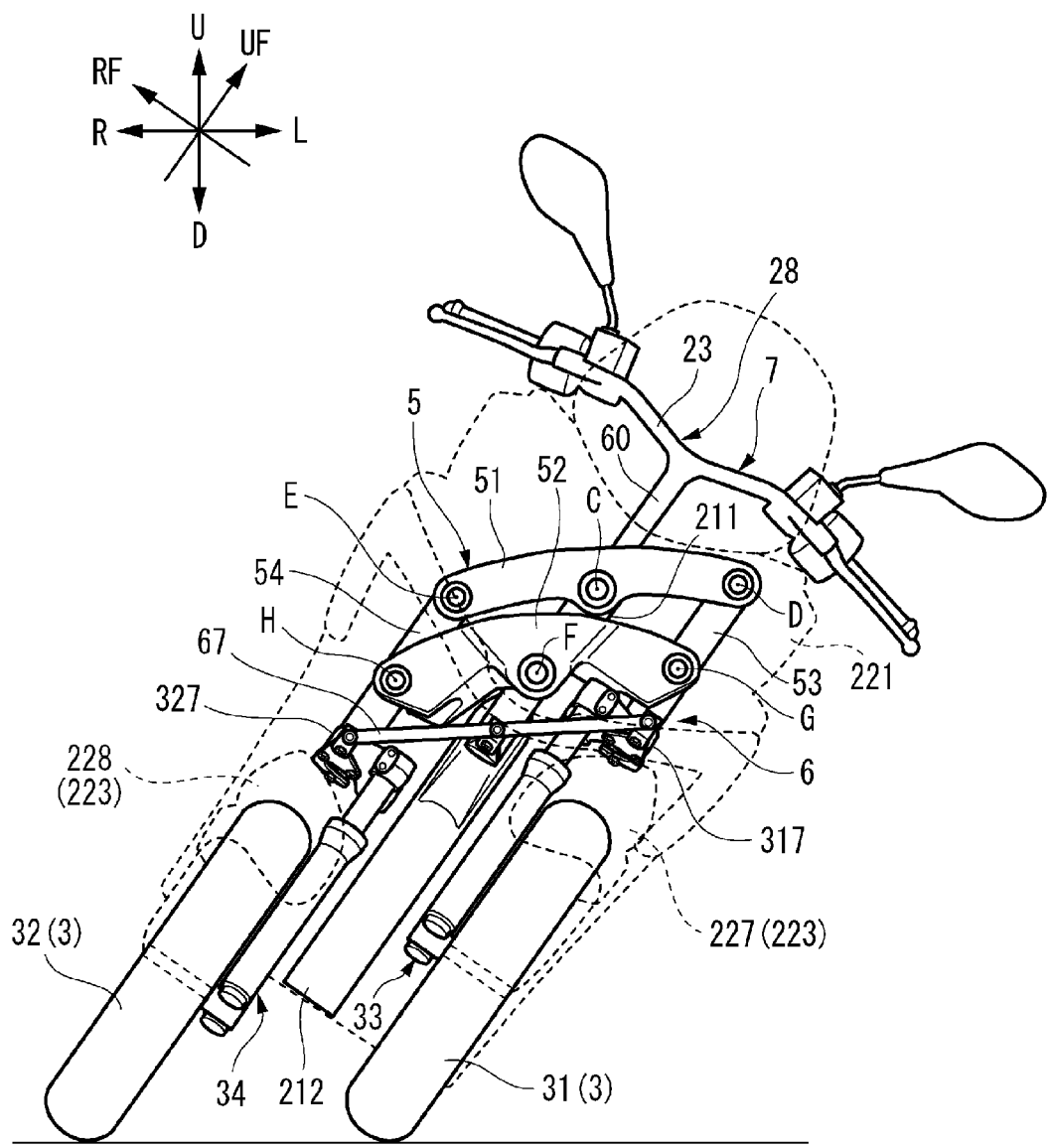
FIG. 5 is a front view of the front portion of the vehicle in such a state that the vehicle shown in FIG. 1 is caused to lean.

In this description, the "left-and-right direction of the body frame 21" denotes a direction that intersects at right angles or perpendicular or substantially perpendicular to an axial direction of the headstock 211 when the vehicle 1 is viewed from the front thereof. An up-and-down direction of the body frame 21 denotes a direction which extends in an axial direction of the headstock 211 when the vehicle 1 is viewed from the front thereof. For an example, the up-and-down direction of the body frame 21 coincides with the axial direction of the headstock 211. As shown in FIG. 2, in such a state that the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, in such a state that the vehicle 1 leans relative to a road surface, when the vehicle 1 is viewed from the front thereof, the rightward direction RF of the body frame 21 does not coincide with the rightward direction R in the horizontal direction, and an upward direction UF of the body frame 21 does not coincide with an upward direction U in the vertical direction.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber 34 (an example of a right suspension device) is preferably a so-called telescopic shock absorber and dampens vibration from a road surface. The left shock absorber 34 supports the right front wheel 32 at a lower portion thereof and absorbs an upward displacement of the right front wheel 32 in the up-and-down direction of the body frame 21. The right shock absorber 34 includes a second lower-side portion 34a and a second upper-side portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The second upper-side portion 34b is disposed at an upper side of the second lower-side portion 34a in such a state that the second upper-side portion 34b is partially inserted into the second lower-side portion 34a. The second upper-side portion 34b moves relative to the second lower-side portion 34a in a direction in which the second lower-side portion 34a extends. An upper portion of the second upper-side portion 34b is fixed to a second bracket 327.

The second lower-side portion 34a and the second upper-side portion 34b define two telescopic elements that are aligned parallel in the front-and-rear direction and are connected together. This configuration prevents the second upper-side portion 34b from turning relative to the second lower-side portion 34a.

The wheel turning operation transmission mechanism 6 is disposed above the left front wheel 31 and the right front wheel 32. The wheel turning operation transmission mechanism 6 includes a steering member 28 by which the rider inputs steering effort or a steering force. The steering member 28 includes the steering shaft 60 and a handlebar 23 that is provided at an upper end portion of the steering shaft 60.

The steering shaft 60 is supported on the headstock 211 between the left shock absorber 33 and the right shock absorber 34 in the left-and-right direction of the body frame 21. Additionally, the steering shaft 60 turns about a middle steering axis Y3 that extends in the up-and-down direction of the body frame 21. The steering shaft 60 is partially inserted into the headstock 211 and extends substantially in the up-and-down direction. The steering shaft 60 is turned relative to the headstock 211. The steering shaft 60 is turned in association with the rider turning the handlebar 23.

The wheel turning operation input mechanism. 6 turns the left shock absorber 33 about a left steering axis Y1 that extends in the up-and-down direction and turns the right shock absorber 34 about a right steering axis Y2 that is parallel to the left steering axis Y1 in association with the turning of the steering shaft 60 which is triggered in response to the operation of the handlebar 23.

The wheel turning operation transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The wheel turning operation transmission mechanism 6 transmits steering effort or a steering force with which the handlebar 23 is controlled to the first bracket 317 and the second bracket 327 via those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the first bracket 317. The second transfer plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed laterally symmetrical with the second transmission plate 62 around the first transmission plate 61. The third transmission plate 63 is fixed to the second bracket 327. The third transfer plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie rod 67 extends in the vehicle's width direction. The tie-rod 67 is supported so as to turn relative to the shaft portions that extend in the front-and-rear direction at the front portions of the first joint 64, the second joint 65, and the third joint 66. This tie-rod 67 is a portion of the wheel turning operation transmission mechanism 6 and moves so as to maintain a parallel relationship with a lower cross portion 52, which will be described below, when the body frame 21 leans.

The wheel turning operation transmitting mechanism 6 described above transmits a steering force transmitted from the steering member 28 to the tie-rod 67 via the first transmission plate 61 and the first joint 64. This causes the tie rod 67 to be displaced either leftwards or rightwards. The steering effort transmitted to the tie rod 67 is transmitted from the tie rod 67 to the first bracket 317 by way of the second transmission plate 62 and the second joint 65 and is also transmitted from the tie rod 67 to the second bracket 327 by way of the third transmission plate 63 and the third joint 66. As a result, the first bracket 317 and the second bracket 327 are turned in the direction in which the tie-rod 67 is displaced.

In this preferred embodiment, the link mechanism 5 preferably uses a four-joint parallel link system (also, called a parallelogram link).

The link mechanism 5 is disposed below the handlebar 23. The link mechanism 5 is connected to the headstock 211 of the body frame 21. The link mechanism 5 includes an upper cross portion 51, a lower cross portion 52, the left side portion 53, and the right side portion 54 as a configuration which enables the vehicle 1 to lean. Additionally, the link mechanism 5 includes the first bracket 317 and the left shock absorber 33 as a configuration that is connected to a lower portion of the left side portion 53 so as to lean together with the left side portion 53. Further, the link mechanism 5 includes the second bracket 327 and the right shock absorber 34 as a configuration that is connected to a lower portion of the right side portion 54 so as to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn around an upper right axis E extending in the front-and-rear direction of the body frame 21, supports the upper portion of the left side portion 53 at the left end portion thereof so as to turn around an upper left axis D which is parallel to the upper right axis E, and the middle portion thereof is supported on the body frame 21 so as to turn around an upper middle axis C which is parallel to the upper right axis E and the upper left axis D.

The lower cross portion 52 supports the lower portion of the right side portion 54 at the right end portion thereof so as to turn around a lower right axis H which is parallel to the upper right axis E, supports the lower portion of the left side portion 53 at the left end portion thereof so as to turn around a lower left axis G which is parallel to the upper left axis E, and the middle portion thereof is supported on the body frame 21 so as to turn around a lower middle axis F which is parallel to the upper middle axis C.

The upper cross portion 51 includes a plate-shaped member 512 which is provided in front of the headstock 211 and extends in the vehicle's width direction. The plate-shaped member 512 is supported on the headstock 211 by a supporting portion that is positioned at a center in the left-and-right direction and turns about an upper middle axis C that extends substantially in the front-and-rear direction relative to the headstock 211.

A left end of the upper cross portion 51 is connected to the left side portion 53 by a supporting portion. The upper cross portion 51 turns relative to the left side portion 53 about the upper left axis D that extends substantially in the front-and-rear direction. A right end of the upper cross portion 51 is connected to the right side portion 54 by a connecting portion. The upper cross portion 51 turns relative to the right side portion 54 about the upper right axis E that extends substantially in the front-and-rear direction.

The lower cross portion 52 is supported on the headstock 211 by a supporting portion and turns about the lower middle axis F that extends substantially in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 is disposed so as to hold the headstock 211 therebetween in the front-and-rear direction. The pair of plate-shaped members 522, 522 is connected integrally to each other by a middle portion 523. The middle portion 523 may be integral with or separated from the pair of the plate-shaped members 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is disposed directly on the left of the headstock 211 and extends parallel to the direction in which the headstock 211 extends. The left side portion 53 is disposed directly above the left front wheel 31 and above the left shock absorber 33. The left side portion 53 is connected to the first bracket 317 at the lower portion thereof and is attached to the first bracket 317 so as to turn about the left steering axis Y1. This left side portion 53 supports an upper portion of the left shock absorber 33 so as to turn about the left steering axis Y1.

The right side portion 54 is disposed directly on the right of the headstock 211 and extends in the direction in which the headstock 211 extends. The right side portion 54 is disposed directly above the right front wheel 32 and above the right shock absorber 34. The right side portion 54 is connected to the second bracket 327 at the lower portion thereof and is attached to the second bracket 327 so as to turn about the right steering axis Y2. This right side portion 54 supports an upper portion of the right shock absorber 34 so as to turn about the right steering axis Y2.

In this way, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
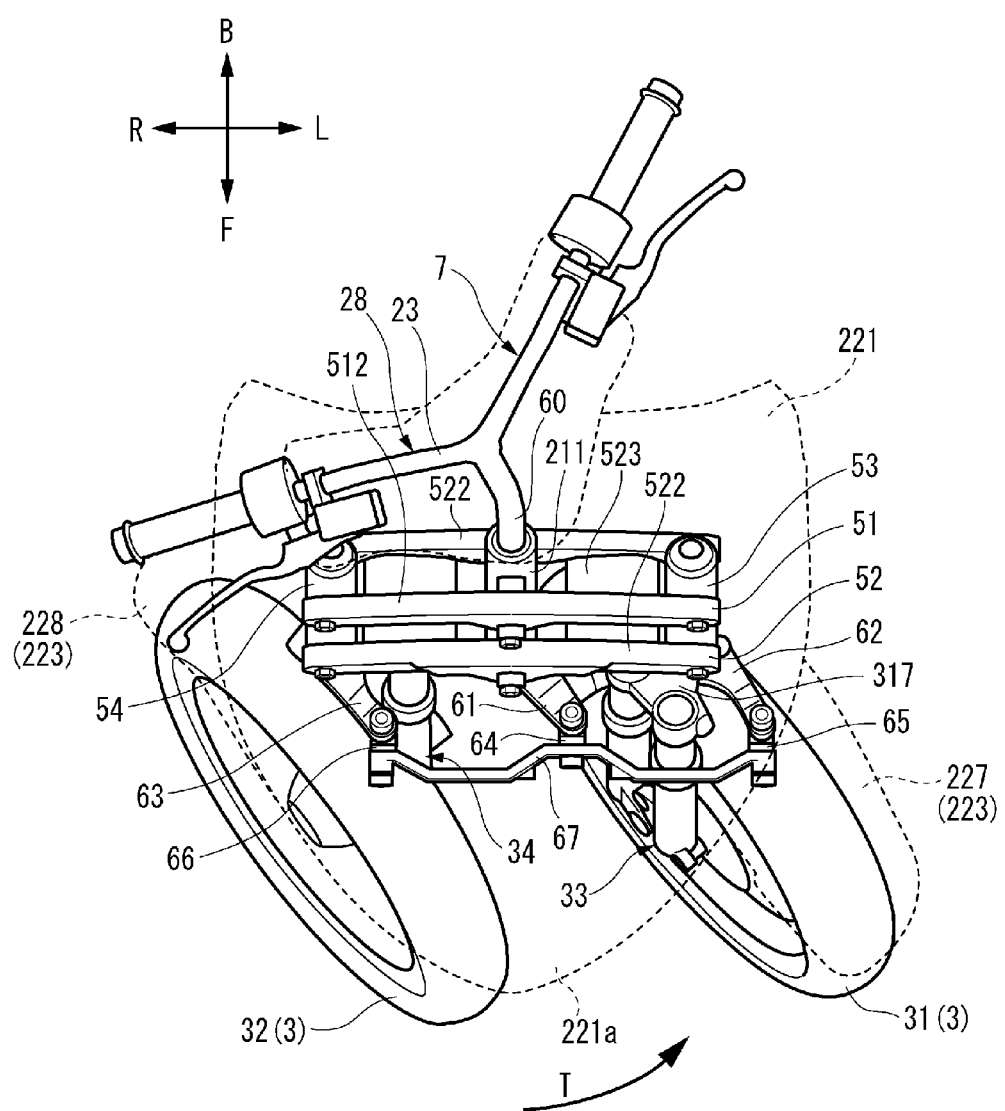
FIG. 4 is a plan view of the front portion of the vehicle in such a state that the vehicle shown in FIG. 1 is turned.

FIG. 4 is a plan view of the front portion of the vehicle 1 when the vehicle 1 is steered to be turned, depicting the steering operation of the vehicle 1.

As shown in FIG. 4, when the handlebar 23 is turned in the left-and-right direction, the wheel turning operation transmission mechanism 6 of the steering mechanism 7 is activated to operate, so that a steering operation is performed. When the steering shaft 60 turns as a result of the handlebar 23 being turned, the first transmission plate 61 turns as the steering shaft 60 turns. Namely, the front wheels 3 are turned by the wheel turning operation transmission mechanism 6 which moves in response to the turning of the steering shaft 60.

For example, when the steering shaft 60 turns in a direction indicated by an arrow T in FIG. 4, the tie-rod 67 moves leftwards and rearwards in association with the turning of the first transmission plate 61. As this occurs, the first transmission plate 61 is caused to turn relative to the first joint 64 by a rotational shaft of the first joint 64 that extends substantially in the up-and-down direction, and the tie-rod 67 moves to the left rear while maintaining its posture. The second transmission plate 62 and the third transmission plate 63 turn in the direction indicated by the arrow T about the left side portion 53 and the right side portion 54, respectively, as the tie-rod 67 moves leftwards and rearwards. As this occurs, the second transmission plate 62 turns relative to the second joint 65 about a rotational shaft of the second joint 65 that extends substantially in the up-and-down direction, and the third transmission plate 63 turns relative to the third joint 66 about a rotational shaft of the third joint 66 that extends substantially in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left-and-right direction of the vehicle 1 in accordance with the operation of the link mechanism 5. The operation of the link mechanism 5 means that the individual members (the upper cross portion 51, the lower cross portion 52, the left side portion 53, and the right side portion 54) that activate a leaning operation in the link mechanism 5 turn relatively about their connecting points as axes so as to change the shape of the link mechanism 5.

In the link mechanism 5 of this preferred embodiment, for example, the upper cross portion 51, the lower cross portion 52, the left side portion 53, and the right side portion 54 which are disposed so as to define a rectangular or substantially rectangular shape when viewed from the front with the vehicle 1 being in the upright state turn to change their shape to substantially a parallelogram shape in such a state that the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans to the left of the vehicle 1 relative to the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves farther leftwards than the lower cross portion 52, and the left side portion 53 and the right side portion 54 lean from the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

Additionally, when the leaning operation is performed, the tie-rod 67 turns relative to each of the shaft portions of the first joint 64, the second joint 65 and the third joint 66 that extend in the front-and-rear direction. This allows the tie rod 67 to maintain its parallel posture to the upper cross portion 51 and the second cross portion 52 even though the vehicle 1 leans.

Figure 6:
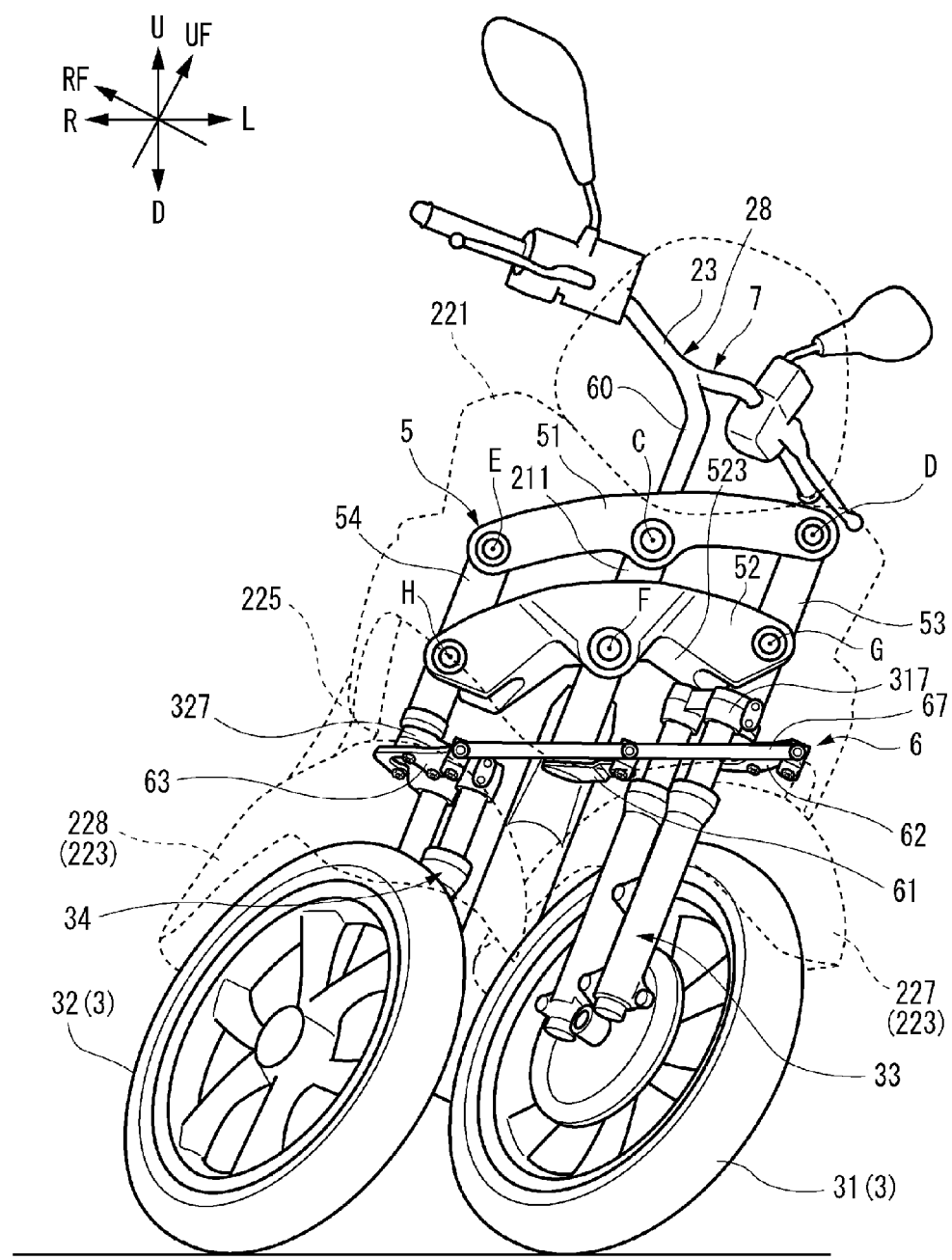
FIG. 6 is a front view of the front portion of the vehicle in such a state that the vehicle shown in FIG. 1 is turned.

FIG. 6 is a front view of the front portion of the vehicle 1 in such a state that the vehicle 1 is steered and caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53, and the right side portion 54 of the link mechanism 5 are turned to change their shape to substantially a parallelogram, so that the tie-rod 67 moves leftwards or rightwards, that is, in a direction in which the vehicle 1 is steered (leftwards in FIG. 6) and rearwards.

Next, with reference to FIGS. 7 to 30, a brake hose will be described which is provided on the vehicle 1 described above.

Figure 7:
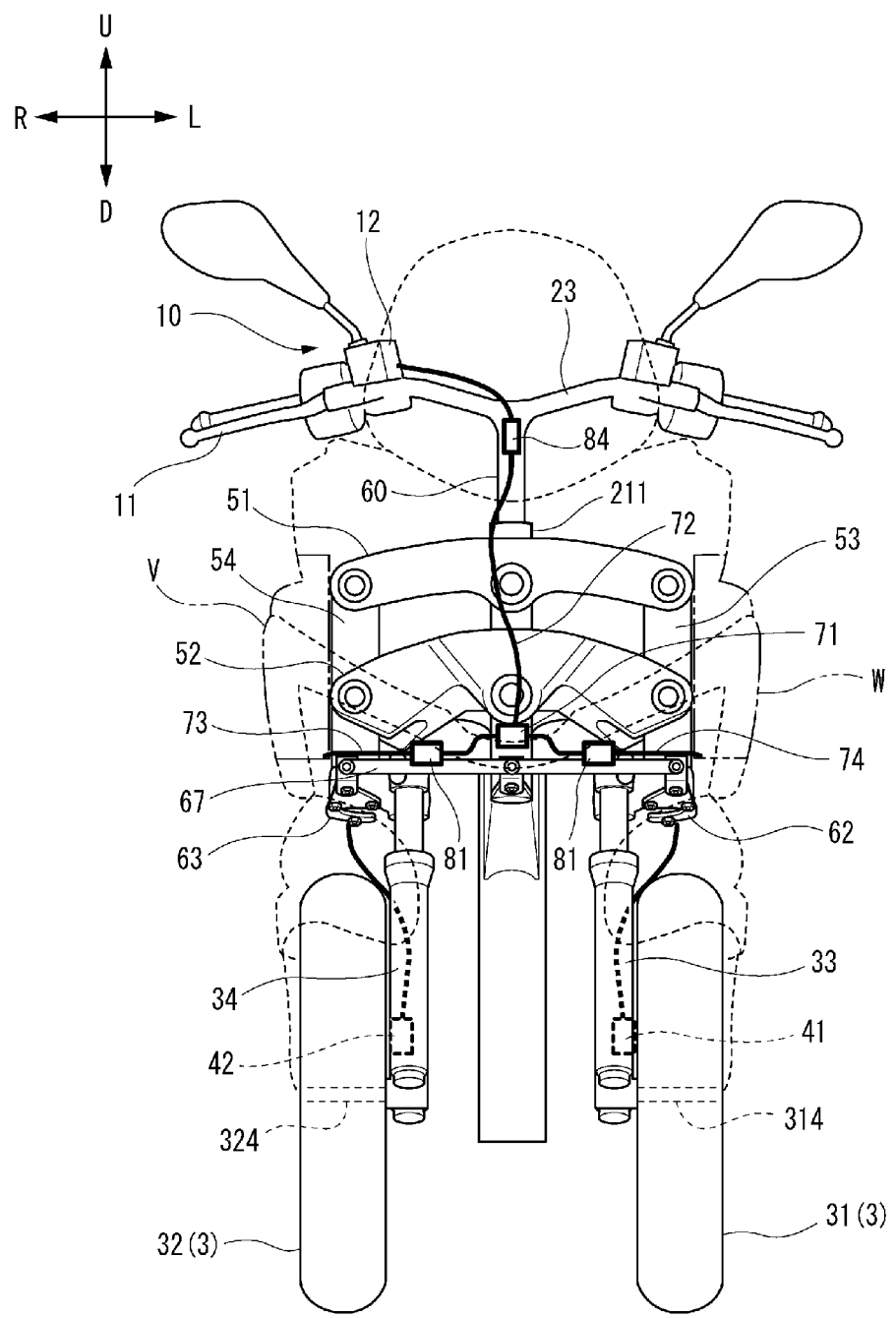
FIG. 7 is a front view of the vehicle that is in an upright state, shown together with a brake hose.
Figure 8:
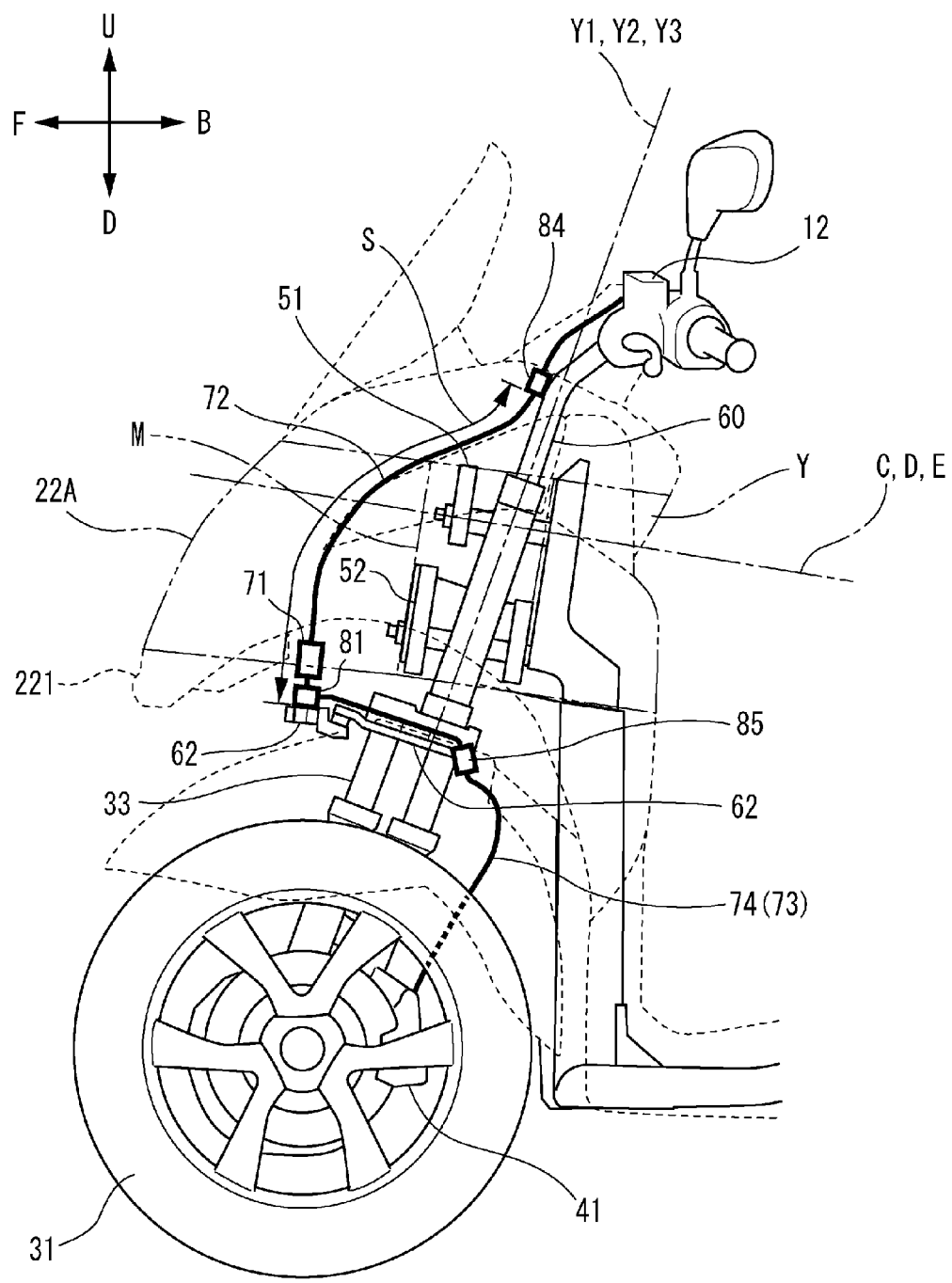
FIG. 8 is a side view of the vehicle shown in FIG. 7.
Figure 9:
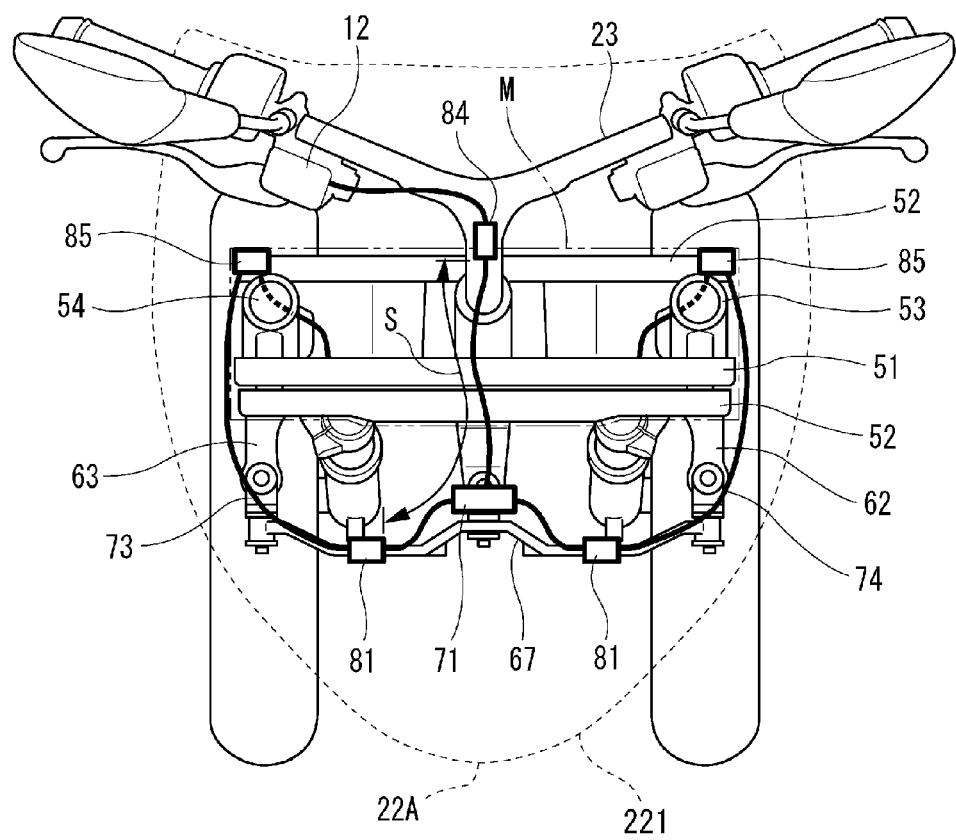
FIG. 9 is a plan view of the vehicle shown in FIG. 7.

Firstly, with reference to FIGS. 7 to 9, the brake hose will be described when the vehicle 1 is in the upright state. The upright state of the vehicle 1 means a state in which the vehicle 1 does not lean and the front wheels are not turned. FIG. 7 is a front view of the vehicle 1 that is in the upright state, shown together with the brake hose. FIG. 8 is a side view of the vehicle 1 shown in FIG. 7. FIG. 9 is a plan view of the vehicle 1 shown in FIG. 7.

In the following description, the front view means a view of the vehicle 1 when viewed from a direction that is parallel to the upper middle axis C. Additionally, the plan view means a view of the vehicle 1 when viewed from thereabove.

As shown in FIG. 7, a right brake caliper 42 is a brake device fixed to the right shock absorber 34 (an example of a right suspension device). The right shock absorber 34 includes a front telescopic element and a rear telescopic element that are aligned in a back-and-forth direction. The right brake caliper 42 is provided on a rear surface of a lower portion of the rear telescopic element (refer to FIG. 8). The right brake caliper 42 is provided below the link mechanism 5. In the following description, the link mechanism 5 refers to the member which includes the upper cross portion 51, the lower cross portion 52, the left side portion 53, and the right side portion 54.

The right brake caliper 42 includes brake pads, not shown. The right brake caliper 42 applies a braking force to the right front wheel 32 by holding a brake disc that rotates together with the right front wheel 32 by the brake pads therebetween.

A left brake caliper 41 is a brake device fixed to the left shock absorber 33. The left shock absorber 33 includes a front telescopic element and a rear telescopic element that are aligned in the back-and-forth direction. The left brake caliper 41 is provided on a rear surface of a lower portion of the rear telescopic element (refer to FIG. 8). The left brake caliper 41 is provided below the link mechanism 5.

The left brake caliper 41 includes brake pads, not shown. The left brake caliper 41 applies a braking force to the left front wheel 31 by holding a brake disc that rotates together with the left front wheel 31 by the brake pads therebetween.

A brake controller 10 is attached to an upper surface of a right portion of the handlebar 23 that is situated above the link mechanism 5. The brake controller 10 includes a brake lever 11 and a master cylinder 12. Operating the brake lever 11 increases the pressure of a brake fluid in an interior of the master cylinder 12.

A brake hose (an example of a brake controlling operation transmission member) connects the master cylinder 12 of the brake controller 10 to the right brake caliper 42 and the master cylinder 12 of the brake controller 10 to the left brake caliper 41. The brake hose is a flexible rubber tube. The brake hose transmits a brake controlling operation that is inputted into the brake controller 10 to the right brake caliper 42 and the left brake caliper 41.

The brake hose starts from the master cylinder 12, passes through a space defined directly ahead of the link mechanism 5 downwards in the up-and-down direction, and branches off below the link mechanism 5 into left and right brake hose portions that extend to the left and right. Then, the left and right brake hose portions extend downwards along the left shock absorber 33 and the right shock absorber 34 to connect to the brake calipers 41, 42, respectively. In the following description, in relation to the brake hose, a side facing the master cylinder 12 will, from time to time, be called an upstream side, and a side facing the brake calipers 41, 42 will, from time to time, be called a downstream side.

The pressure of the brake fluid in the master cylinder 12 is transmitted to the right brake caliper 42 and the left brake caliper 41 by way of the brake hose. When the brake fluid under high pressure in an interior of the brake hose is applied to the right brake caliper 42, the right brake caliper 42 applies a braking force to the right front wheel 32. When the brake fluid under high pressure in the interior of the brake hose is applied to the left brake caliper 41, the left brake caliper 41 applies a braking force to the left front wheel 31.

The brake hose includes a branch block 71. This branch block 71 is situated directly ahead of and directly below the lower cross portion 52 and directly above the tie-rod 67. The branch block 71 is a metallic block in an interior of which flow paths are provided. A brake hose extends from the master cylinder 12 to the branch block 71 to connect them to each other. The brake hose branches off at the branch block 71 into brake hose portions that extend towards the right brake caliper 42 and the left brake caliper 41. This branch block 71 is not fixed to the members of the vehicle 1 such as the lower cross portion 52 and the tie-rod 67 and is allowed to move together with the brake hose when the brake hose moves.

In the following description, the portion of the brake hose extending from the master cylinder 12 to the branch block 71 will be called an upstream side brake hose 72. In addition, the brake hose portion extending from the branch block 71 to the right brake caliper 42 will be called a right downstream side brake hose 73. Further, the brake hose portion extending from the branch block 71 to the left brake caliper 41 will be called a left downstream side brake hose 74. In this preferred embodiment, the movement of the brake hose is prevented by first restrictors 81, a fourth restrictor 84, and a fifth restrictor 85.

The upstream side brake hose 72 is prevented from moving by the fourth restrictor 84 that is provided on the steering shaft 60 in a location above an upper surface of the upper cross portion 51. The fourth restrictor 84 prevents a radial movement of the brake hose while permitting a slight longitudinal movement of the brake hose. In this preferred embodiment, although the fourth restrictor 84 is preferably fixed to the steering shaft 60, the fourth restrictor 84 may be fixed to the handlebar 23 that turns together with the steering shaft 60.

The upstream side brake hose 72 that extends through a section between the master cylinder 12 and the fourth restrictor 84 extends from the master cylinder 12 along the handlebar 23 and the steering shaft 60. Additionally, as shown in FIG. 8, the upstream side brake hose 72 is provided to extend in the up-and-down direction from the fourth restrictor 84 to the branch block 71 while being bent so as to project to the front. A portion of the upstream side brake hose 72 that extends between the fourth restrictor 84 and the branch block 71 is disposed within a space defined directly ahead of the upper cross portion 51 and the lower cross portion 52 and directly behind the front cover 221.

The right downstream side brake hose 73 is prevented from moving by the first restrictor 81 that is provided on the tie-rod 67 that is positioned below a lower surface of the lower cross portion 52. Similarly, the left downstream side brake hose 74 is also prevented from moving by the first restrictor 81 that is also provided on the tie-rod 67. These first restrictors 81 are provided on an upper surface of the tie-rod 67. As does the fourth restrictor 84, the first restrictors 81 prevent the radial movement of the brake hose while permitting a slight longitudinal movement of the brake hose.

As shown in FIG. 7, the right downstream side brake hose 73 that extends between the branch block 71 and the first restrictor 81 is provided directly below the lower cross portion 52. The right downstream side brake hose 73 is bent between the branch block 71 and the first restrictor 81. Similarly, the left downstream side brake hose 74 that extends between the branch block 71 and the first restrictor 81 is provided directly below the lower cross portion 52. The left downstream side brake hose 74 is bent between the branch block 71 and the first restrictor 81.

As shown in FIGS. 8 and 9, the right downstream side brake hose 73 is prevented from moving by the fifth restrictor 85 that is provided on the third transmission plate 63 on a downstream side of the first restrictor 81. The fifth restrictor 85 also prevents a radial movement of the brake hose while permitting a slight longitudinal movement of the brake hose. To describe this in greater detail, the fifth restrictor 85 is provided near a connecting position where the right side portion 54 is connected to the third transmission plate 63. Similarly, the left downstream side brake hose 74 is also prevented from moving by the fifth restrictor 85 that is provided on the second transmission plate 62 on a downstream side of the first restrictor 81.

The right downstream side brake hose 73 that extends between the first restrictor 81 and the fifth restrictor 85 extends to the right along the upper surface of the tie-rod 67 (refer to FIG. 7). The right downstream side brake hose 73 is bent near a right end portion of the tie-rod 67 to extend to the rear along the third transmission plate 63.

Similarly, the left downstream side brake hose 74 that extends between the first restrictor 81 to the fifth restrictor 85 extends to the right along the upper surface of the tie-rod 67 and is bent near a left end portion of the tie-rod 67 to extend to the rear along the second transmission plate 62.

Returning to FIG. 8, the right downstream side brake hose 73 extends downwards from the fifth restrictor 85 to connect to the right brake caliper 42. Similarly, the left downstream side brake hose 74 extends downwards from the fifth restrictor 85 to connect to the left brake caliper 41. The left downstream side brake hose 74 that extends between the fifth restrictor 85 and the left brake caliper 41 is bent so as to project to the rear in order to avoid an interference thereof with the left shock absorber 33. Similarly, the right downstream side brake hose 73 that extends between the fifth restrictor 85 and the right brake caliper 42 is bent so as to project to the rear in order to avoid an interference thereof with the right shock absorber 34.

In this preferred embodiment, as shown in FIG. 8, the front cover 221 (an example of a body cover) includes a lateral surface or outer surface covering portion 22A that covers at least a portion of a circumferential lateral surface or outer peripheral surface of the link mechanism 5 that excludes an upper surface and a lower surface. The outer peripheral surface of the link mechanism 5 that excludes the upper surface and the lower surface thereof includes a front surface, a left side surface, a right side surface, a rear surface, and surfaces of corner portions that connect those surfaces and does not include conceptually the upper surface and the lower surface of the link mechanism 5. In this preferred embodiment, the outer surface covering portion 22A is a portion of a front portion of the front cover 221 that is positioned directly ahead of the link mechanism 5. At least a portion of the brake hose is provided between the link mechanism 5 and the front portion 22A of the front cover.

Figure 10:
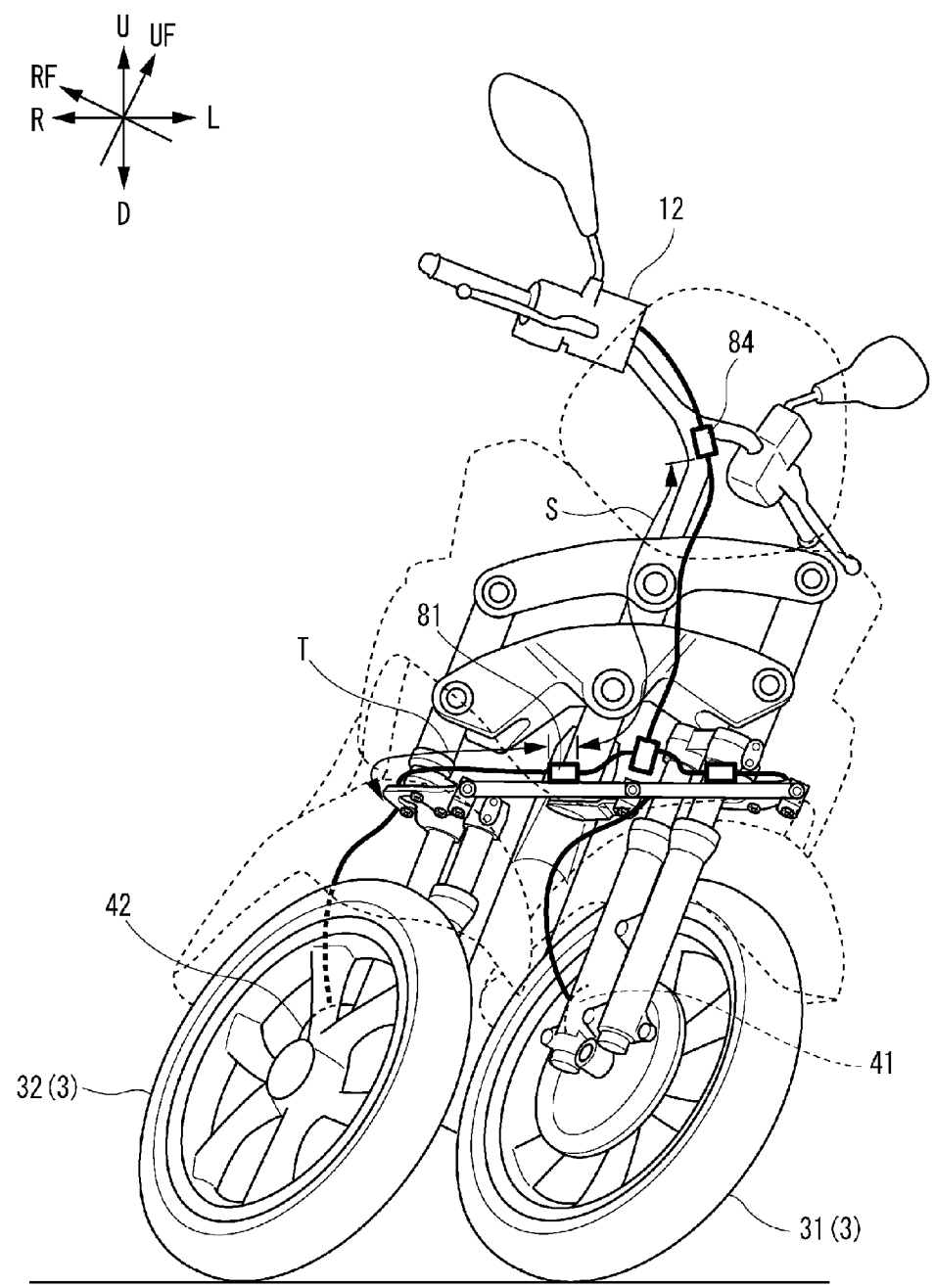
FIG. 10 is a front view of the vehicle showing a state in which the vehicle is caused to lean and front wheels are turned.

FIG. 10 is a front view of the vehicle 1 showing a state in which the vehicle 1 is caused to lean and front wheels 3 are turned. As described above, the upstream end of the brake hose is fixed to the master cylinder 12 that is fixed to the handlebar 23, and downstream ends of the brake hose are fixed to the right brake caliper 42 and the left brake caliper 41.

When the vehicle 1 is caused to lean as shown in FIG. 10 from the upright state shown in FIG. 7, the relative positions of the master cylinder 12 and the right brake caliper 42 and the relative positions of the master cylinder 12 and the left brake caliper 41 change. The brake hose includes leaning associated deforming portions S that deform in response to the leaning of the body frame 21. The leaning associated deforming portions S deflect, bend, or twist when the vehicle 1 is caused to lean.

When the front wheels 3 are turned as shown in FIG. 10 from the upright state shown in FIG. 7, the relative positions of the master cylinder 12 and the right brake caliper 42 and the relative positions of the master cylinder 12 and the left brake caliper 41 change. Because of this, the brake hose includes wheel turning associated deforming portions T that deform in response to the turning of the right front wheel 32 and the left front wheel 31 so as to maintain the connection of the master cylinder 12 with the brake calipers 41, 42 even though those relative positions change. The wheel turning associated portions T also deflect, bend, or twist when the front wheels 3 are turned.

When the vehicle 1 is caused to lean and the front wheels 3 are turned in the manner described above, the link mechanism 5, the tie-rod 67, the left shock absorber 33, the right shock absorber 34, the front wheels 3 and the like are displaced relative to one another with respect to the steering shaft 60. The brake hose needs to deform so as to follow the relative displacements of those constituent members while avoiding the interference thereof with those members.

While the vehicle 1 and the front wheels 3 are shown as being caused to lean and turned, respectively, in FIG. 10, to facilitate the understanding of deformations of the deforming portions, the leaning of the vehicle 1 and the turning of the front wheels 3 will be described separately.

Figure 11:
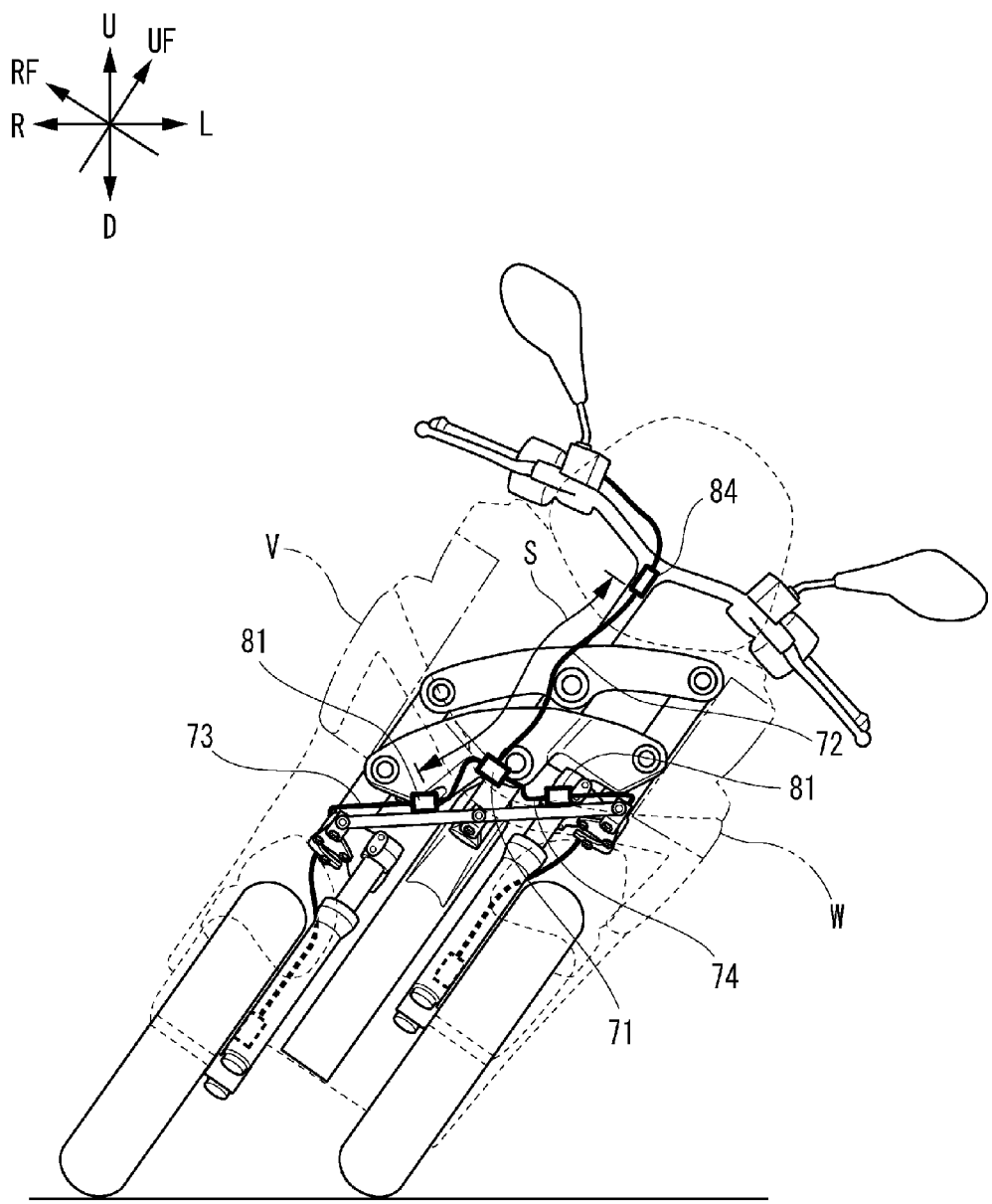
FIG. 11 is a front view of the vehicle showing a state in which the vehicle is caused to lean.
Figure 12:
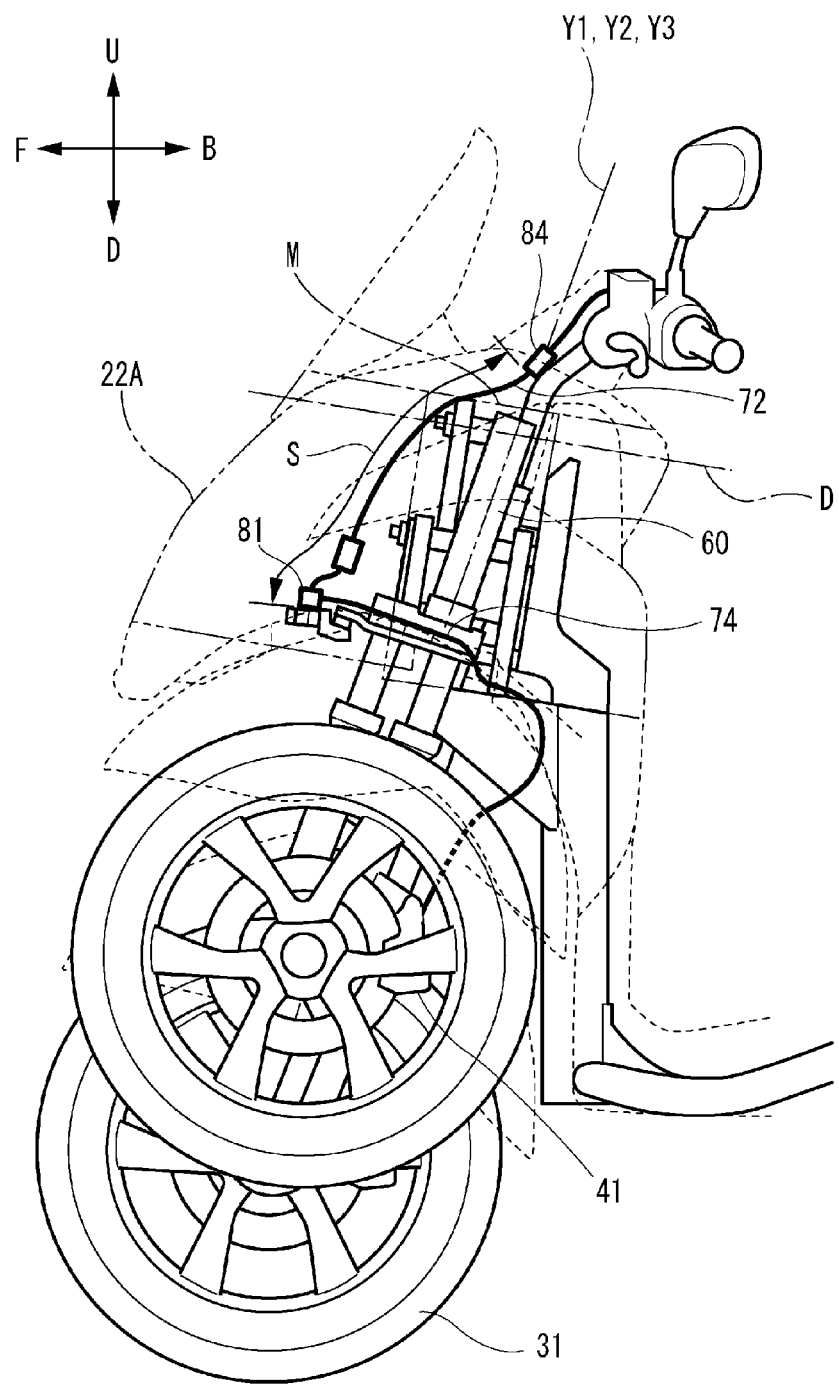
FIG. 12 is a side view of the vehicle shown in FIG. 11.

Firstly, with reference to FIGS. 11 and 12, the leaning associated deforming portion S will be described. FIG. 11 is a front view of the vehicle 1 showing a state in which the vehicle 1 is caused to lean. FIG. 12 is a side view of the vehicle 1 shown in FIG. 11.

In the vehicle 1 of this preferred embodiment, the brake hose that extends between the fourth restrictor 84 and the first restrictors 81 define the leaning associated deforming portions S. When the vehicle 1 is caused to lean as shown in FIG. 11 from the upright state shown in FIG. 7, the left first restrictor 81 moves towards the fourth restrictor 84, while the right first restrictor 81 moves away from the fourth restrictor 84. The leaning associated deforming portions S deform to follow the changes in the relative positions of the fourth restrictor 84 and the first restrictors 81. In the vehicle 1 in the upright state, the leaning associated deforming portions S are positioned at least partially between a front surface of the link mechanism 5 and the outer surface covering portion 22A of the front cover 221.

More specifically, when the vehicle 1 is caused to lean to the left, a left leaning associated deforming portion S deforms so that an angle defined by the upstream side brake hose 72 that extends in the up-to-bottom direction and the left downstream side brake hose 74 that extends in the left-and-right direction becomes small. Additionally, a right leaning associated deforming portion S deforms so that an angle defined by the upstream side brake hose 72 that extends in the up-to-bottom direction and the right downstream side brake hose 73 that extends in the left-and-right direction becomes large.

In this way, the leaning associated deforming portions S deform mainly in the left-and-right direction of the body frame 21. The link mechanism 5 also operates in the left-and-right direction when the vehicle 1 is caused to lean. When the vehicle 1 is caused to lean, the leaning associated deforming portions S and the link mechanism 5 deform in the same direction, and the leaning associated deforming portions S are positioned at least partially directly ahead of the link mechanism 5. Because of this, when the leaning associated deforming portions S deform, the leaning associated deforming portions S are prevented from interfering with the link mechanism 5.

Although the leaning associated deforming portions S also deform slightly in the front-and-rear direction when the vehicle 1 is caused to lean, the change in shape of posture in the front-and-rear direction is produced in association with the deformations in the left-and-right direction, and the quantity of change is extremely small. Because of this, even though the vehicle 1 is caused to lean, as shown in FIGS. 8 and 12, the brake hose changes its posture little when the vehicle 1 is seen from the side thereof. Similarly, the brake hose changes its posture little when the vehicle 1 is seen from thereabove.

Figure 13:
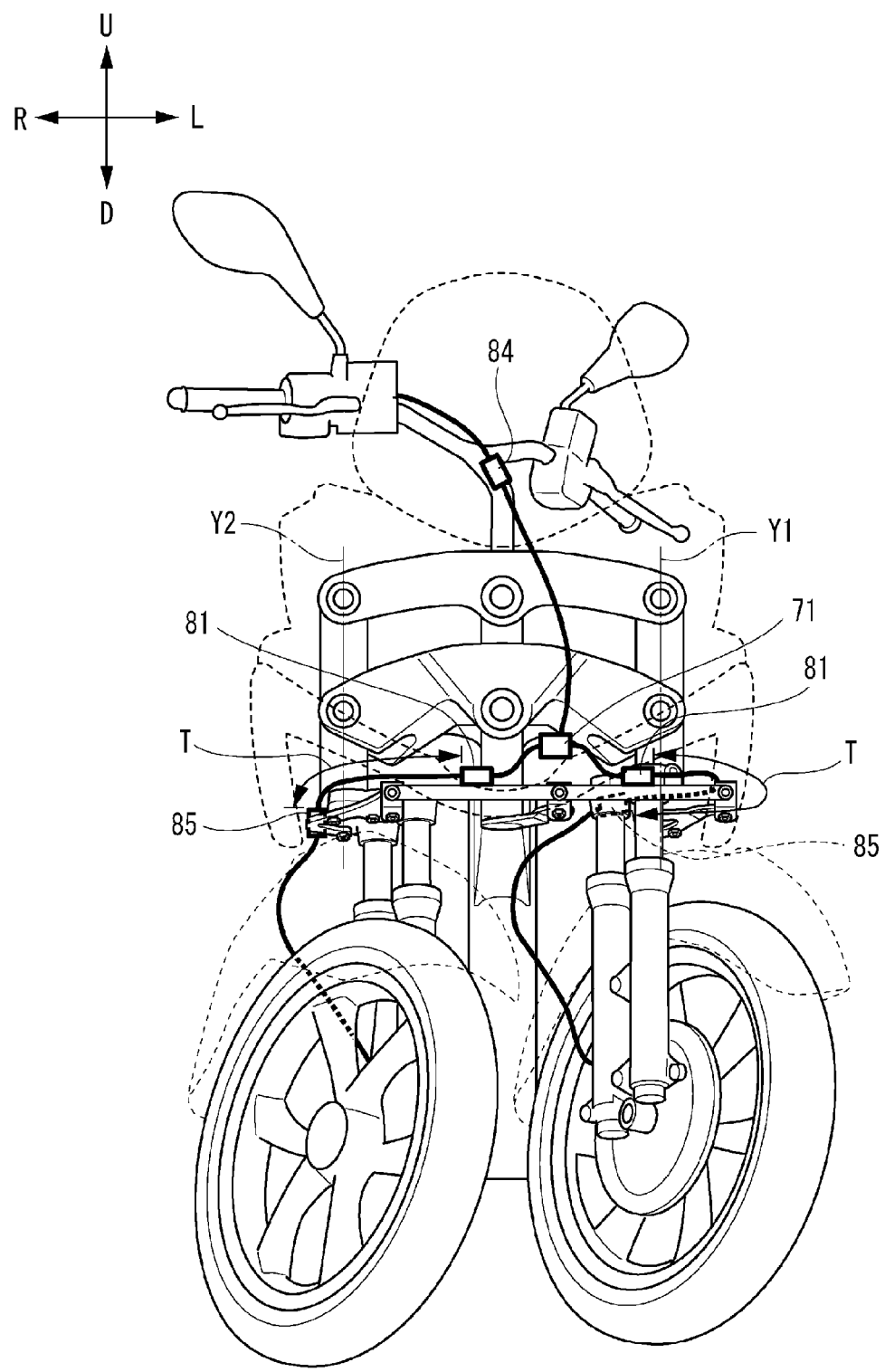
FIG. 13 is a front view of the vehicle showing a state in which the front wheels are turned.
Figure 14:
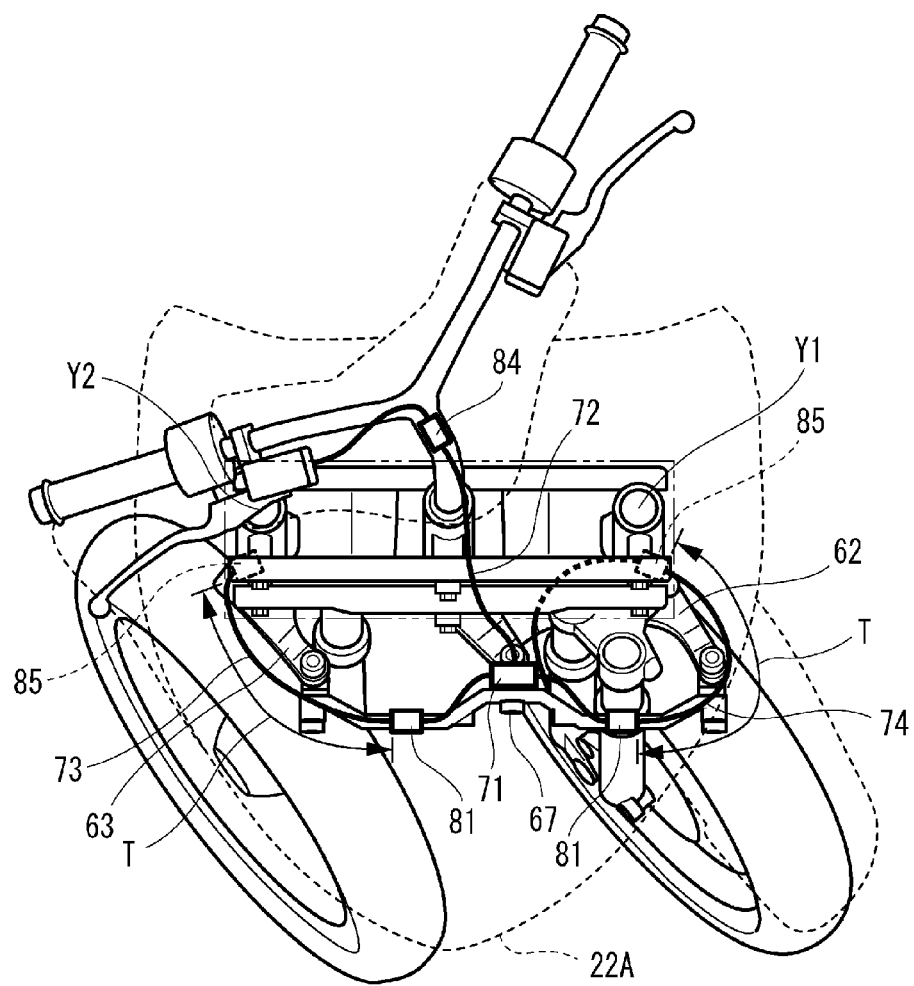
FIG. 14 is a plan view of the vehicle shown in FIG. 13.

Next, using FIGS. 13 and 14, the wheel turning associated deforming portion T will be described. FIG. 13 is a front view of the vehicle 1 showing a state in which the front wheels 3 are turned. FIG. 14 is a plan view of the vehicle 1 shown in FIG. 13.

In the vehicle 1 of this preferred embodiment, the brake hose portions that extend between the first restrictors 81 and the fifth restrictors 85 define the wheel turning associated deforming portions T. When the front wheels 3 are turned to the left from the upright state shown in FIG. 7 so that the travelling direction of the vehicle 1 is directed to the left as shown in FIG. 13, the brake hose portions that extend between the first restrictors 81 and the fifth restrictors 85 deform as shown in FIGS. 13 and 14.

More specifically, as shown in FIG. 14, a right wheel turning associated deforming portion T is bent so that an angle defined by the portion that extends to the right along the tie-rod 67 and the portion that extends to the rear along the third transmission plate 63 becomes large. Additionally, a left wheel turning associated deforming portion T is bent so that an angle defined by the portion that extends to the left along the tie-rod 67 and the portion that extends to the rear along the second transmission plate 62 becomes small.

Namely, the wheel turning associated deforming portions T deform in a plane that is perpendicular or substantially perpendicular to the left steering axis Y1 and the right steering axis Y2. The left front wheel 31 and the right front wheel 32 are also turned in the plane that is perpendicular or substantially perpendicular to the left steering axis Y1 and the right steering axis Y2. Because of this, even though the wheel turning associated portions T deform, the wheel turning associated portions T are prevented from interfering with the left front wheel 31, the right front wheel 32, and the left shock absorber 33, and the right shock absorber 34 that move together with the left front wheel 31 and the right front wheel 32, respectively.

Additionally, the wheel turning associated deforming portions T are positioned above the tie-rod 67 that is positioned above the front wheels 3. Because of this, even though the front wheels 3 are turned, the front wheels 3 do not interfere with the corresponding wheel turning associated deforming portions T.

In this preferred embodiment, a portion of the right downstream side brake hose 73 that extends between the fifth restrictor 85 and the right brake caliper 42 and a portion of the left downstream side brake hose 74 that extends between the fifth restrictor 85 and the left brake caliper 41 define suspension device moving associated deforming portions that deform in response to the moving of the left shock absorber 33 and the right shock absorber 34. When the right shock absorber 34 and the left shock absorber 33 are activated to operate, extending a relative distance between the right wheel axle 324 (refer to FIG. 7) of the right front wheel 32 and the fifth restrictor 85 and a relative distance between the left wheel axle 314 (refer to FIG. 7) of the left front wheel 31 and the fifth restrictor 85 long, the suspension device moving associated deforming portions deform into the shape of a straight line. In addition, when the relative distance between the right wheel axle 324 of the right front wheel 34 and the fifth restrictor 85 and the relative distance between the left wheel axle 314 of the left front wheel 31 and the fifth restrictor 85 become short, the suspension device moving associated deforming portions are bent to the rear so that their radius of curvature becomes small. This prevents the suspension device moving associated portions from interfering with the right shock absorber 34 and the left shock absorber 33.

Incidentally, when the link mechanism 5 is activated to operate, the upper cross portion 51, the lower cross portion 52, the right side portion 54, and the left side portion 53 turn individually about the axes that extend in the front-and-rear direction relative to the body frame 21 and body portions that are fixed to the body frame 21. Because of this, a space is provided between the link mechanism 5 and the body frame 21 and the body portions so as to avoid the interference therebetween to secure the space that permits the operation of the link mechanism 5. The space secured to avoid the interference of the link mechanism 5 with the body frame 21 and the body portions is the space where it is desirable that no additional member is disposed. Thus, it is undesirable to attempt to dispose the deforming portions of the brake hose in these spaces.

In the vehicles of U.S. Design Pat. No. 547,242 and Catalogo parti di ricambio, MP3 300 ie LT Mod. ZAPM64102, Piaggio, the deforming portions of the brake hose are located directly above the upper cross portion. Because of this, the brake hose is laid out compactly.

In the vehicles of U.S. Design Pat. No. 547,242 and Catalogo parti di ricambio, MP3 300 ie LT Mod. ZAPM64102, Piaggio, however, although the brake hose itself is laid out compactly, the front portion of the vehicle is enlarged.

The inventor studied in detail the movement of the brake controlling operation transmission member and the operation of the link mechanism 5 with an intent to find out another method of avoiding the interference of the brake controlling operation transmission member such as the brake hose with the link mechanism 5.

The link mechanism 5 includes the right side portion 54, the left side portion 53, the upper cross portion 51, and the lower cross portion 52.

The right side portion 54 supports an upper portion of the right shock absorber 34 so as to turn about a right steering axis Y2 that extends in the up-and-down direction of the body frame 21.

The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn about the upper right axis E that extends in the front-and-rear direction of the body frame 21 and supports the upper portion of the left side portion 53 at the left end portion thereof so as to turn about the upper left axis D that is parallel to the upper right axis E and is supported on the body frame 21 at the middle portion thereof so as to turn about the upper middle axis C that is parallel to the upper right axis E and the upper left axis D.

The lower cross portion 52 supports the lower portion of the right side portion 54 at the right end portion thereof so as to turn about the lower right axis H that is parallel to the upper right axis E and supports the lower portion of the left side portion 53 at the left end portion thereof so as to turn about the lower left axis G that is parallel to the upper left axis D and is supported on the body frame 21 at the middle portion thereof so as to turn about the lower middle axis F that is parallel to the upper middle axis C.

Because of this, when the link mechanism 5 is activated to operate, although the upper cross portion 51, the lower cross portion 52, the right side portion 54, and the left side portion 53 are displaced largely in the up-and-down direction of the body frame 21, they are not displaced largely in the left-and-right direction of the body frame 21. Namely, the inventor discovered that the link mechanism 5 does not move largely in the front-and-rear and left-and-right directions of the body frame 21 when the link mechanism 5 is activated to operate. Additionally, the inventor discovered that the constituent members of the link mechanism 5 are displaced only a little to the front, rear, right, and left of the outer peripheral surface of the link mechanism 5 excluding the upper surface and the lower surface thereof even though the link mechanism 5 is activated to operate.

In addition, the leaning associated deforming portions S are located between the portions of the brake controlling operation transmission member that are fixed to two points (for example, one point on the steering shaft 60 and one point on the tie-rod 67) that are displaced relatively as the link mechanism 5 operates. The portion that deforms when the relative positions of the two points change largely in the up-and-down direction of the body frame 21 defines the leaning associated deforming portions S. Since the link mechanism 5 turns about the axes that extend in the front-and-rear direction, although the leaning associated deforming portions S change their postures largely in the up-and-down direction of the body frame 21, the leaning associated deforming portions S do not have to change largely and change their postures only a little in the directions other than the up-and-down direction. In this preferred embodiment, the brake controlling operation transmission member deforms along the plane that is perpendicular or substantially perpendicular to the front-and-rear direction when the distance defined between the two points is narrowed in the up-and-down direction of the body frame 21, so that the leaning associated deforming portions S are allowed to change their postures a little in the front-and-rear direction.

The inventor conceived, based on the knowledge obtained as explained above, a layout in which the brake controlling operation transmission member and the link mechanism 5 are positively aligned close to each other so as to prevent interference of the brake controlling operation transmission member with the link mechanism 5.

According to a preferred embodiment of the present invention, the body cover 22 includes the outer surface covering portion 22A that covers at least a portion of the outer peripheral surface of the link mechanism 5 excluding the upper surface and the lower surface thereof. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5, excluding the upper surface and the lower surface thereof, and the outer surface covering portion 22A.

As described above, when the link mechanism 5 is activated to operate, the link mechanism 5 changes its posture largely in the up-and-down direction but does not change its posture largely in the left-and-right and front-and-rear directions of the body frame 21, and the leaning associated deforming portions S also change their postures largely in the up-and-down direction but do not change their postures largely in the left-and-right and front-and-rear directions. Namely, when the link mechanism 5 is activated to operate, since the link mechanism 5 and the leaning associated deforming portions S tend to change their postures in similar directions, even though the leaning associated deforming portions S are disposed between the outer peripheral surface of the link mechanism 5, excluding the upper surface and the lower surface thereof, and the outer surface covering portion 22A, it is easy to prevent the interference of the link mechanism 5 with the leaning associated deforming portions S. That the link mechanism and the leaning associated deforming portion tend to change their postures in similar directions means that the directions in which the link mechanism and the leaning associated deforming portion change their postures largely and the directions in which they change their postures minimally are similar and that the timings at which the link mechanism and the leaning associated deforming portion change their postures are similar. Additionally, since both the link mechanism 5 and the leaning associated deforming portions S change their postures largely in the up-and-down direction of the body frame 21, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5, excluding the upper surface and the lower surface thereof, where the constituent members of the link mechanism 5 are displaced only a little even when the link mechanism 5 is activated to operate and the outer surface covering portion 22A, even though the link mechanism 5 and the leaning associated deforming portions S are disposed near to each other, they are prevented from interfering with each other, so that enlargement of the front portion of the vehicle is prevented.

This provides the vehicle 1 including the body frame 21 that leans and the two front wheels 3 in which enlargement of the front portion thereof is prevented, while ensuring the degree of freedom in designing the shock absorbers 33, 34 and the front wheels 3.

In addition, in the vehicle 1 according to this preferred embodiment, the leaning associated deforming portions S deform at least along a plane that is perpendicular or substantially perpendicular to the front-and-rear direction of the body frame 21 in response to the leaning of the body frame 21.

As described above, since the constituent members of the link mechanism 5 turn about the axes that extend in the front-and-rear direction of the body frame 21, although the constituent members of the link mechanism 5 are displaced largely in the up-and-down direction, the constituent members are not displaced largely in the front-and-rear direction. Then, in the event that the leaning associated deforming portions are deformed along the plane that is perpendicular or substantially perpendicular to the front-and-rear direction of the body frame 21, the leaning associated deforming portions S change their postures only a little in the front-and-rear direction. Since the link mechanism 5 and the leaning associated deforming portions S tend to change their postures in similar directions, the interference of the link mechanism 5 with the leaning associated deforming portions S is prevented more easily. Namely, although the leaning associated deforming portions S are provided, the expansion of the space provided to permit the operation of the link mechanism 5 is prevented.

In addition, in the vehicle 1 according to this preferred embodiment, the outer surface covering portion 22A is provided directly ahead of or directly behind the outer peripheral surface of the link mechanism 5 excluding the upper surface and the lower surface thereof.

As described above, when the body frame 21 leans to activate the link mechanism 5 to operate, the constituent members of the link mechanism 5 turn about the axes that extend in the front-and-rear direction of the body frame 21. Because of this, even though the link mechanism 5 is activated to operate, the link mechanism 5 is not displaced largely in the front-and-rear direction of the body frame 21. Then, in the event that the outer surface covering portion 22A is provided directly ahead of or directly behind the outer peripheral surface of the link mechanism 5 and at least portions of the leaning associated deforming portions S are positioned between the outer surface covering portion 22A and the front surface or the rear surface of the link mechanism 5, the leaning associated deforming portions S are provided in a location close to the link mechanism 5 while avoiding the interference of the link mechanism 5 with the leaning associated deforming portions S. Because of this, even though the leaning associated deforming portions S are provided, an enlargement in the size of the vehicle 1 is prevented.

In addition, in the vehicle 1 according to this preferred embodiment, at least portions of the leaning associated deforming portions S are positioned between the right side portion 54 and the left side portion 53 when viewed from the direction of the upper middle axis C.

The leaning associated deforming portions S do not project or only minimally project farther rightwards than the right side portion 54 and farther leftwards than the left side portion 53 in relation to the left-and-right direction of the body frame 21, and hence, the vehicle 1 is compact in relation to the left-and-right direction of the body frame 21.

Additionally, the vehicle 1 according to this preferred embodiment includes the steering shaft 60 that is supported on the body frame 21 between the right shock absorber 34 and the left shock absorber 33 in the left-and-right direction of the body frame 21 and that turns about the middle steering axis Y3 that extends in the up-and-down direction of the body frame 21, the handlebar 23 that is provided at an upper portion of the steering shaft 60 and the wheel turning operation transmission mechanism 6 that turns the right shock absorber 34 about the right steering axis Y2 and turns the left shock absorber 33 about the left steering axis Y1 in association with the turning of the steering shaft 60 that occurs in response to the operation of the handlebar 23. The right front wheel 32 and the left front wheel 31 are caused to turn by the wheel turning operation transmission mechanism 6.

The brake controlling operation transmission member includes the wheel turning associated portions T that deform in response to the turning of the right front wheel 32 and the left front wheel 31, at least portions of which are disposed below the lower cross portion 52.

The wheel turning associated deforming portions T are each defined between the portions of the brake controlling operation transmission member that are fixed to two points (for example, one point on the tie-rod 67 and one point on the lower portion of the right side portion 54) that are displaced relative to each other in association with the turning of the right front wheel 32 and the left front wheel 31. Since the right front wheel 32 turns about the right steering axis Y2, and the left front wheel 31 turns about the left steering axis Y1, the wheel turning associated deforming portions T also deform largely when the relative positions of the two points change largely in relation to the front-and-rear or left-and-right direction of the body frame 21. Because of this, the wheel turning associated deforming portions T have to change postures largely in the front-and-rear or left-and-right direction of the body frame 21 but change their postures only a little in the up-and-down direction. In this preferred embodiment, when the distance between the two points in the left-and-right direction or the distance between the two points in the front-and-rear direction is small, the wheel turning associated deforming portions T change their postures in the up-and-down direction because the brake controlling operation transmission member is deformed along the plane that is perpendicular or substantially perpendicular to the up-and-down direction of the body frame 21.

On the other hand, as described above, the leaning associated deforming portions S change their postures largely in the up-and-down direction of the body frame 21 but change their postures only a little in the directions other than the up-and-down direction. Because of this, by separating the leaning associated deforming portions S from the wheel turning associated deforming portions T, the leaning associated deforming portions S deform only a little in the directions other than the up-and-down direction of the body frame 21, and the wheel turning associated deforming portions T deform only a little in the up-and-down direction.

Further, the right front wheel 32 turns about the right steering axis Y2 that extends in the up-and-down direction. The left front wheel 31 turns about the left steering axis Y1 that extends in the up-and-down direction of the body frame 21. Then, the space is secured below the lower cross portion 52 to prevent the interference of the lower cross portion 52 with the right front wheel 32 and the right shock absorber 34 that supports the right front wheel 32, and the left front wheel 31 and the left shock absorber 33 that supports the left front wheel 31. The right front wheel 32 and the left front wheel 31 move largely in the front-and-rear or left-and-right direction of the body frame 21 relative to the link mechanism 5 but do not move largely in the up-and-down direction relative to the link mechanism 5.

In this way, the wheel turning associated deforming portion T and the right front wheel 32 or the left front wheel 31 are also displaced largely in the front-and-rear direction or the left-and-right direction of the body frame 21 relative to the link mechanism 5 but are not displaced largely in the up-and-down direction. Namely, the wheel turning associated deforming portion T and the right front wheel 32 or the left front wheel 31 tend to change their postures in similar directions. Because of this, even though at least a portion of the wheel turning associated deforming portion T is provided below the lower cross portion 52, it is easy to prevent the interference of the wheel turning associated deforming portion T with the right front wheel 32 or the left front wheel 31. In this way, it is possible to provide the wheel turning associated deforming portion T by using the space provided to permit the displacement of the right front wheel 32 or the left front wheel 31. In other words, even though the wheel turning associated deforming portion T is provided, the expansion of the space provided to permit the displacement of the right member or the left member is prevented.

In addition, the vehicle 1 according to this preferred embodiment includes the steering shaft 60 that is supported on the body frame 21 between the right shock absorber 34 and the left shock absorber 33 in the left-and-right direction of the body frame 21 and that turns about the middle steering axis Y3 that extends in the up-and-down direction of the body frame 21, and the fourth restrictor 84 that prevents the movement of the brake controlling operation transmission member is provided on the steering shaft 60 or a member that moves together with the steering shaft 60.

When the steering shaft 60 is turned about the middle steering axis Y3, the right front wheel 32 and the left front wheel 31 are turned. The wheel turning associated deforming portions T are easily deformed in response to the turning of the right front wheel 32 and the left front wheel 31 by the fourth restrictor 84 that is provided on the steering shaft 60 or the member that moves together with the steering shaft 60. This easily prevents the interference of the right front wheel 32 and the left front wheel 31 with the wheel turning associated deforming portions T. Namely, even though the wheel turning associated deforming portions T are provided, the expansion of the space that permits the turning of the right front wheel 32 and the left front wheel 31 is prevented.

Thus, while the present invention has been described based on the vehicle 1 according to a first preferred embodiment, the position where the brake hose is disposed is not limited to the first preferred embodiment described above. Second to fifth preferred embodiments of the present invention will be described in which a brake hose is disposed in different positions. Vehicles 1 according to the second to fifth preferred embodiments differ from the vehicle 1 according to the first preferred embodiment described above in the position where the brake hose is disposed. Then, only those differences will be described, and like reference numerals will be given to like members to those of the first preferred embodiment, so that the description of the like members will be omitted here.

Second Preferred Embodiment

Figure 15:
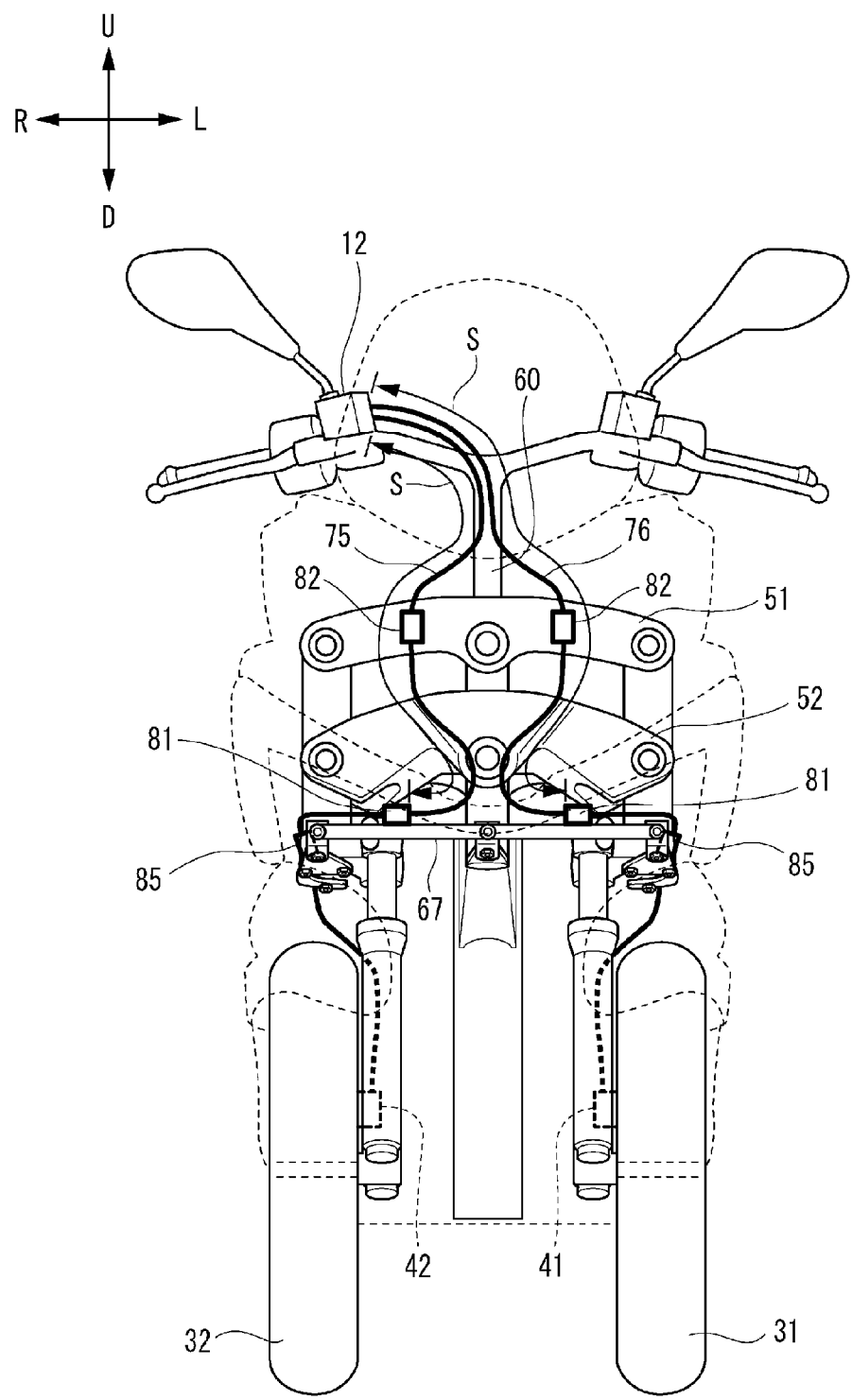
FIG. 15 is a front view of a vehicle according to a second preferred embodiment of the present invention in the upright state.
Figure 16:
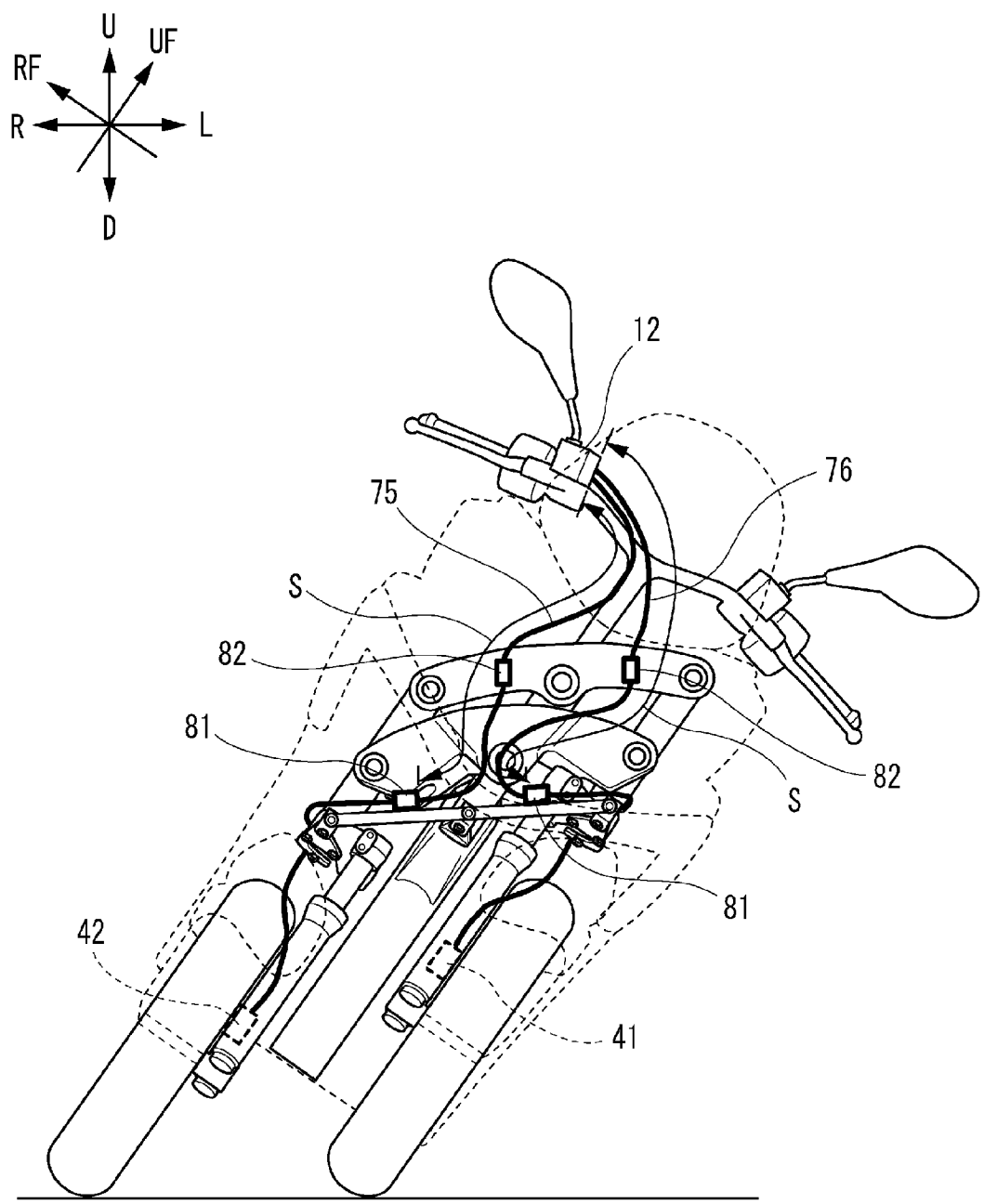
FIG. 16 is a front view of the vehicle shown in FIG. 15 which shows a state in which the vehicle is caused to lean.
Figure 17:
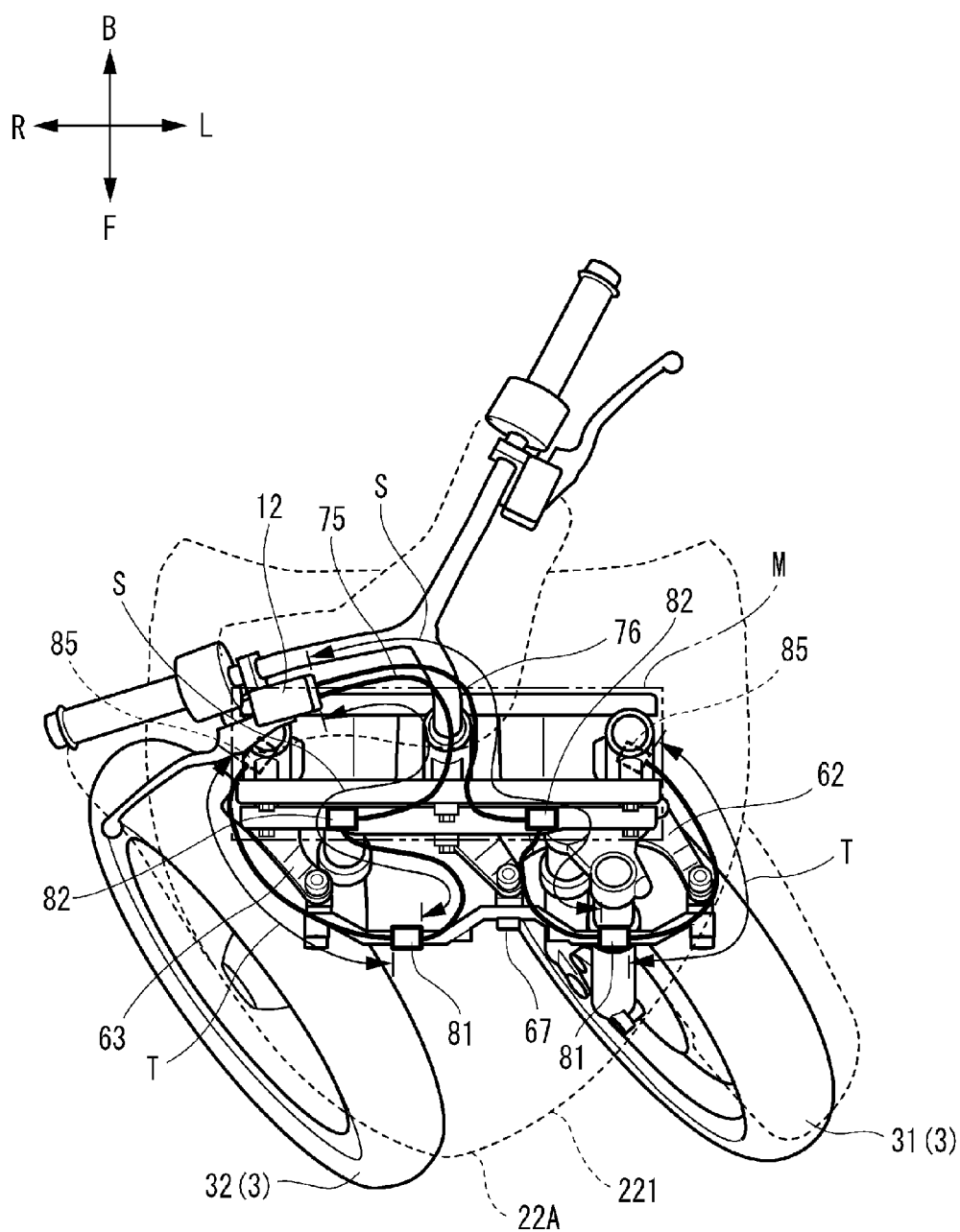
FIG. 17 is a plan view of the vehicle shown in FIG. 15 which shows a state in which front wheels are turned.

Firstly, with reference to FIGS. 15 to 17, a vehicle 1 according to a second preferred embodiment of the present invention will be described. FIG. 15 is a front view of a vehicle 1 according to the second preferred embodiment of the present invention in the upright state. FIG. 16 is a front view of the vehicle 1 shown in FIG. 15 which shows a state in which the vehicle 1 is caused to lean. FIG. 17 is a plan view of the vehicle 1 shown in FIG. 15 which shows a state in which front wheels 3 are turned.

As shown in FIG. 15, a right brake hose 75 and a left brake hose 76 are connected to a master cylinder 12. The right brake hose 75 connects the master cylinder 12 to a right brake caliper 42. The left brake hose 76 connects the master cylinder 12 to a left brake caliper 41. In this preferred embodiment, the brake hoses 75, 76 are prevented from moving by first restrictors 81, second restrictors 82, and fifth restrictors 85.

The right brake hose 75 and the left brake hose 76 are prevented from moving by the second restrictors 82 that are fixed to an upper cross portion 51. Further, the right brake hose 75 and the left brake hose 76 are prevented from moving by the first restrictors 81 that are fixed to a tie-rod 67 downstream of the second restrictors 82. Similarly to the first preferred embodiment, the right brake hose 75 and the left brake hose 76 are prevented from moving by the fifth restrictors 85 that are provided on a second transmission plate 62 and a third transmission plate 63 downstream of the first restrictors 81.

In this preferred embodiment, leaning associated deforming portions S are defined between the master cylinder 12 and the first restrictors 81 along the brake hoses 75, 76. The leaning associated deforming portion S of the right brake hose 75 that extends between the second restrictor 82 and the first restrictor 81 is bent so as to project to the left. The leaning associated deforming portion S of the left brake hose 76 that extends between the second restrictor 82 and the first restrictor 81 is bent so as to project to the right.

When the vehicle 1 is caused to lean as shown in FIG. 16, the upper cross portion 51 and the tie-rod 67 move relatively with respect to a steering shaft 60. This changes the relative positions of the master cylinder 12 and the first restrictors 81, so that the leaning associated deforming portions S are caused to deform.

More specifically, when the vehicle 1 is caused to lean as shown in FIG. 16, a distance between the master cylinder 12 and the first restrictor 81 of the right brake hose 75 extends. This causes the leaning associated deforming portion S of the right brake hose 75 to deform into a straight line. Additionally, when the vehicle 1 is caused to lean to the left, a distance between the master cylinder 12 and the first restrictor 81 of the left brake hose 76 shortens. This causes the left brake hose 76 of the brake hose 76 that is being bent to deform to be bent further. In this way, the leaning associated deforming portions S deform in a left-and-right direction to prevent the interference of the leaning associated deforming portions S with a link mechanism 5.

In this preferred embodiment, wheel turning associated deforming portions T correspond to portions that are defined between the first restrictors 81 and the fifth restrictors 85. When front wheels 3 are turned as shown in FIG. 17, the relative positions of the first restrictors 81 and the fifth restrictors 85 change. Then, similarly to the first preferred embodiment, the right brake hose 75 bends so that an angle defined by a portion that extends to the right along the tie-rod 67 and a portion that extends to the rear along the third transmission plate 63 changes. Additionally, the left brake hose 76 bends so that an angle defined by a portion that extends to the left along the tie-rod 67 and a portion that extends to the rear along the second transmission plate 62 changes.

In the vehicle 1 of this preferred embodiment, too, a body cover 22 includes an outer surface covering portion 22A (a portion of a front portion of a front cover 221 that is positioned directly ahead of the link mechanism 5) that covers at least a portion of an outer peripheral surface of the link mechanism 5 excluding an upper surface and a lower surface thereof, as shown in FIG. 17. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5 excluding the upper surface and the lower surface thereof and the outer surface covering portion 22A.

Similarly to the first preferred embodiment, the link mechanism 5 and the leaning associated deforming portions S tend to change their shapes or postures in similar directions when the link mechanism 5 is activated to operate, and therefore, even though the leaning associated deforming portions S are disposed between the outer peripheral surface of the link mechanism 5 excluding the upper surface and the lower surface thereof and the outer surface covering portion 22A, the interference of the link mechanism 5 with the leaning associated deforming portions S is easily prevented. In addition, since the link mechanism 5 and the leaning associated deforming portions S both change their postures largely in an up-and-down direction, the leaning associated deforming portions S is provided using a space provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5 excluding the upper surface and the lower surface thereof to which the constituent members of the link mechanism 5 do not project or only minimally project even when the link mechanism 5 is activated to operate and the outer surface covering portion 22A, even though the link mechanism 5 and the leaning associated deforming portions S are disposed close to each other, they are prevented from interfering with each other, so that enlargement of the front portion of the vehicle is prevented.

This provides the vehicle 1 including a body frame 21 that leans and the two front wheels 3 in which enlargement of the front portion thereof is prevented, while ensuring the degree of freedom in designing shock absorbers 33, 34 and the front wheels 3.

In addition, in the vehicle 1 according to this preferred embodiment, the second restrictors 82 that prevent the movement of the brake controlling operation transmission members are provided on the upper cross portion 51 or a lower cross portion 52, and at least portions of the leaning associated deforming portions S are positioned between the second restrictors 82 and the first restrictors 81.

The second restrictors 82 allow the brake controlling operation transmission members to deform together with the upper cross portion 51 or the lower cross portion 52 that turns about the axes that extend in the front-and-rear direction. Because of this, at least the portions of the leaning associated deforming portions S that are positioned between the second restrictors 82 and the first restrictors 81 deform along a plane that is perpendicular or substantially perpendicular to the front-and-rear direction, thus easily preventing interference of the link mechanism 5 with the leaning associated deforming portions S. Namely, although the leaning associated deforming portions S are provided, the expansion of the space provided to permit the operation of the link mechanism 5 is prevented.

Third Preferred Embodiment

Figure 18:
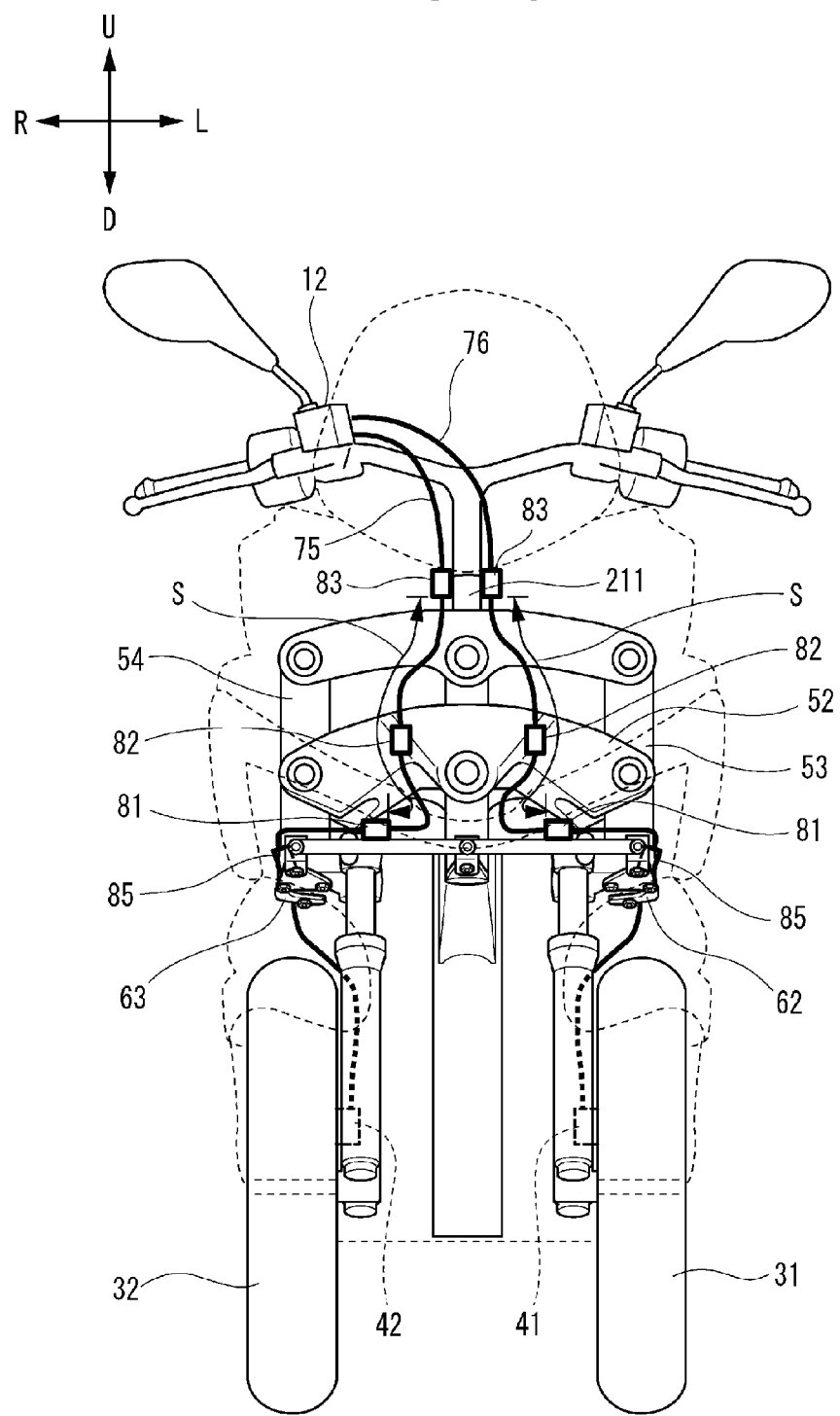
FIG. 18 is a front view of a vehicle according to a third preferred embodiment of the present invention in the upright state.
Figure 19:
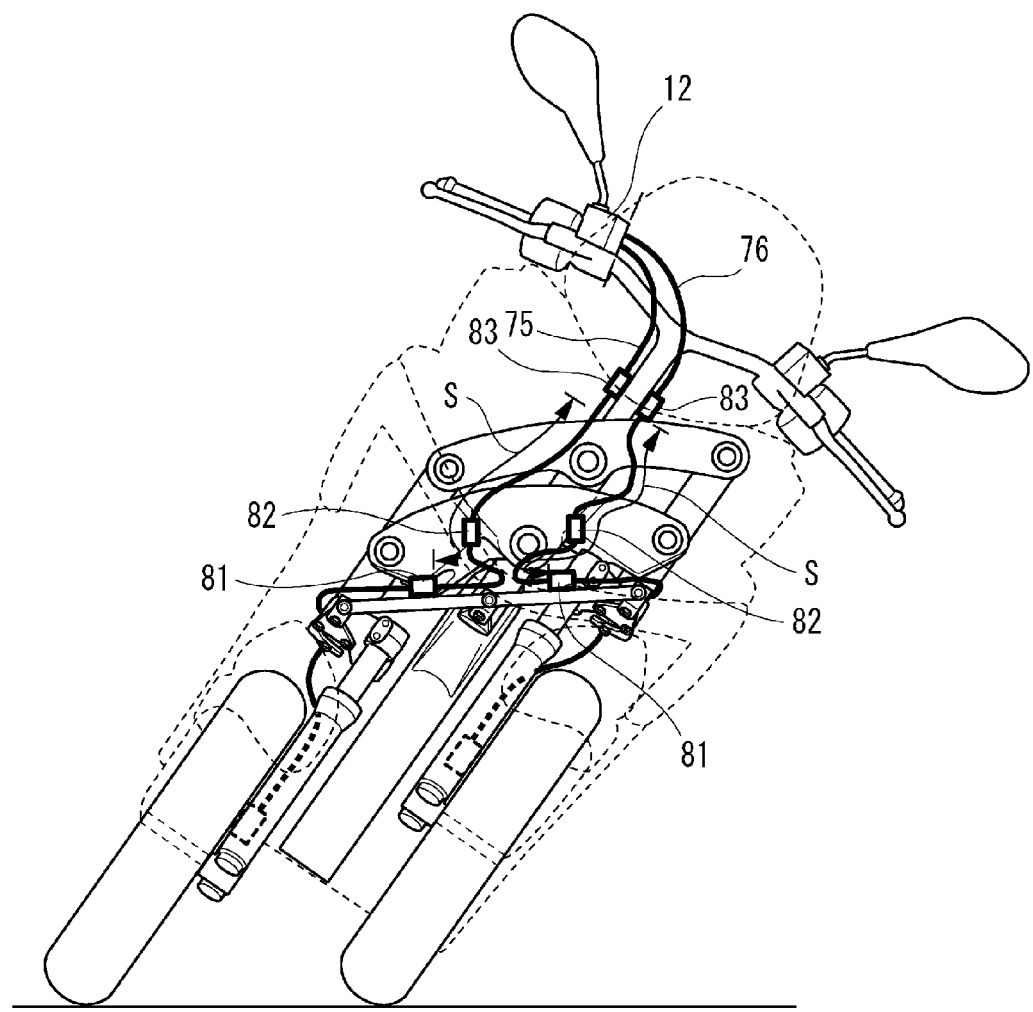
FIG. 19 is a front view of the vehicle shown in FIG. 18 which shows a state in which the vehicle is caused to lean.
Figure 20:
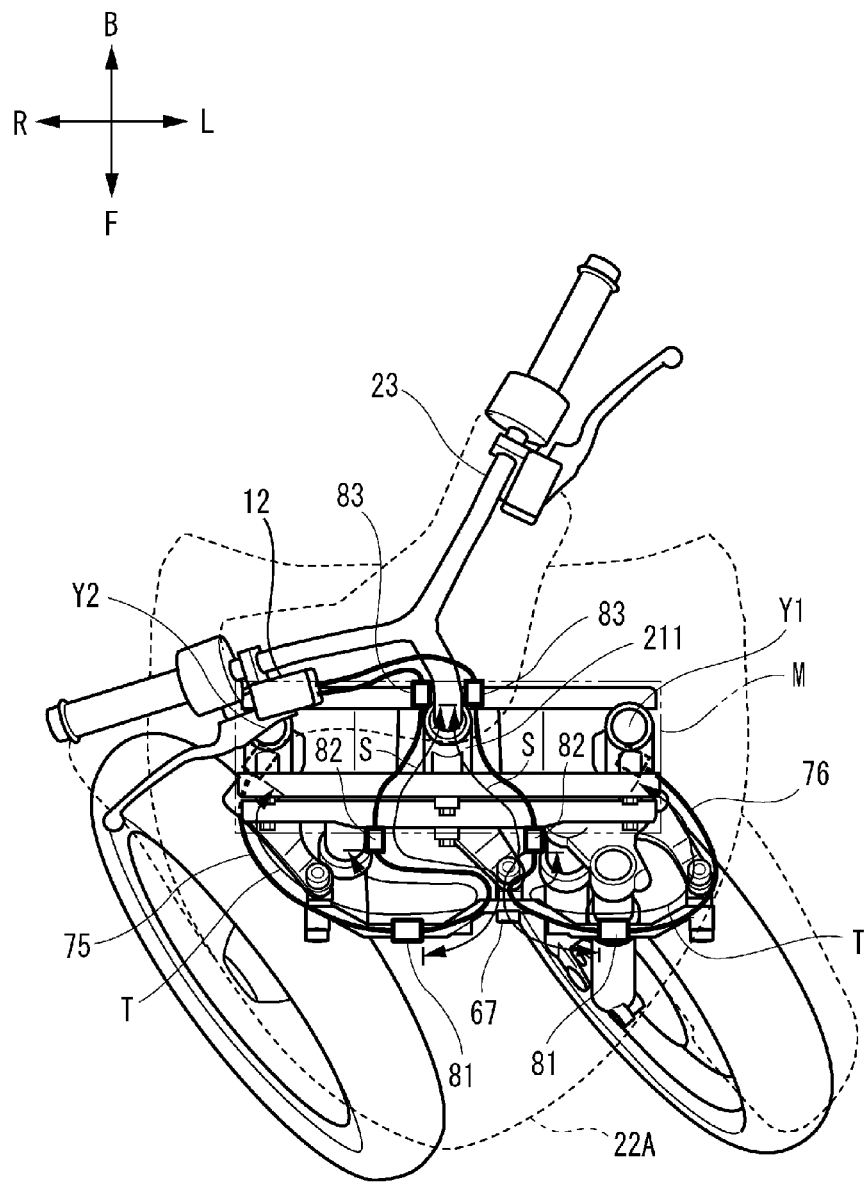
FIG. 20 is a plan view of the vehicle shown in FIG. 18 which shows a state in which front wheels are turned.
Figure 21:
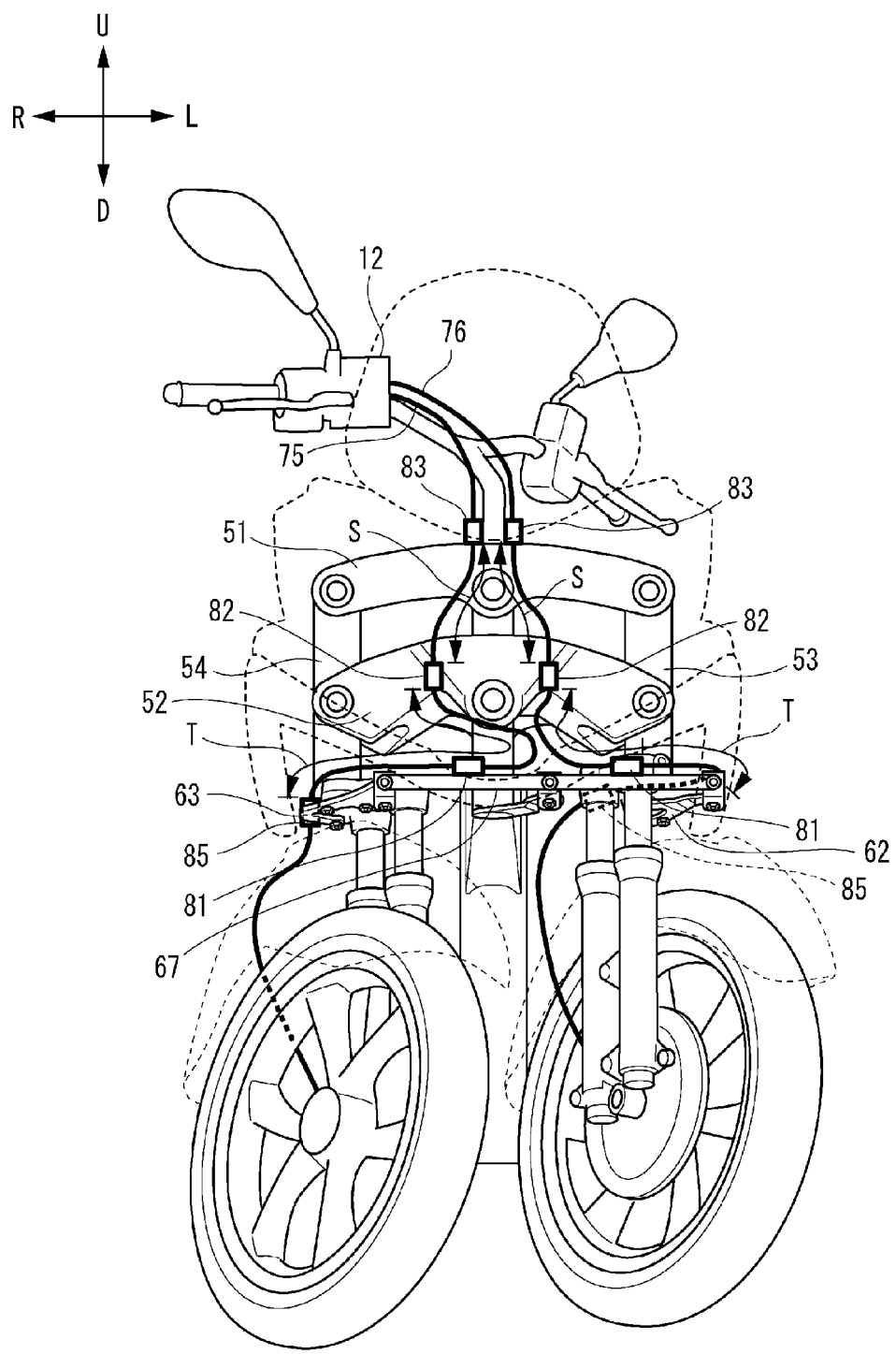
FIG. 21 is a front view of the vehicle shown in FIG. 20.

Next, with reference to FIGS. 18 to 21, a vehicle 1 according to a third preferred embodiment of the present invention will be described. FIG. 18 is a front view of a vehicle 1 according to the third preferred embodiment of the present invention in the upright state. FIG. 19 is a front view of the vehicle 1 shown in FIG. 18 which shows a state in which the vehicle 1 is caused to lean. FIG. 20 is a plan view of the vehicle 1 shown in FIG. 18 which shows a state in which front wheels 3 are turned. FIG. 21 is a front view of the vehicle 1 shown in FIG. 20.

In this preferred embodiment, similarly to the second preferred embodiment, a right brake hose 75 and a left brake hose 76 are connected to a master cylinder 12. In this preferred embodiment, the brake hoses 75, 76 are prevented from moving by first restrictors 81, second restrictors 82, third restrictors 83, and fifth restrictors 85.

The right brake hose 75 and the left brake hose 76 are prevented from moving by the third restrictors 83 that are provided on a headstock 211 downstream of the master cylinder 12.

The right brake hose 75 and the left brake hose 76 are prevented from moving by the second restrictors 82 that are provided on a lower cross portion 52 downstream of the third restrictors 83. The right brake hose 75 and the left brake hose 76 are prevented from moving by the first restrictors 81 that are provided on a tie-rod 67 similarly to the first preferred embodiment downstream of the second restrictors 82.

The right brake hose 75 and the left brake hose 76 are disposed directly ahead of a link mechanism 5 from the third restrictors 83 to the first restrictors 81. The right brake hose 75 and the left brake hose 76 are bent in a left-and-right direction so as to move towards each other from the second restrictors 82 to the first restrictors 81.

Further, downstream of the first restrictors 81, as shown in FIG. 21, the right brake hose 75 is prevented from moving by the fifth restrictor 85 that is provided near a connecting position where a third transmission plate 63 is connected to a right side portion 54. The left brake hose 76 is prevented from moving by the fifth restrictor 85 that is provided near a connecting position where a second transmission plate 62 is connected to a left side portion 53.

In this preferred embodiment, leaning associated deforming portions S correspond to portions of the right brake hose 75 and the left brake hose 76 that extend between the third restrictors 83 and the first restrictors 81. When the vehicle 1 is caused to lean as shown in FIG. 19, the lower cross portion 52 and the tie-rod 67 move relatively with respect to a headstock 211. This changes the relative positions of the third restrictors 83 and the second restrictors 82 and the relative positions of the second restrictors 82 and the first restrictors 81.

More specifically, when the vehicle 1 is caused to lean to the left as shown in FIG. 19, a distance between the third restrictor 83 and the first restrictor 81 on the right brake hose 75 increases. This causes the leaning associated deforming portion S of the right brake hose 75 that is being bent to deform into a straight line. Additionally, when the vehicle 1 is caused to lean to the left, a distance between the third restrictor 83 and the first restrictor 81 on the left brake hose 76 shortens. This causes the leaning associated deforming portion S of the left brake hose 76 that is being bent to deform so that a radius of curvature thereof becomes small.

In this preferred embodiment, wheel turning associated deforming portions T correspond to portions that are defined between the second restrictors 82 and the fifth restrictors 85. When front wheels 3 are turned as shown in FIGS. 20 and 21, the relative positions of the second restrictors 82 and the first restrictors 81 change.

The wheel turning associated deforming portion T of the right brake hose 75 that is defined between the second restrictor 82 and the first restrictor 81 deform so that a bent portion moves to a downstream side. In addition, the wheel turning associated deforming portion T of the left brake hose 76 that is defined between the second restrictor 82 and the first restrictor 81 deform so that a bent portion moves to an upstream side. Further, the wheel turning associated deforming portion T of the right brake hose 75 that is defined between the first restrictor 81 and the fifth restrictor 85 deform so that a radius of curvature thereof becomes large. The wheel turning associated deforming portion T of the left brake hose 76 that is defined between the first restrictor 81 and the fifth restrictor 85 deform so that a radius of curvature thereof becomes small.

In this way, the wheel turning associated deforming portions T deform in a plane that is perpendicular or substantially perpendicular to a left steering axis Y1 and a right steering axis Y2 directly ahead of a link mechanism 5. This prevents the interference of the wheel turning associated deforming portions T with the link mechanism 5 when the front wheels 3 are turned.

Additionally, when a handlebar 23 is turned, the relative positions of the master cylinder 12 and the third restrictors 83 change. Because of this, the portions of the right brake hose 75 and the left brake hose 76 that extend between the master cylinder 12 and the third restrictors 83 deform in response to the turning of the handlebar 23.

In the vehicle 1 of this preferred embodiment, too, a body cover 22 includes an outer surface covering portion 22A (a portion of a front portion of a front cover 221 that is positioned directly ahead of the link mechanism 5) that covers at least a portion of an outer peripheral surface of the link mechanism 5 excluding an upper surface and a lower surface thereof, as shown in FIG. 20. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5 excluding the upper surface and the lower surface thereof and the outer surface covering portion 22A.

Similarly to the first preferred embodiment, the link mechanism 5 and the leaning associated deforming portions S tend to change their shapes or postures in similar directions when the link mechanism 5 is activated to operate, and therefore, even though the leaning associated deforming portions S are disposed between the outer peripheral surface of the link mechanism 5, excluding the upper surface and the lower surface thereof, and the outer surface covering portion 22A, the interference of the link mechanism 5 with the leaning associated deforming portions S is easily prevented. Additionally, since both the link mechanism 5 and the leaning associated deforming portions S change their postures largely in the up-and-down direction of the body frame 21, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5 excluding the upper surface and the lower surface thereof to which the constituent members of the link mechanism 5 do not project or only minimally project even when the link mechanism 5 is activated to operate and the outer surface covering portion 22A, even though the link mechanism 5 and the leaning associated deforming portions S are disposed close to each other, they are prevented from interfering with each other, so that enlargement of the front portion of the vehicle is prevented.

This provides the vehicle 1 including a body frame 21 that leans and the two front wheels 3 in which the enlargement of the front portion thereof is prevented, while ensuring the degree of freedom in designing shock absorbers 33, 34 and the front wheels 3.

In addition, in the vehicle 1 according to this preferred embodiment, the second restrictors 82 that prevent the movement of the brake controlling operation transmission members are provided on the upper cross portion 51 or a lower cross portion 52, and at least portions of the leaning associated deforming portions S are positioned between the second restrictors 82 and the first restrictors 81.

The second restrictors 82 allow the brake controlling operation transmission members to deform together with the upper cross portion 51 or the lower cross portion 52 that turns about the axes that extend in a front-and-rear direction of a body frame 21. Because of this, at least the portions of the leaning associated deforming portions S that are positioned between the second restrictors 82 and the first restrictors 81 deform along a plane that is perpendicular or substantially perpendicular to the front-and-rear direction of the body frame 21, thus easily preventing the interference of the link mechanism 5 with the leaning associated deforming portions S. Namely, although the leaning associated deforming portions S are provided, the expansion of the space provided to permit the operation of the link mechanism 5 is prevented.

Additionally, in the vehicle 1 of this preferred embodiment, the third restrictors 83 that prevent the movement of the brake controlling operation transmission members are provided on the body frame 21.

When the body frame 21 leans, left and right brake calipers 41, 42 move relative to the body frame 21. Because of this, the leaning associated deforming portions S deform easily in response to the leaning of the body frame 21 by the third restrictors 83 that are provided on the body frame 21. Because of this, the interference of the link mechanism 5 with the leaning associated deforming portions S is prevented more easily. Namely, although the leaning associated deforming portions S are provided, the expansion of the space provided to permit the operation of the link mechanism 5 is prevented further.

Fourth Preferred Embodiment

Figure 22:
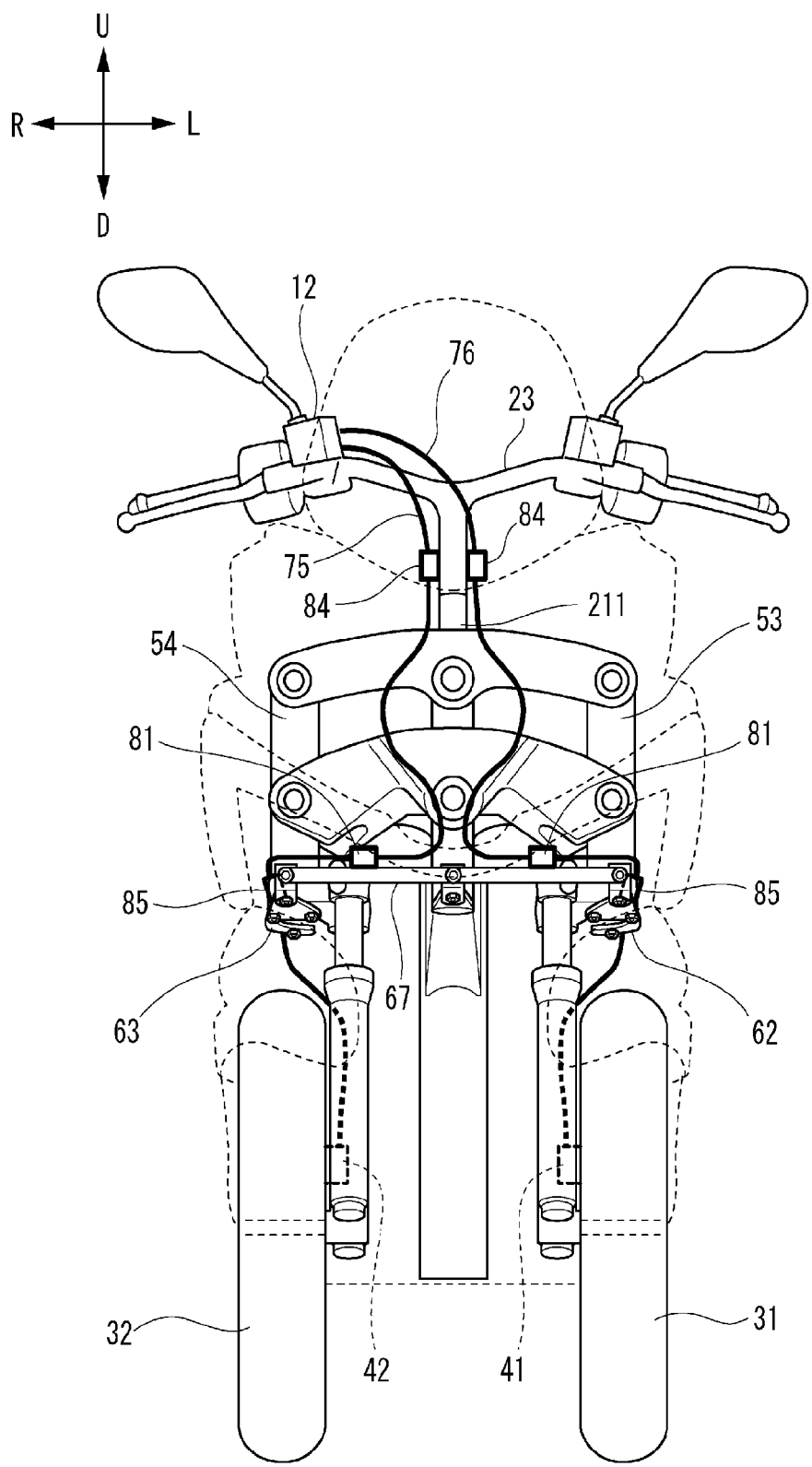
FIG. 22 is a front view of a vehicle according to a fourth preferred embodiment of the present invention in the upright state.
Figure 23:
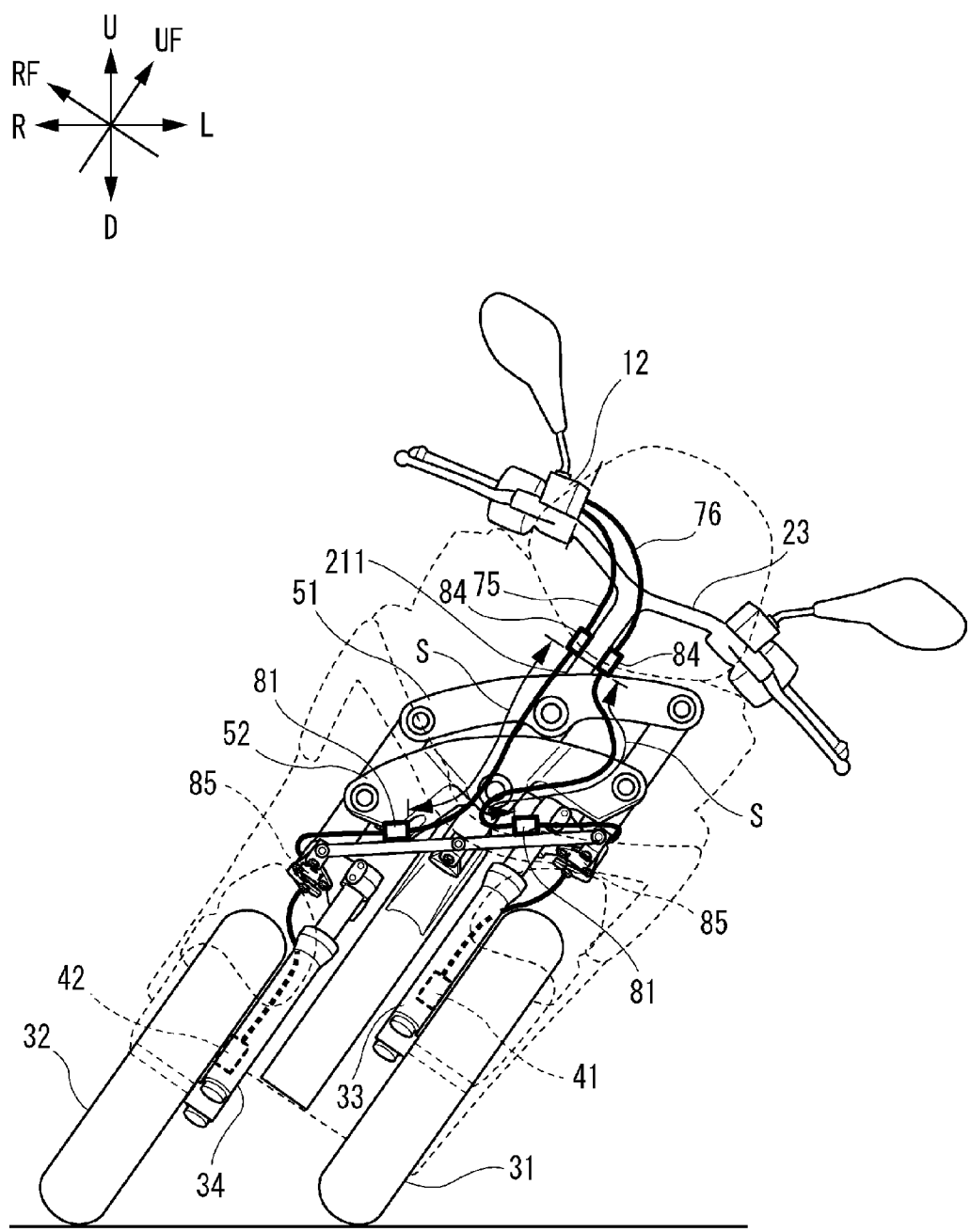
FIG. 23 is a front view of the vehicle shown in FIG. 22 which shows a state in which the vehicle is caused to lean.
Figure 24:
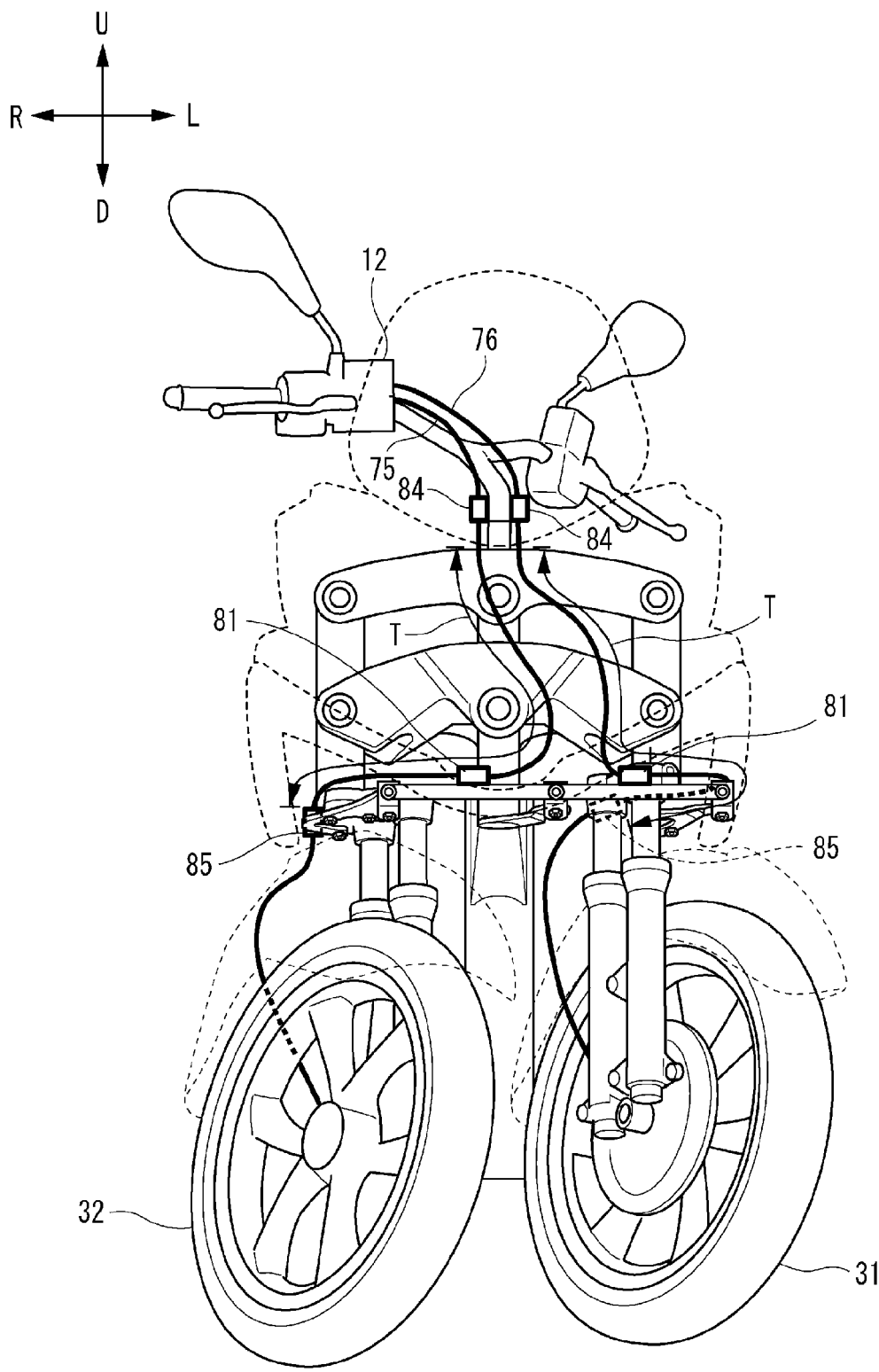
FIG. 24 is a front view of the vehicle shown in FIG. 22 which shows a state in which front wheels are turned.
Figure 25:
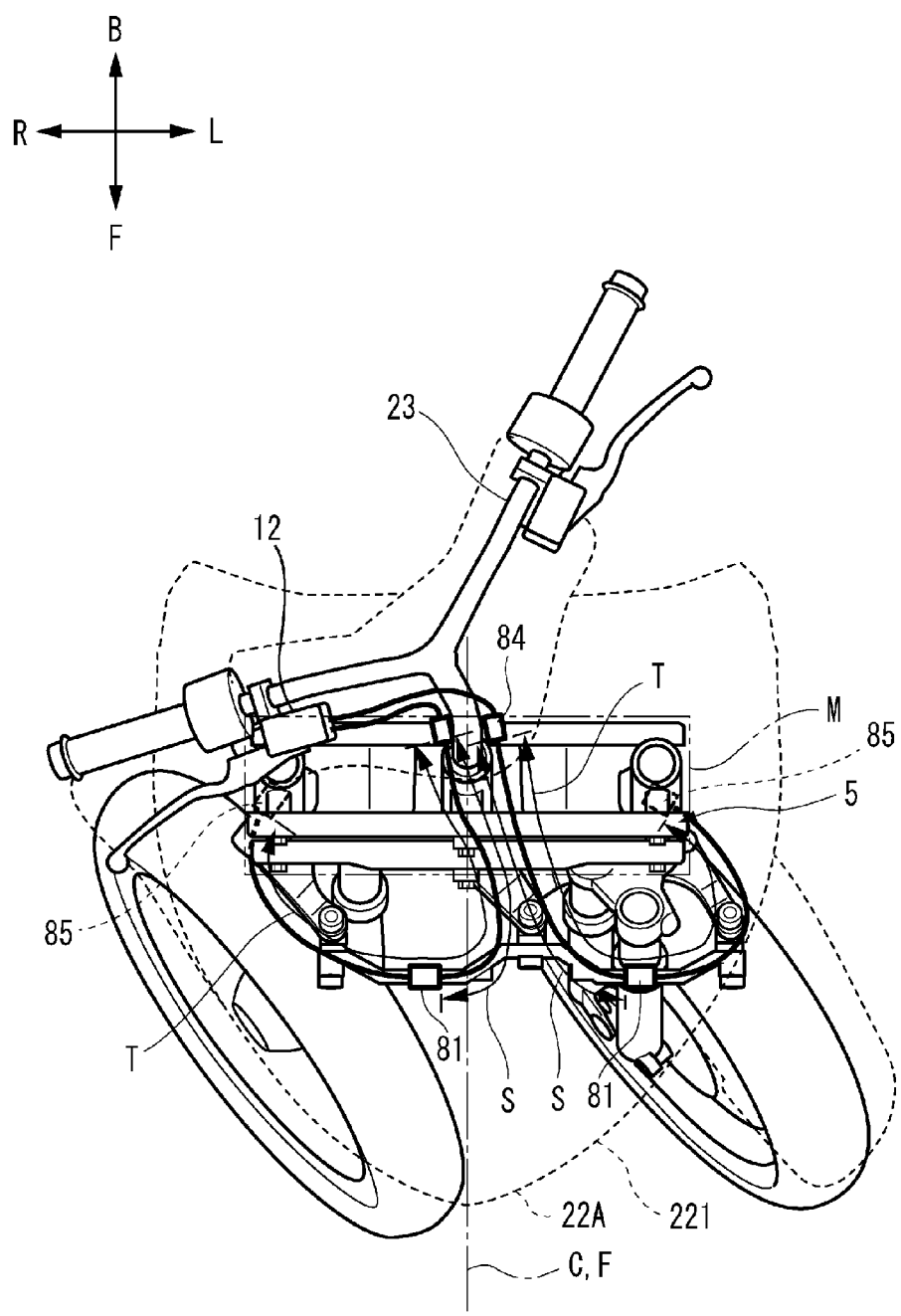
FIG. 25 is a plan view of the vehicle shown in FIG. 24.

Next, with reference to FIGS. 22 to 25, a vehicle 1 according to a fourth preferred embodiment will be described. FIG. 22 is a front view of the vehicle 1 according to the fourth preferred embodiment of the present invention in the upright state. FIG. 23 is a front view of the vehicle 1 shown in FIG. 22 which shows a state in which the vehicle 1 is caused to lean. FIG. 24 is a front view of the vehicle 1 shown in FIG. 22 which shows a state in which front wheels 3 are turned. FIG. 25 is a plan view of the vehicle 1 shown in FIG. 24.

In this preferred embodiment, similarly to the second preferred embodiment, a right brake hose 75 and a left brake hose 76 are connected to a master cylinder 12. The brake hoses 75, 76 are prevented from moving by first restrictors 81, fourth restrictors 84, and fifth restrictors 85.

The right brake hose 75 and the left brake hose 76 are prevented from moving by fourth restrictors 84 that are provided on a headstock 211 downstream of the master cylinder 12.

The right brake hose 75 and the left brake hose 76 are prevented from moving by the first restrictors 81 that are provided on a tie-rod 67 downstream of the fourth restrictors 84. The right brake hose 75 and the left brake hose 76 are disposed directly ahead of a link mechanism 5 from the fourth restrictors 84 to the first restrictors 81. The right brake hose 75 and the left brake hose 76 are bent in a left-and-right direction so as to move towards each other from the fourth restrictors 84 to the first restrictors 81.

Downstream of the first restrictors 81, the right brake hose 75 is prevented from moving by the fifth restrictor 85 that is provided near a connecting position where a third transmission plate 63 is connected to a right side portion 54. The left brake hose 76 is prevented from moving by the fifth restrictor 85 that is provided near a connecting position where a second transmission plate 62 is connected to a left side portion 53.

The right brake hose 75 is bent similarly to the first preferred embodiment between the fifth restrictor 85 and a right brake caliper 42, and the left brake hose 76 is also bent similarly to the first preferred embodiment between the fifth restrictor 85 and a left brake caliper 41.

In this preferred embodiment, leaning associated deforming portions S correspond to portions of the right brake hose 75 and the left brake hose 76 that extend between the fourth restrictors 84 and the first restrictors 81. When the vehicle 1 is caused to lean as shown in FIG. 23, the tie-rod 67 moves relatively to a headstock 211, which changes the relative positions of the fourth restrictors 84 and the first restrictors 81, so that the leaning associated deforming portions S deform.

Specifically, when the vehicle 1 is caused to lean to the left as shown in FIG. 23, a distance between the fourth restrictor 84 and the first restrictor 81 on the right brake hose 75 increases. This causes the leaning associated deforming portion S of the right brake hose 75 to deform into a straight line. Additionally, when the vehicle 1 is caused to lean to the left, a distance between the fourth restrictor 84 and the first restrictor 81 on the left brake hose 76 shortens. This causes the left brake hose 76 of the brake hose 76 that is being bent to deform so that a radius of curvature thereof becomes small. In this way, since the leaning associated deforming portions S deform in a plane that is perpendicular or substantially perpendicular to an upper middle axis C directly ahead of the link mechanism 5, the interference of the leaning associated deforming portions S with the link mechanism 5 is prevented.

In this preferred embodiment, wheel turning associated deforming portions T correspond to portions that are defined between the fourth restrictors 84 and the fifth restrictors 85. When front wheels 3 are turned as shown in FIGS. 24 and 25, the relative positions of the fourth restrictors 84 and the first restrictors 81 and the relative positions of the first restrictors 81 and the fifth restrictors 85 change. Then, when the front wheels 3 are turned, the right brake hose 75 and the left brake hose 76 are bent between the fourth restrictors 84 and the fifth restrictors 85.

Additionally, when a handlebar 23 is turned, the relative positions of the master cylinder 12 and the fourth restrictors 84 change. Because of this, the portions of the right brake hose 75 and the left brake hose 76 that extend between the master cylinder 12 and the fourth restrictors 84 deform in response to the turning of the handlebar 23.

In the vehicle 1 of this preferred embodiment, too, a body cover 22 includes an outer surface covering portion 22A (a portion of a front portion of a front cover 221 that is positioned directly ahead of the link mechanism 5) that covers at least a portion of an outer peripheral surface of the link mechanism 5 excluding an upper surface and a lower surface thereof, as shown in FIG. 25. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5 excluding the upper surface and the lower surface thereof and the outer surface covering portion 22A.

Similarly to the first preferred embodiment, the link mechanism 5 and the leaning associated deforming portions S tend to change their shapes or postures in similar directions when the link mechanism 5 is activated to operate, and therefore, even though the leaning associated deforming portions S are disposed between the outer peripheral surface of the link mechanism 5, excluding the upper surface and the lower surface thereof, and the outer surface covering portion 22A, the interference of the link mechanism 5 with the leaning associated deforming portions S is easily prevented. Additionally, since both the link mechanism 5 and the leaning associated deforming portions S change their postures largely in the up-and-down direction of the body frame 21, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5 excluding the upper surface and the lower surface thereof to which the constituent members of the link mechanism 5 do not project or only minimally project even when the link mechanism 5 is activated to operate and the outer surface covering portion 22A, even though the link mechanism 5 and the leaning associated deforming portions S are disposed close to each other, they are prevented from interfering with each other, so that enlargement of the front portion of the vehicle is prevented.

This provides the vehicle 1 including a body frame 21 that leans and the two front wheels 3 in which the enlargement of the front portion thereof is prevented, while ensuring the degree of freedom in designing shock absorbers 33, 34 and the front wheels 3.

Fifth Preferred Embodiment

In the first to fourth preferred embodiments that have been described heretofore, while a portion of the brake hose is described as being provided in the space defined between the front of the link mechanism 5 and the rear of the front cover 221, the present invention is not limited thereto.

Figure 26:
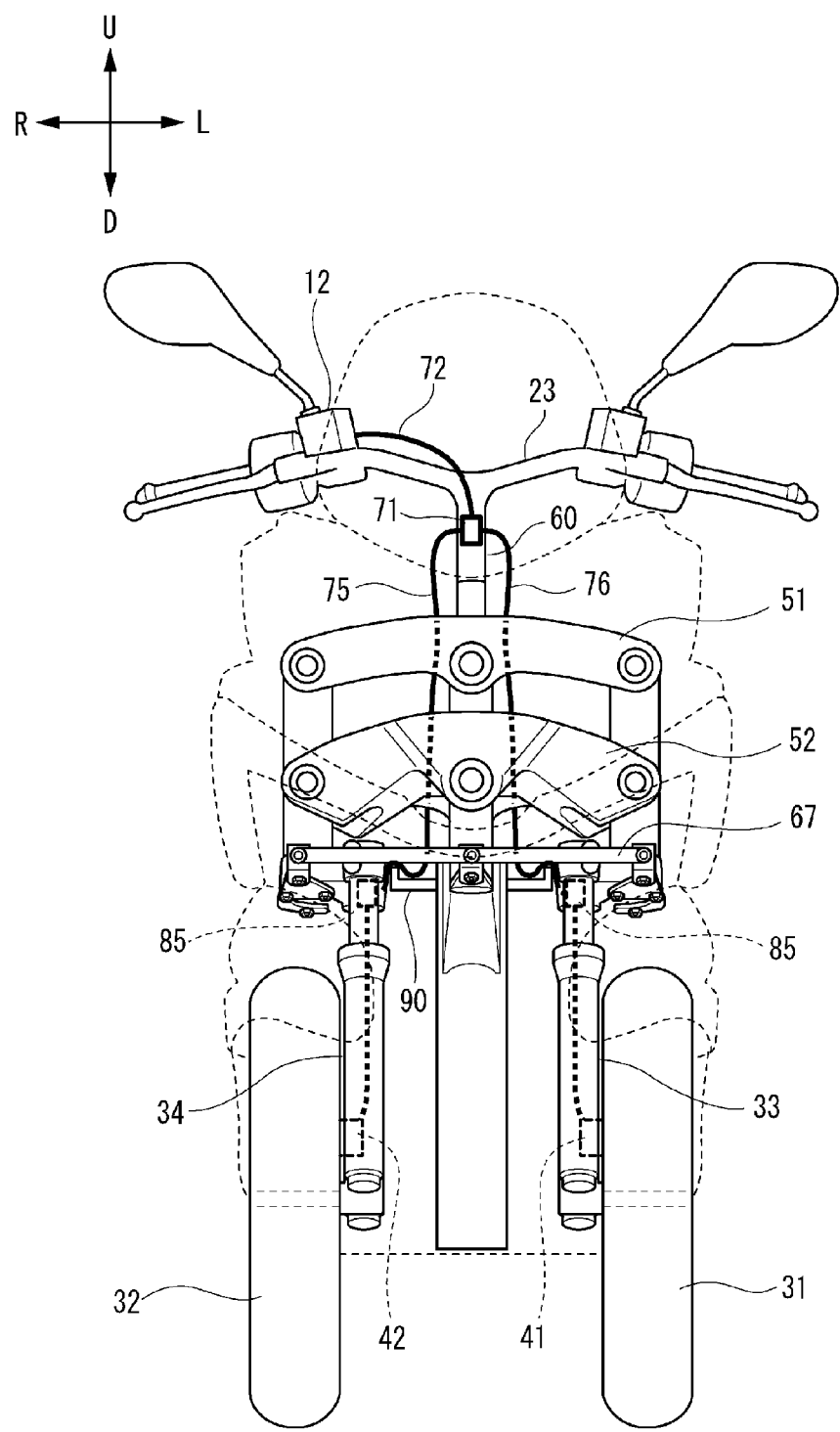
FIG. 26 is a front view of a vehicle according to a fifth preferred embodiment of the present invention in the upright state.
Figure 27:
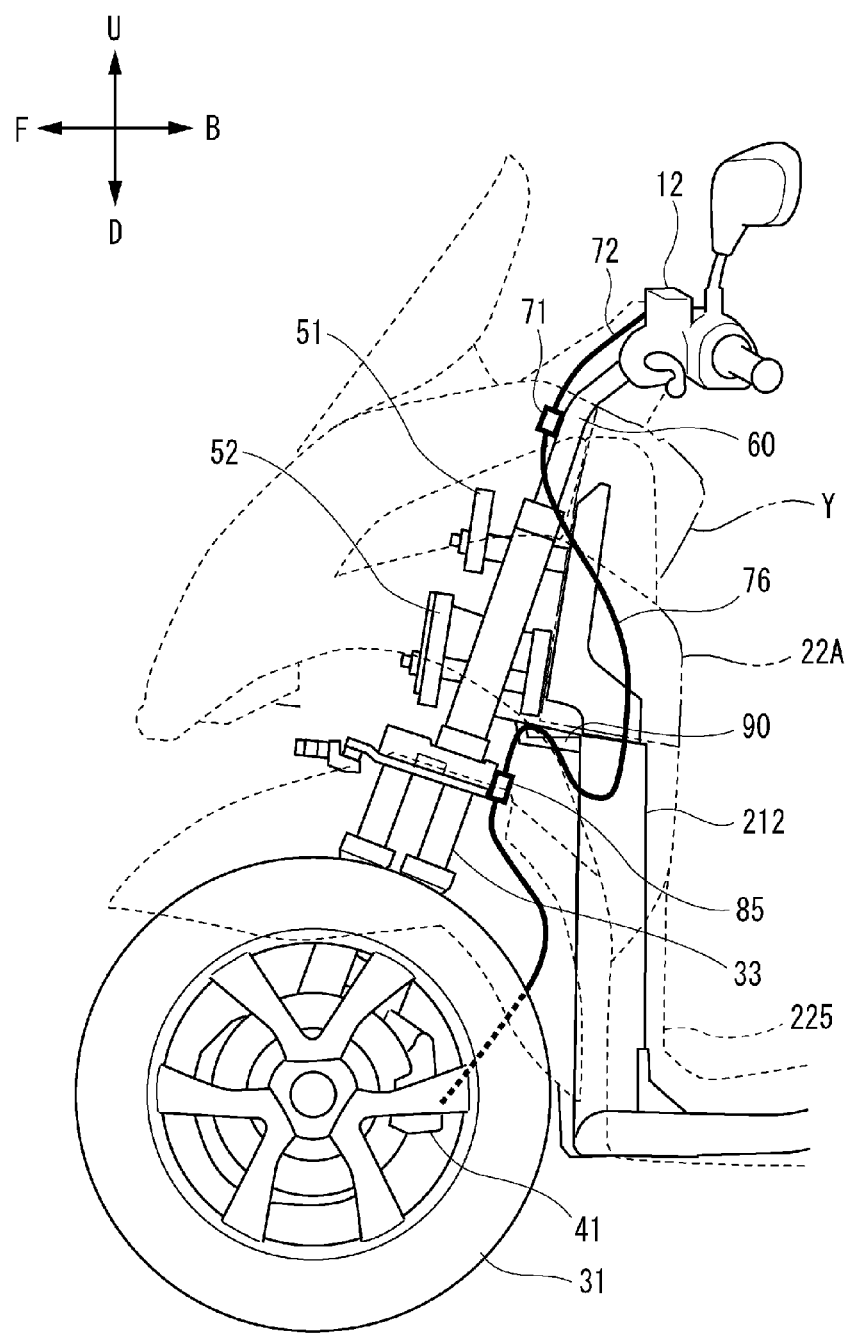
FIG. 27 is a side view of the vehicle shown in FIG. 26.
Figure 28:
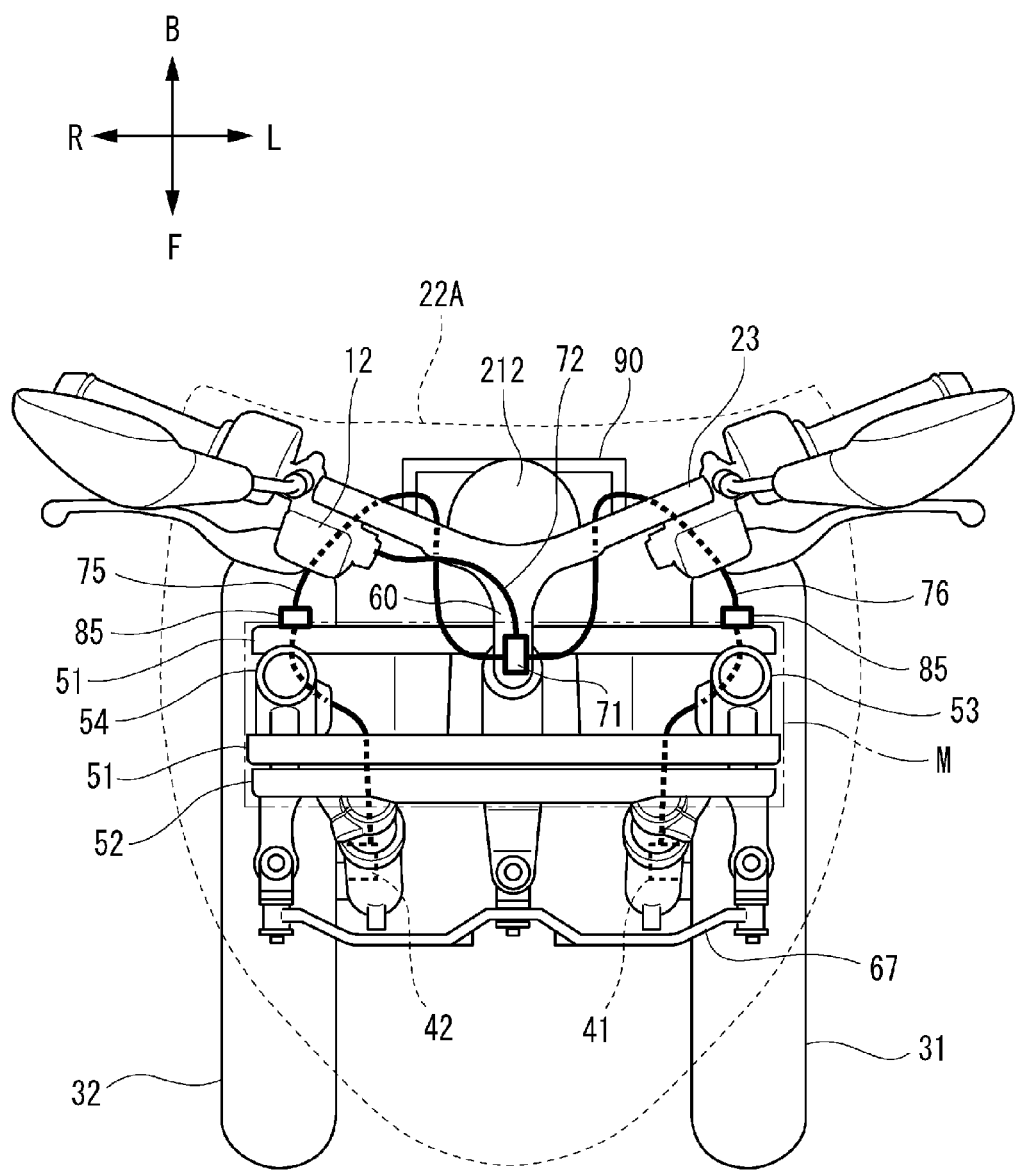
FIG. 28 is a plan view of the vehicle shown in FIG. 26.
Figure 29:
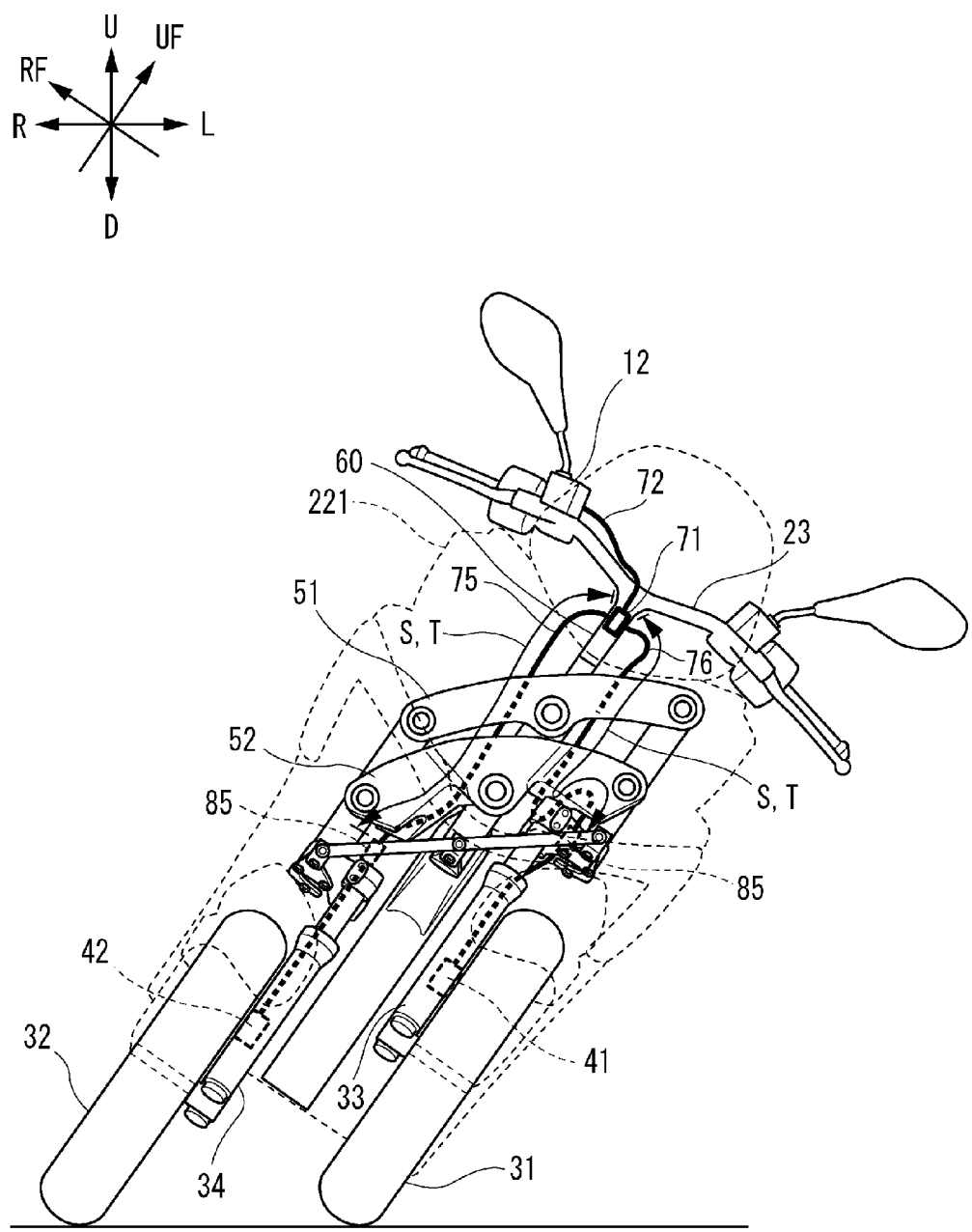
FIG. 29 is a front view of the vehicle shown in FIG. 26 which shows a state in which the vehicle is caused to lean.
Figure 30:
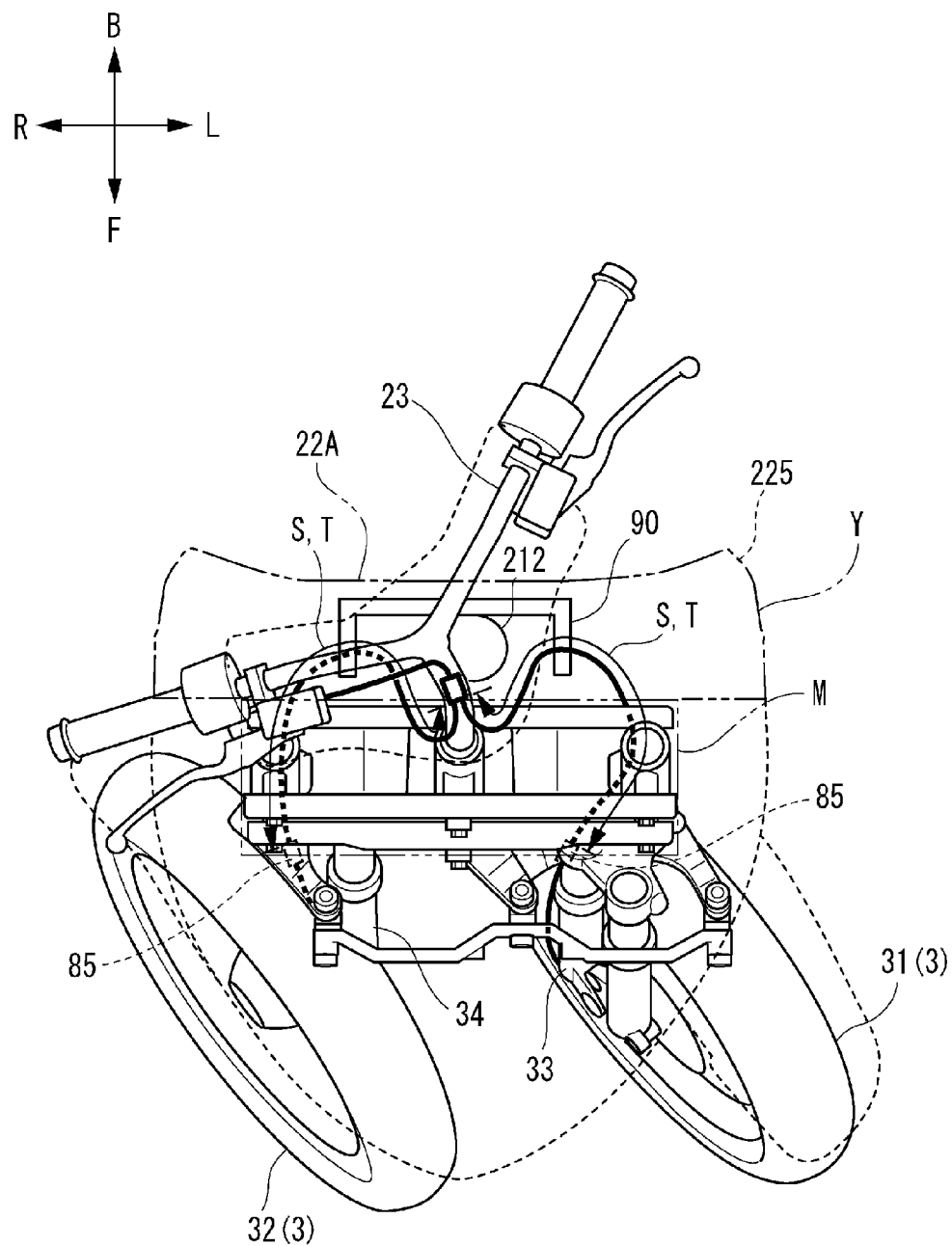
FIG. 30 is a plan view of the vehicle shown in FIG. 26 which shows a state in which front wheels are turned.

With reference to FIGS. 26 to 30, a vehicle 1 according to a fifth preferred embodiment of the present invention will be described. FIG. 26 is a front view of the vehicle 1 according to the fifth preferred embodiment of the present invention in the upright state. FIG. 27 is a front view of the vehicle 1 shown in FIG. 26. FIG. 28 is a plan view of the vehicle 1 shown in FIG. 26. FIG. 29 is a front view of the vehicle 1 shown in FIG. 26 which shows a state in which a body frame 21 is caused to lean. FIG. 30 is a plan view of the vehicle 1 shown in FIG. 26 which shows a state in which front wheels 3 are turned.

As shown in FIG. 26, in this preferred embodiment, a brake hose is prevented from moving by a branch block 71 that is fixed to a steering shaft 60 and fifth restrictors 85.

Similarly to the first preferred embodiment, an upstream side brake hose 72 that is connected to the branch block 71 is connected to a master cylinder 12. A right brake hose 75, which connects to a right brake caliper 42, and a left brake hose 76, which connects to a left brake caliper 41, are connected to the branch block 71. In this preferred embodiment, the branch block 71 is fixed to the steering shaft 60.

As shown in FIGS. 27 and 28, downstream of the branch block 71, the right brake hose 75 and the left brake hose 76 are prevented from moving by a guide member 90. The guide member 90 is fixed to a down frame 212 that is located behind a link mechanism 5. The guide member 90 prevents a downward movement of the right brake hose 75 and the left brake hose 76 while permitting a longitudinal movement thereof.

Downstream of the guide member 90, the right brake hose 75 is prevented from moving by the fifth restrictor 85 that is provided at an upper portion of a right shock absorber 34. The left brake hose 76 is prevented from moving by the fifth restrictor 85 that is provided at an upper portion of a left shock absorber 33.

In this preferred embodiment, leaning associated deforming portions S correspond to portions of the right brake hose 75 and the left brake hose 76 that extend between the branch block 71 and the fifth restrictors 85. When the vehicle 1 is caused to lean as shown in FIG. 29, the left shock absorber 33 and the right shock absorber 34 move relatively with respect to a steering shaft 60. This changes the relative positions of the branch block 71 and the fifth restrictors 85, so that the leaning associated deforming portions S are caused to deform.

Specifically, when the vehicle 1 is caused to lean to the left as shown in FIG. 29, a distance between the branch block 71 and the fifth restrictors 85 on the right brake hose 75 increases. This causes the leaning associated deforming portion S of the right brake hose 75 that is being bent to deform into a straight line. Additionally, when the vehicle 1 is caused to lean to the left, a distance between the branch block 71 and the fifth restrictor 85 on the left brake hose 76 shortens. This causes the leaning associated deforming portion S of the left brake hose 76 that is being bent to deform so that a radius of curvature thereof becomes small. As this occurs, the guide member 90 prevents the right brake hose 75 from moving towards the right shock absorber 34. In addition, the guide member 90 prevents the left brake hose 76 from moving towards the left shock absorber 33.

In this preferred embodiment, wheel turning associated deforming portions T correspond to portions that are defined between the branch block 71 and the fifth restrictors 85. When front wheels 3 are turned as shown in FIG. 30, the relative positions of the branch block 71 and the fifth restrictors 85 change. Then, when the front wheels 3 are turned, the wheel turning associated deforming portions T deform. In this case, too, the guide member 90 prevents the right brake hose 75 and the left brake hose 76 from moving towards the right shock absorber 34 and the left shock absorber 33, respectively.

Additionally, when a handlebar 23 is turned, the relative positions of the master cylinder 12 and the branch block 71 change. Because of this, the portions of the right brake hose 75 and the left brake hose 76 that extend between the branch block 71 and the fifth restrictors 85 deform in response to the turning of the handlebar 23.

In the vehicle 1 of this preferred embodiment, too, a body cover 22 includes an outer surface covering portion 22A (a portion of a leg shield 225 that is positioned at an upper portion of a leg shield 225 and directly behind the link mechanism 5) that covers at least a portion of an outer peripheral surface of the link mechanism 5 excluding an upper surface and a lower surface thereof, as shown in FIG. 27. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5, excluding the upper surface and the lower surface thereof, and the outer surface covering portion 22A.

Similarly in the first preferred embodiment, the link mechanism 5 and the leaning associated deforming portions S tend to change their shapes or postures in similar directions when the link mechanism 5 is activated to operate, and therefore, even though the leaning associated deforming portions S are disposed between the outer peripheral surface of the link mechanism 5 excluding the upper surface and the lower surface thereof and the outer surface covering portion 22A, the interference of the link mechanism 5 with the leaning associated deforming portions S is easily prevented. Additionally, since both the link mechanism 5 and the leaning associated deforming portions S change their postures largely in the up-and-down direction of the body frame 21, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5 excluding the upper surface and the lower surface thereof to which the constituent members of the link mechanism 5 do not project or only minimally project even when the link mechanism 5 is activated to operate and the outer surface covering portion 22A, even though the link mechanism 5 and the leaning associated deforming portions S are disposed close to each other, they are prevented from interfering with each other, so that enlargement of the front portion of the vehicle is prevented.

This provides the vehicle 1 including a body frame 21 that leans and the two front wheels 3 in which enlargement of the front portion thereof is prevented, while ensuring the degree of freedom in designing shock absorbers 33, 34 and the front wheels 3.

Sixth Preferred Embodiment

The present invention can also be applied to a vehicle that includes a fluid unit for an ABS (Antilock Brake System) as will be described next with reference to a sixth preferred embodiment of the present invention. Using FIGS. 31 to 36, a vehicle 1 according to the sixth preferred embodiment will be described.

Figure 31:
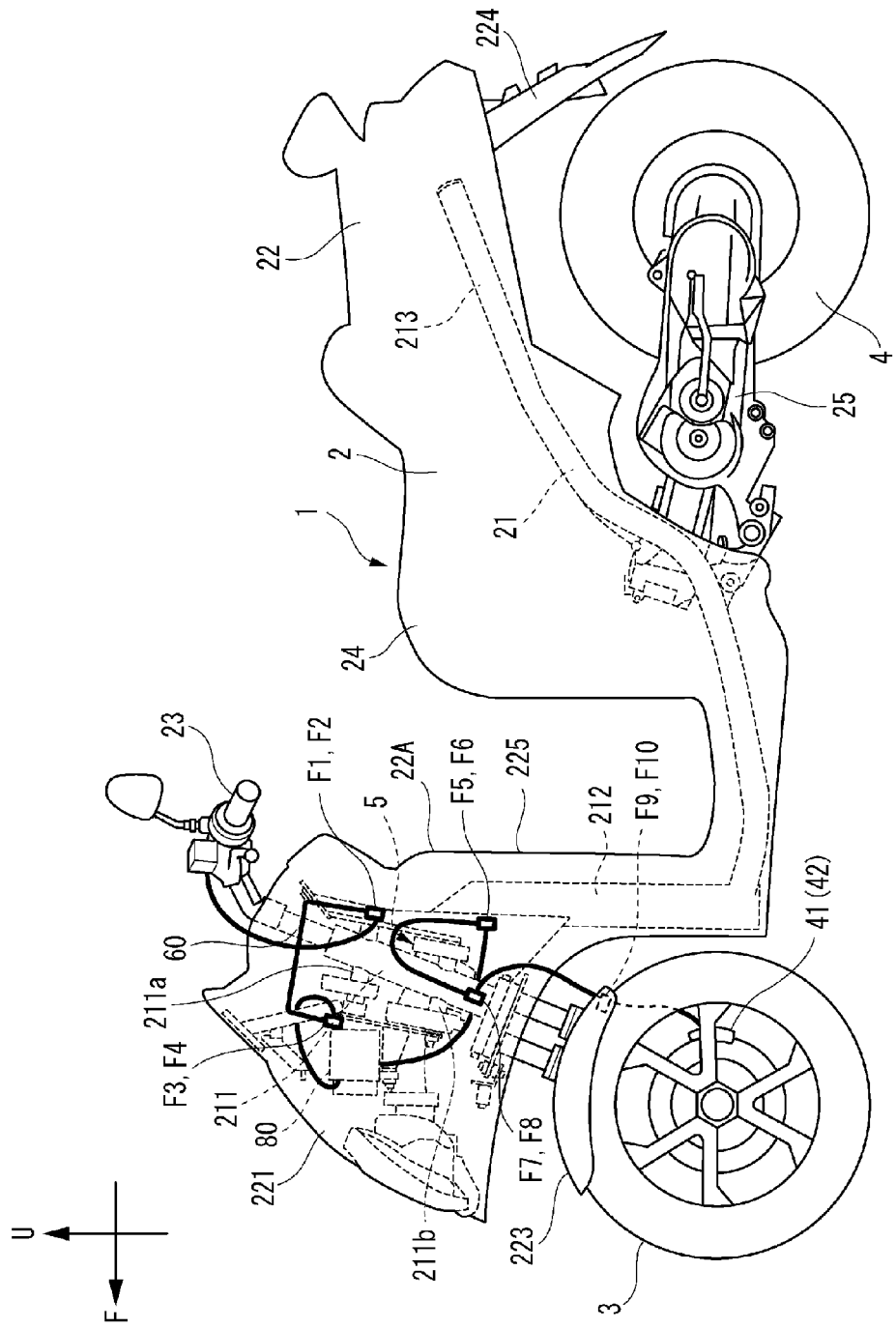
FIG. 31 is a side view of a vehicle according to a sixth preferred embodiment of the present invention in the upright state.
Figure 32:
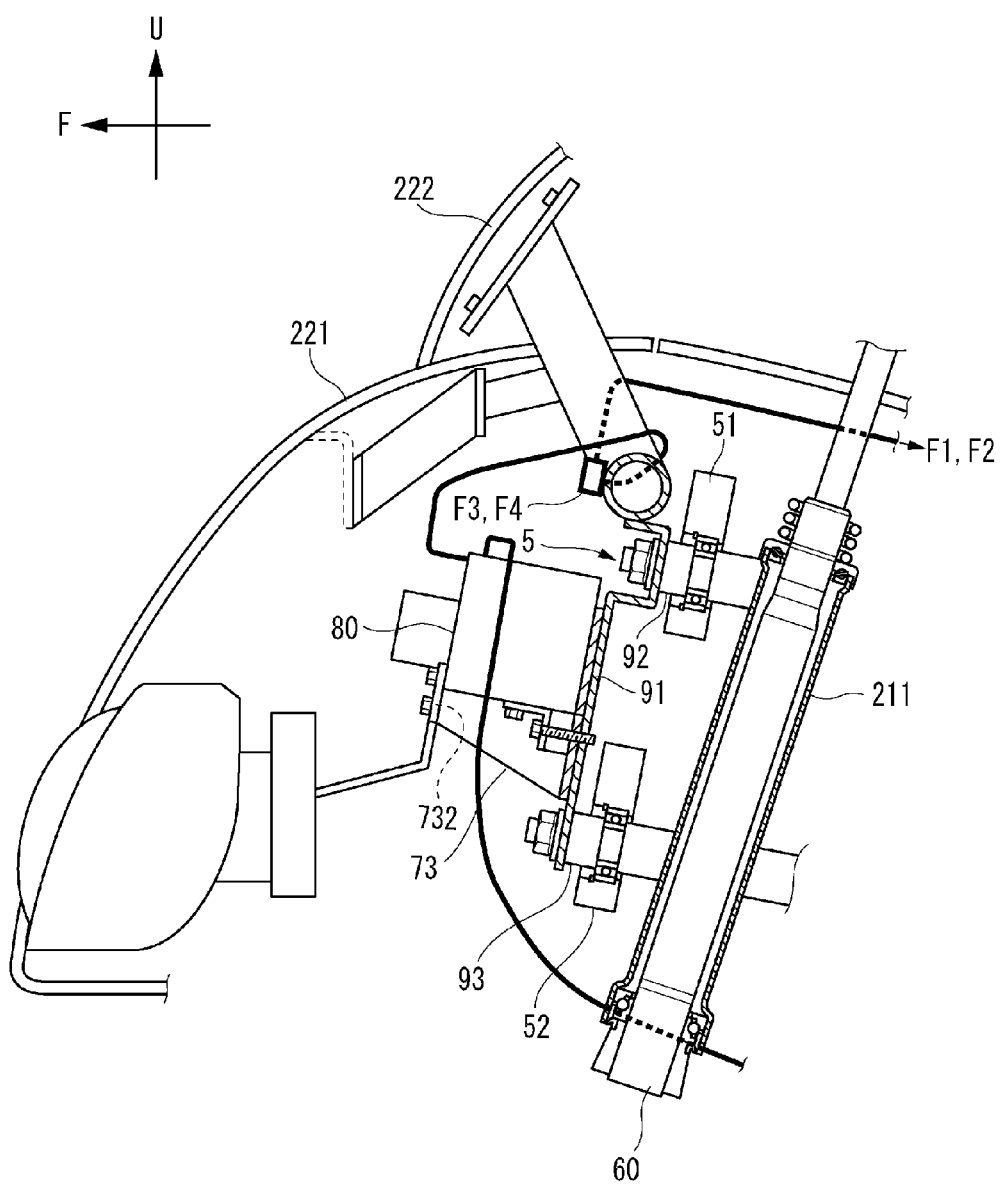
FIG. 32 is a partially enlarged view of FIG. 31.
Figure 33:
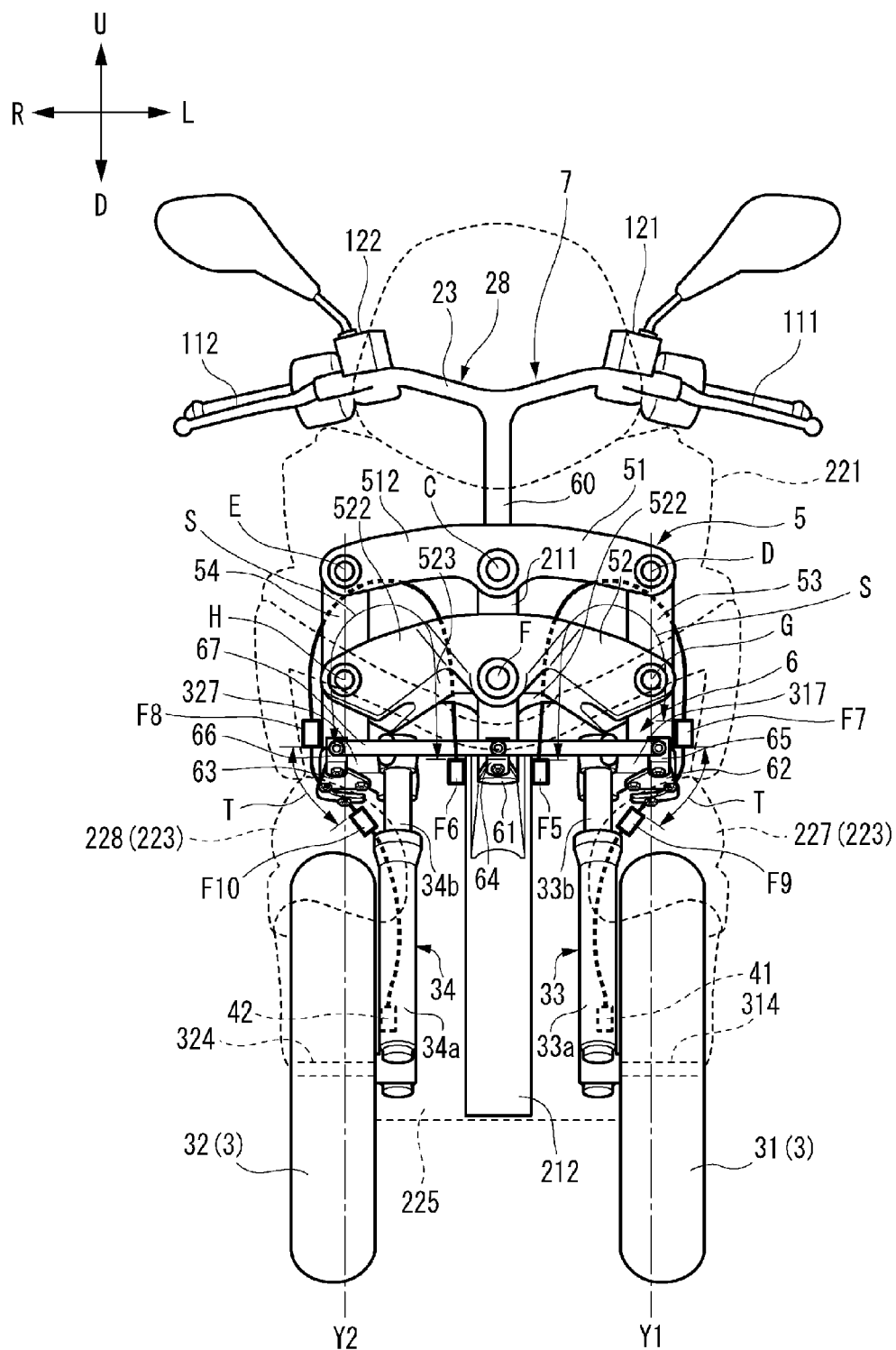
FIG. 33 is a front view of the vehicle shown in FIG. 31.
Figure 34:
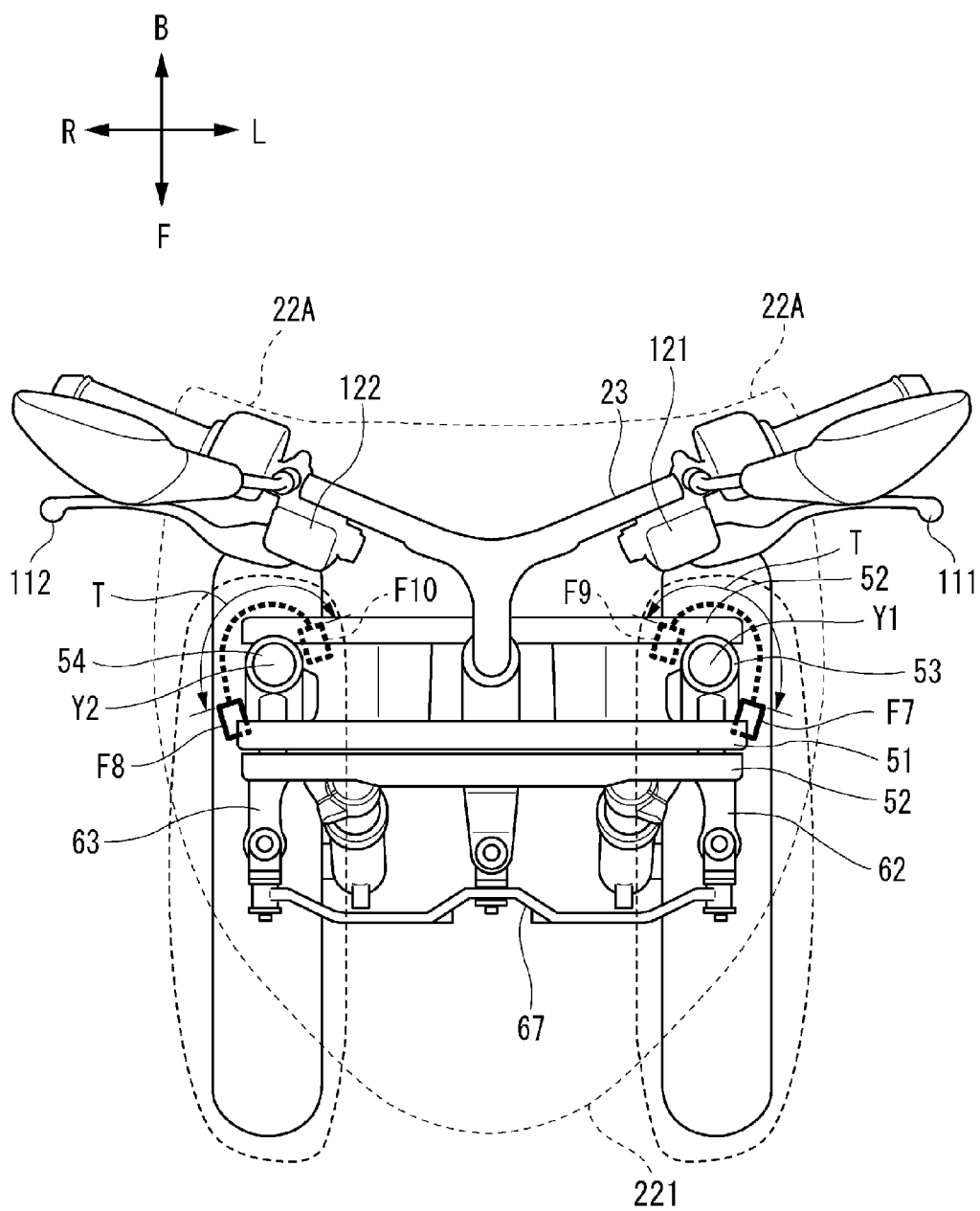
FIG. 34 is a plan view of the vehicle shown in FIG. 31.
Figure 35:
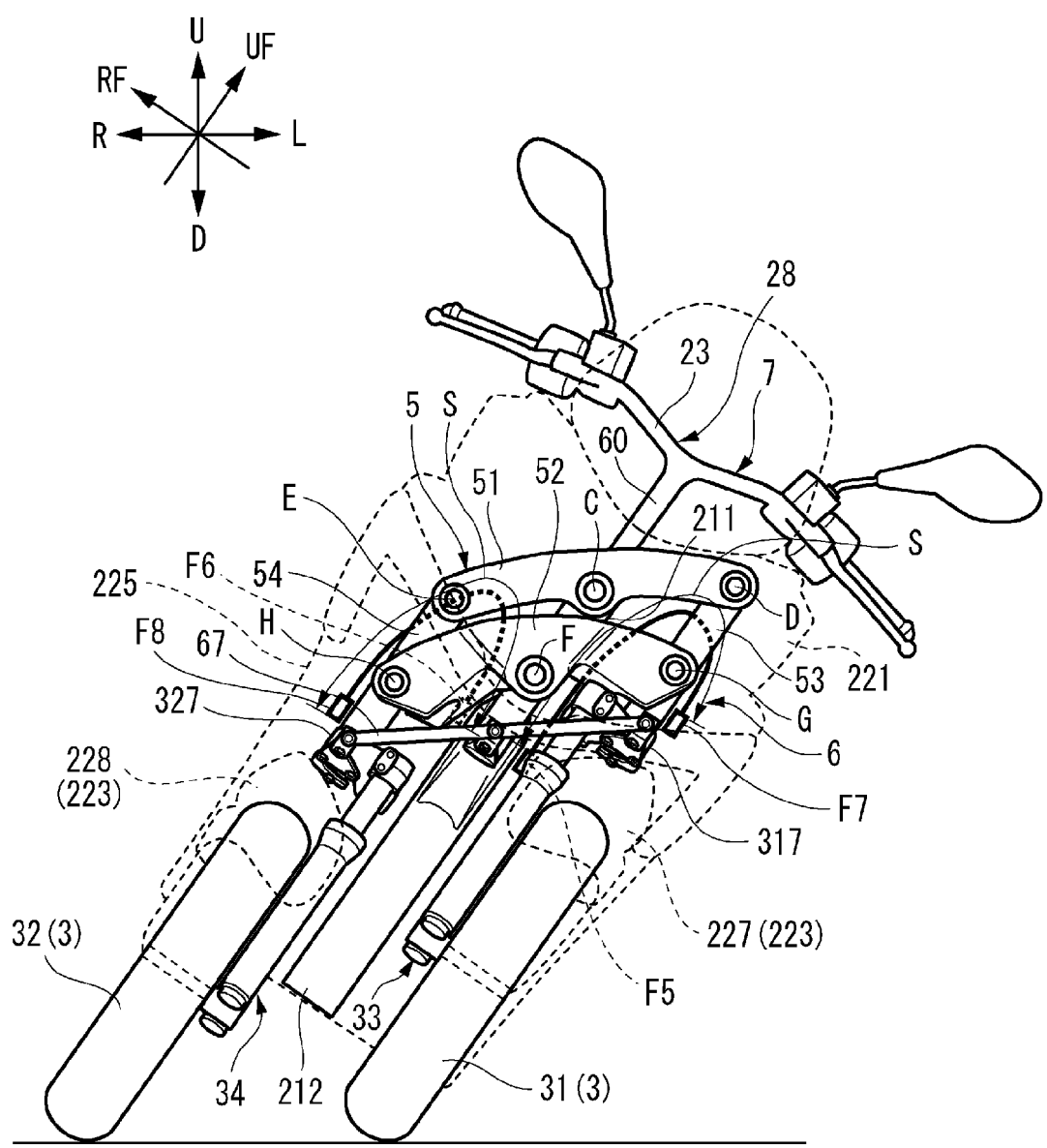
FIG. 35 is a front view of the vehicle shown in FIG. 31 which shows a state in which the vehicle is caused to lean.
Figure 36:
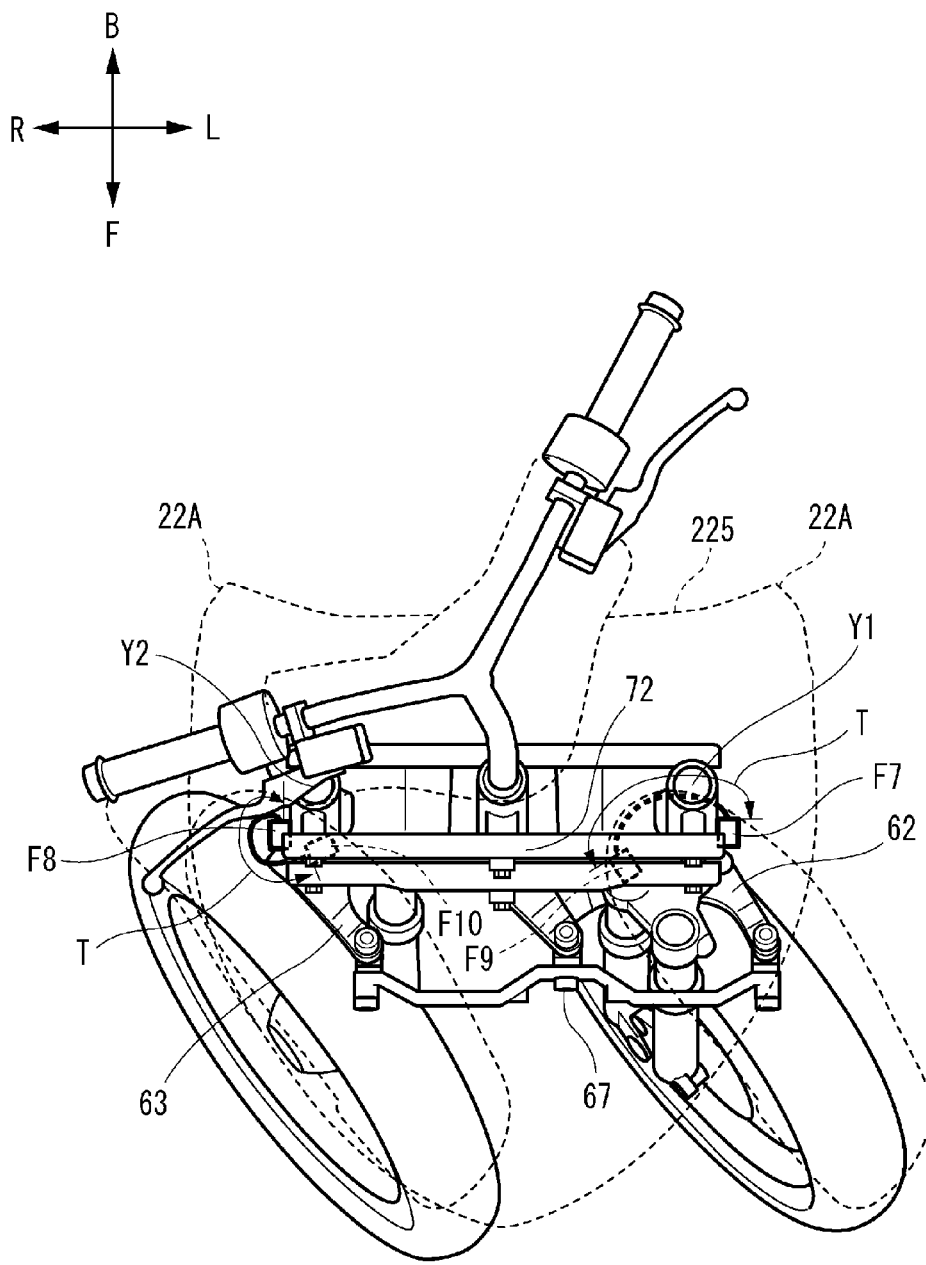
FIG. 36 is a plan view of the vehicle shown in FIG. 31 which shows a state in which front wheels are turned.

FIG. 31 is a side view of the vehicle 1 according to the sixth preferred embodiment of the present invention in the upright state. FIG. 32 is a partially enlarged view of FIG. 31. FIG. 33 is a front view of the vehicle 1 shown in FIG. 31. FIG. 34 is a plan view of the vehicle 1 shown in FIG. 31. FIG. 35 is a front view of the vehicle shown in FIG. 31 which shows a state in which the vehicle 1 is caused to lean. FIG. 36 is a plan view of the vehicle 1 shown in FIG. 31 which shows a state in which front wheels 3 are turned.

The vehicle 1 according to this preferred embodiment includes a fluid unit 80 that includes a plurality of brake fluid flow paths to control operations of left and right brake calipers 41, 42 by switching the flow paths through which a brake fluid flows.

The fluid unit 80 is preferably a metallic member. The plurality of flow paths are provided in an interior of the fluid unit 80. The fluid unit 80 is a constituent element which defines a so-called ABS (Antilock Brake System). The fluid unit 80 controls the operations of the left brake caliper 41 and the right brake caliper 42 by switching the flow paths through which the brake fluid flows. The fluid unit 80 controls the operations of the left brake caliper 41 and the right brake caliper 42 in response to controlling a left brake lever 111 and a right brake lever 112.

The fluid unit 80 is provided directly ahead of a link mechanism 5. The fluid unit 80 is fixed to a mounting bracket 91 that is provided directly ahead of the link mechanism 5. The mounting bracket 91 is fixed to an upper penetrating support portion 92 and a lower penetrating support portion 93. The upper penetrating support portion 92 extends to the front from a headstock 211 to penetrate an upper cross portion 51 in a front-and-rear direction. The lower penetrating support portion 93 extends to the front from the headstock 211 to penetrate a lower cross portion 52 in the front-and-rear direction.

In the vehicle 1 according to this preferred embodiment, a brake controlling operation transmission member includes a flexible brake hose and a metallic tube, for example. The brake controlling operation transmission members are prevented from moving by first restrictors F1, F2, second restrictors F3, F4, third restrictors F5, F6, fourth restrictor F7, F8, fifth restrictors F9, F10 and the fluid unit 80.

As shown in FIG. 31, the first restrictors F1, F2 are fixed to an upper portion of a body frame 21 directly behind the link mechanism 5. The first restrictors F1, F2 are metallic blocks in interiors of which flow paths are provided.

The second restrictors F3, F4 are fixed to an upper portion of the mounting bracket 91. The second restrictors F3, F4 are metallic blocks in interiors of which flow paths are provided.

The third restrictors F5, F6 are fixed to a central portion of the body frame 21 in relation to an up-and-down direction behind the link mechanism 5. The third restrictors F5, F6 are metallic blocks in interiors of which flow paths are provided.

The fourth restrictor F7 is fixed to a left surface of the left side portion 53 near a left steering axis Y1. The fourth restrictor F8 is fixed to a right surface of the right side portion 54 near a right steering axis Y2. The fourth restrictors F7, F8 are sleeves in interiors of which brake hoses are passed.

The fifth restrictor F9 is fixed to a first front mudguard 227 of a left front wheel 31 behind the left steering axis Y1. The fifth restrictor F10 is fixed to a second front mudguard 228 of a right front wheel 32 behind the right steering axis Y2. The fifth restrictors F9, F10 are sleeves in interiors of which brake hoses are passed.

A left master cylinder 121 and the left brake lever 111 are fixed to a left portion of a handlebar 23. A right master cylinder 122 and the right brake lever 112 are fixed to a right portion of the handlebar 23.

The brake controlling operation transmission member that extends from the left master cylinder 121 is connected sequentially from an upstream side to the first restrictor F1, the second restrictor F3, the fluid unit 80, the third restrictor F5, the fourth restrictor F7, the fifth restrictor F9, and the left brake caliper 41.

The brake controlling operation transmission member that extends from the right master cylinder 122 is connected sequentially from an upstream side to the first restrictor F2, the second restrictor F4, the fluid unit 80, the third restrictor F6, the fourth restrictor F8, the fifth restrictor F10 and the right brake caliper 42.

Metallic tubes connect the first restrictors F1, F2 to the fluid unit 80.

Flexible brake hoses connect the first restrictors F1, F2 to the second restrictors F3, F4, the third restrictors F5, F6 to the fluid unit 80, the fluid unit 80 to the fourth restrictors F7, F8, the fourth restrictors F7, F8 to the fifth restrictors F9, F10, and the fifth restrictors F9, F10 to the corresponding left brake caliper 41 and right brake caliper 42.

As shown in FIG. 35, in this preferred embodiment, leaning associated deforming portion S that deforms in response to the leaning of the body frame 21 corresponds to portions of the brake hose that extend between the third restrictor F5 and the fourth restrictor F7 and between the third restrictor F6 and the fourth restrictor F8. The brake hose that extends between the third restrictor F5 and the fourth restrictor F7 is bent so as to project upwards. The brake hose that extends between the third restrictor F6 and the fourth restrictor F8 is bent so as to project upwards.

A body cover 22 includes an outer surface covering portion 22A so as to cover the left and rear of the leaning associated deforming portions S. A portion extending from a left portion of a front cover 221 to an upper portion of a leg shield 225 and a portion extending from a right portion of the front cover 221 to the upper portion of the leg shield 225 correspond to the outer surface covering portion 22A. Namely, at least portions of the leaning associated deforming portions S are positioned between the link mechanism 5 and the outer surface covering portion 22A.

When the body frame 21 leans to the left of the vehicle 1 from an upright state, the upper cross portion 51 turns about an upper middle axis C that extends in the front-and-rear direction, and the lower cross portion 52 turns about a lower middle axis F that extends in the front-and-rear direction. Then, the left side portion 53 is displaced so as to move upwards in an up-and-down direction of the body frame 21 and towards the body frame 21 with respect to the body frame 21. The right side portion 54 is displaced so as to move downwards in the up-and-down direction of the body frame 21 and towards the body frame 21 with respect to the body frame 21. Then, the left and right leaning associated deforming portions S deform within a plane that is perpendicular or substantially perpendicular to the front-and-rear direction so that a radius of curvature becomes small.

In this way, when the body frame 21 leans, the link mechanism 5 is displaced about the axes that extend in the front-and-rear direction, and the leaning associated deforming portions S also deform about the axes that extend in the front-and-rear direction. In this way, the link mechanism 5 and the leaning associated deforming portions S tend to lean in similar directions. The brake controlling operation transmission members are prevented from interfering with the body frame 21 and the link mechanism 5 in the manner described above.

As shown in FIG. 36, in this preferred embodiment, wheel turning associated deforming portions T that deform in response to the turning of the front wheels 3 correspond to portions of the brake hoses that extend between the fourth restrictor F7 and the fifth restrictor F9 and between the fourth restrictor F8 and the fifth restrictor F10.

When the front wheels 3 are turned from a non-turned state so that the vehicle 1 travels to the left, the left shock absorber 33 turns about the left steering axis Y1, and the right shock absorber 34 turns about the right steering axis Y2. Then, the fifth restrictor F9 turns about the left steering axis Y1, and the fifth restrictor F10 turns about the second steering axis Y2. Then, the left wheel turning associated deforming portion T turns about the left steering axis Y1 in association with the displacement of the fifth restring portion F9, and the right wheel turning associated deforming portion T turns about the right steering axis Y2 in association with the displacement of the fifth restrictor F10.

In this way, when the front wheels 3 are turned, the left shock absorber 33 turns about the left steering axis Y1, and the left wheel turning associated deforming portion T is also displaced about the left steering axis Y1. The right shock absorber 34 turns about the right steering axis Y2, and the right wheel turning associated deforming portion T is also displaced about the right steering axis Y2. In this way, the left shock absorber 33 and the right shock absorber 34 and the wheel turning associated deforming portions T tend to be displaced in similar directions. The brake controlling operation transmission members are prevented from interfering with the shock absorbers 33, 34 in the way described above.

In the vehicle 1 according to this preferred embodiment, too, the body cover 22 includes the outer surface covering portion 22A that covers at least a portion of an outer peripheral surface of the link mechanism 5 excluding an upper surface and a lower surface thereof, as shown in FIGS. 31 and 34. In addition, with the vehicle 1 being in the upright state, at least portions of the leaning associated deforming portions S of the brake controlling operation transmission member that deform in association with the leaning of the body frame 21 are positioned between the outer peripheral surface of the link mechanism 5 excluding the upper surface and the lower surface thereof and the outer surface covering portion 22A.

Similarly to the first preferred embodiment, the link mechanism 5 and the leaning associated deforming portions S tend to change their shapes or postures in similar directions when the link mechanism 5 is activated to operate, and therefore, even though the leaning associated deforming portions S are disposed between the outer peripheral surface of the link mechanism 5 excluding the upper surface and the lower surface thereof and the outer surface covering portion 22A, the interference of the link mechanism 5 with the leaning associated deforming portions S is easily prevented. Additionally, since both the link mechanism 5 and the leaning associated deforming portions S change their postures largely in the up-and-down direction of the body frame 21, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented. Further, since the leaning associated deforming portions S are provided between the front, rear, right, or left of the outer peripheral surface of the link mechanism 5, excluding the upper surface and the lower surface thereof, to which the constituent members of the link mechanism 5 do not project or only minimally project even when the link mechanism 5 is activated to operate and the outer surface covering portion 22A, even though the link mechanism 5 and the leaning associated deforming portions S are disposed close to each other, they are prevented from interfering with each other, so that enlargement of the front portion of the vehicle is prevented.

This provides the vehicle 1 including a body frame 21 that leans and the two front wheels 3 in which enlargement of the front portion thereof is prevented, while ensuring the degree of freedom in designing shock absorbers 33, 34 and the front wheels 3.

Thus, while the present invention has been described heretofore by the use of the first preferred embodiment to the sixth preferred embodiment thereof, the technical scope of the present invention is not limited to the technical scopes that are descriptively defined in the preferred embodiments. Various alterations, combinations, substitutions, or improvements to the preferred embodiments of the present invention are possible and are within the scope of the present invention.

For example, the leaning associated deforming portion S may deform at least along a plane that is perpendicular or substantially perpendicular to the left-and-right direction of the body frame 21 in response to the leaning of the body frame 21.

As has been described above, when the body frame 21 leans to activate the link mechanism 5 to operate, the constituent members of the link mechanism 5 turn about the axes that extend in the front-and-rear direction. Because of this, although the constituent members of the link mechanism 5 are displaced largely in the up-and-down direction of the body frame 21 when the link mechanism 5 is activated to operate, the constituent members are not displaced largely in the left-and-right direction. Then, in the event that the leaning associated deforming portions S are caused to deform along the plane that is perpendicular or substantially perpendicular to the left-and-right direction of the body frame 21, the leaning associated deforming portions S change their postures a little in the left-and-right direction, so that it becomes easy to prevent the interference of the link mechanism 5 with the leaning associated deforming portions S further. Namely, although the leaning associated deforming portions S are provided, the expansion of the space provided to permit the operation of the link mechanism 5 is prevented further.

Additionally, the outer surface covering portion 22A may be provided at least directly on the right or directly on the left of the outer peripheral surface of the link mechanism 5 excluding the upper surface and the lower surface thereof.

As has been described above, when the body frame 21 leans to activate the link mechanism 5 to operate, the constituent members of the link mechanism 5 turn about the axes that extend in the front-and-rear direction of the body frame 21. Because of this, the link mechanism 5 is not displaced largely in the left-and-right direction even though the link mechanism 5 operates. Then, in the event that the outer surface covering portion 22A is provided at least directly on the right side of or directly on the left side of the outer surface of the link mechanism 5 and at least portions of the leaning associated deforming portions S are positioned between the outer surface covering portion 22A and at least either of the right side surface and the left side surface of the link mechanism 5, the leaning associated deforming portions S are provided in the location closer to the link mechanism 5 while preventing interference of the link mechanism 5 with the leaning associated deforming portions S. Because of this, even though the leaning associated deforming portions S are provided, the enlargement in size of the vehicle 1 is prevented further.

The preferred embodiments that have been described heretofore are intended to facilitate the understanding of the present invention and is not intended to limit the present invention. The preferred embodiments of the present invention can be modified or improved without departing from the spirit and scope thereof and that their equivalents can also be included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

For example, in the preferred embodiments described above, while the brake hoses are preferably prevented from moving by using the first restrictors 81 to the fifth restrictors 85 and the branch block 71, members that prevent the movement thereof and positions where the members are disposed are arbitrary.

In addition, in the preferred embodiments of the present invention, while the brake hose that transmits the brake fluid from the master cylinder 12 to the brake calipers is preferably an example of the brake controlling operation transmission member, the present invention is not limited thereto. For example, the brake controlling operation transmission member may be an electric wire that transmits a control signal that signals an activation of the brake device that applies a braking force to the front wheels 3 from the brake controller 10 to the brake device. Alternatively, the brake controlling operation transmission member may be a metallic tube of which a brake fluid is filled in an interior, or a metallic cable that connects the master cylinder 12 to the brake calipers. In addition, as the brake controlling operation transmission member, the brake hose may be combined with one or more of the electric wire, the metallic tube, the metallic cable and the like to connect the master cylinder 12 to the brake calipers.

Additionally, in the preferred embodiments and modified examples, while a portion of the brake controlling operation transmission member is described as preferably being laid out to pass directly behind or directly ahead of the link mechanism 5, the present invention is not limited thereto. The portion of the brake controlling operation transmission member may be laid out to pass directly on the right of the link mechanism 5 and/or directly on the left of the link mechanism 5.

In addition, in the preferred embodiments of the present invention, while the brake hose that transmits the brake fluid from the master cylinder 12 to the brake calipers is preferably an example of the brake controlling operation transmission member, the present invention is not limited thereto. For example, the brake controlling operation transmission member may be an electric wire that transmits a control signal that signals an activation of the brake device that applies a braking force to the front wheels 3 from the brake controller 10 to the brake device. Alternatively, the brake controlling operation transmission member may be a metallic tube of which a brake fluid is filled in an interior, or a metallic cable that connects the master cylinder 12 to the brake calipers. In addition, as the brake controlling operation transmission member, the brake hose may be combined with one or more of the electric wire, the metallic tube, the metallic cable and the like to connect the master cylinder 12 to the brake calipers.

Additionally, in the preferred embodiments described above, while the left brake caliper 41 and the right brake caliper 42 are preferably controlled by the master cylinder 12 that is provided at the right portion of the handlebar 23, the present invention is not limited thereto. A configuration in which either of the left brake caliper 41 and the right brake caliper 42 is controlled by, for example, the master cylinder 12 that is provided at the right portion of the handlebar 23 and that is positioned above the link mechanism, while the other of the left brake caliper 41 and the right brake caliper 42 is controlled by a foot brake that is not positioned above the link mechanism, may be used.

In the preferred embodiments of the present invention, the acute angles are angles that include 0° and that are smaller than 90°. Originally, the acute angles do not include 0°, but in the preferred embodiments of the present invention, it is understood that the acute angles include 0°. In the preferred embodiments of the present invention, the imaginary plane that intersects perpendicular or substantially perpendicularly the upper axes and the lower axes of the cross members is a plane that extends rearwards and upwards. However, the present invention is not limited thereto, and hence, the imaginary plane that intersects perpendicular or substantially perpendicularly the upper axes and the lower axes of the cross members may be a plane that extends forwards and upwards.

When referred to in this description, "parallel" also includes two straight lines that do not intersect each other as members while they are inclined within the range of ±40°. When used together with a "direction" and a "member" in the description of preferred embodiments of the present invention, "along" also includes a case where what follows the direction and the member is inclined relative thereto within the range of ±40°. When used together with a "direction" in this description, "extend" also includes a case where what extends is inclined relative to the direction within the range of ±40°.

The vehicle 1 according to various preferred embodiments of the present invention is the vehicle 1 including the body frame which leans and the two front wheels. The number of rear wheels may be one or more. The vehicle may include a body cover that covers the body frame. The vehicle may not include the body cover which covers the body frame. The power unit includes the power source. The power source is not limited to the engine and hence may be an electric motor.

In a preferred embodiment described above, the center in the left-and-right direction of the body frame 21 of the rear wheel 4 coincides with the center in the left-and-right direction of the body frame 21 of the distance defined between the left front wheel 31 and the right front wheel 32. Although the configuration described above is preferable, the center in the left-and-right direction of the body frame 21 of the rear wheel 4 does not have to coincide with the center in the left-and-right direction of the body frame 21 of the distance defined between the left front wheel 31 and the right front wheel 32.

In a preferred embodiment described above, the right side portion 54, the left side portion 53, and the headstock 211 (the link support portion) are preferably in positions that overlap when the vehicle 1 is seen from the side thereof. However, when the vehicle 1 is seen from the side thereof, the headstock 211 may be provided in a different position from the positions where the right side portion 54 and the left side portion 53 are provided in relation to the front-and-rear direction. Additionally, angles at which the right side portion 54 and the left side portion 53 lean from the up-and-down direction of the body frame 21 may differ from an angle at which the headstock 211 leans.

The link support portion (the headstock) may include a single structural element or a plurality of structural elements. In the case of the headstock including a plurality of structural elements, the structural elements may be joined together through welding, bonding or the like. Alternatively, the structural elements may be joined together with fastening members such as bolts, rivets or the like.

In a preferred embodiment described above, while the headstock 211 is preferably a structural element of the body frame 21 that supports the steering shaft 60 so as to turn, the present invention is not limited thereto. A member may be used which supports the steering shaft 60 so as to turn about a middle steering axis Y3 in place of the headstock. For example, a member may be used which includes a bearing which supports the steering shaft 60 so as to turn about the middle steering axis Y3.

In various preferred embodiments of the present invention, the body frame includes the link support portion, the connecting member (the upper front-and-rear frame portion), the down frame (the up-and-down frame portion), and the under frame (the lower front-and-rear frame portion), and these frame elements are preferably connected together through welding. However, the body frame of the present invention is not limited to the preferred embodiments described above. The body frame should have the link support portion, the upper front and rear frame portions, the upper and lower frame portions and the lower front and rear frame portions. For example, the body frame may be entirely integral or partially integral through casting. Additionally, in the body frame, the upper front and rear frame portions and the upper and lower frame portions may include a single member or separate members.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In a preferred embodiment described above, an acute angle defined by the turning axis of the steering shaft and the up-and-down direction of the body frame coincides with an acute angle defined by the direction in which the right shock absorber and the left shock absorber extend or contract and the up-and-down direction of the body frame. However, the present invention is not limited to the preferred embodiments described above. For example, the acute angle defined by the turning axis of the steering shaft and the up-and-down direction of the body frame may be smaller or greater than the acute angle defined by the direction in which the right shock absorber and the left shock absorber extend and contract and the up-and-down direction of the body frame.

In addition, in the preferred embodiments of the present invention, the turning axis of the steering shaft and the direction in which the right shock absorber and the left shock absorber preferably extend and contact coincide with each other. However, the present invention is not limited to the preferred embodiments described above. In a side view of the vehicle being in the upright state, the turning axis of the steering shaft and the direction in which the right shock absorber and the left shock absorber extend or contact may be spaced apart from each other in the front-and-rear direction. Additionally, for example, the turning axis of the steering shaft and the direction in which the right shock absorber and the left shock absorber extend or contact may intersect each other.

In a preferred embodiment described above, the right front wheel and the left front wheel are preferably supported so that their upper ends are able to move farther upwards in the up-and-down direction of the body frame than an upper end of the down frame of the body frame. However, the present invention is not limited to the preferred embodiments. In the present invention, the right front wheel and the left front wheel may be able to move upwards as high as or to a height that is lower than the upper end of the down frame of the body frame in the up-and-down direction of the body frame.

The upper cross portion may include an upper front cross portion that includes a single portion, an upper rear cross portion that includes a single portion, and a connecting member that is provided between the upper and lower cross portions and that includes a plurality of portions. In the case of the headstock includes a plurality of portions, the portions may be joined together through welding, bonding or the like. Alternatively, the portions may be joined together with fastening members such as bolts, rivets or the like.

The lower cross portion may include a lower front cross portion that includes a single portion, a lower rear cross portion that includes a single portion and a connecting member that is provided between the lower front and rear cross portions and that includes a plurality of portions. In the case of the headstock includes a plurality of portions, the portions may be joined together through welding, bonding or the like. Alternatively, the portions may be joined together with fastening members such as bolts, rivets or the like.

The right side portion and the left side portion may each include a single a portion or a plurality of portions. In the case of the headstock includes a plurality of portions, the portions may be joined together through welding, bonding or the like. Alternatively, the portions may be joined together with fastening members such as bolts, rivets or the like. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In various preferred embodiments of the present invention, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that lies above a cross portion that lies therebelow. The lower cross portion does not imply a lowermost cross portion in the link mechanism. The lower cross portion means a cross portion that lies below a cross portion that is located thereabove. Additionally, the cross portion may include two portions of a right cross portion and a left cross portion. In this way, the upper cross portion and the lower cross portion may each include a plurality of cross portions as long as they still exhibit the link function. Further, other cross portions may be provided between the upper cross portion and the lower cross portion. The link mechanism should include the upper cross portion and the lower cross portion.

The present invention is embodied in many different forms. This disclosure should be understood to describe preferred embodiments of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention also includes every preferred embodiment that includes equivalent elements, modifications, deletions, combinations (for example, a combination of characteristics of various preferred embodiments), improvements and/or alternations that those skilled in the art to which the present invention pertains can recognize based on the disclosure herein. The limitative matters of claims should be construed broadly based on terms used in the claims and hence should not be limited by the preferred embodiments described in this description or the prosecution of this patent application. The preferred embodiments should be construed to be non-exclusive. For example, in this disclosure, such terms as "preferable" and "good" are non-exclusive terms and mean that "it is preferable but does not limit the present invention thereto" and "it is good but does not limit the present invention thereto," respectively.

The contents of the Japanese Patent Application No. 2013-138481 filed on Jul. 1, 2013 are incorporated herein by reference in their entirety and constitutes a portion of the description of this patent application. Namely, configurations which will be itemized below also constitute a portion of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to the right of the vehicle when the vehicle turns right and that leans to the left of the vehicle when the vehicle turns left;
a right front wheel and a left front wheel that are aligned in a left-and-right direction of the body frame;
a right suspension device that supports the right front wheel at a lower portion thereof and that absorbs an upward displacement of the right front wheel in an up-and-down direction of the body frame;
a left suspension device that supports the left front wheel at a lower portion thereof and that absorbs an upward displacement of the left front wheel in the up-and-down direction of the body frame;
a link mechanism which includes:
right side portion that supports an upper portion of the right suspension device so as to turn about a right steering axis that extends in the up-and-down direction of the body frame;
a left side portion that supports an upper portion of the left suspension device so as to turn about a left steering axis that is parallel to the right steering axis;
upper cross portion that supports an upper portion of the right side portion at a right end portion thereof so as to turn about an upper right axis that extends in a front-and-rear direction of the body frame and supports an upper portion of the left side portion at a left end portion thereof so as to turn about an upper left axis that is parallel or substantially parallel to the upper right axis and that is supported on the body frame at a middle portion thereof so as to turn about an upper middle axis that is parallel or substantially parallel to the upper right axis and the upper left axis; and a lower cross portion that supports a lower portion of the right side portion at a right end portion so as to turn about a lower right axis that is parallel or substantially parallel to the upper right axis and supports a lower portion of the left side portion at a left end portion thereof so as to turn about a lower left axis that is parallel or substantially parallel the upper left axis and that is supported on the body frame at a middle portion thereof so as to turn about a lower middle axis that is parallel to the upper middle axis;

a body cover that is provided at least directly ahead of, directly behind, directly on the left of, or directly on the right of an outer peripheral surface of the link mechanism excluding an upper surface and a lower surface thereof;

a brake device that is provided directly below the link mechanism to apply a braking force to, at least, one of the right front wheel and the left front wheel;

a brake controller that is provided directly above the link mechanism to control the brake device; and a brake controlling operation transmission member that connects the brake controller with the brake device to transmit a brake controlling operation that is inputted into the brake controller to the brake device; wherein the body cover includes an outer surface covering portion that covers at least a portion of the outer peripheral surface of the link mechanism excluding the upper surface and the lower surface thereof; and when the vehicle is in the upright state, at least a portion of a leaning associated deforming portion of the brake controlling operation transmission member that deforms in association with the leaning of the body frame is positioned between the outer peripheral surface of the link mechanism, excluding the upper surface and the lower surface thereof, and the outer surface covering portion.

2. The vehicle according to claim 1, wherein the leaning associated deforming portion deforms at least along a plane that is perpendicular or substantially perpendicular to the front-and-rear direction of the body frame in response to the leaning of the body frame.

3. The vehicle according to claim 2, wherein the outer surface covering portion is provided directly ahead of or directly behind the outer peripheral surface of the link mechanism excluding the upper surface and the lower surface thereof.

4. The vehicle according to claim 3, wherein at least a portion of the leaning associated deforming portion is positioned between the right side portion and the left side portion when viewed from the direction of the upper middle axis.

5. The vehicle according to claim 1, wherein the leaning associated deforming portion deforms at least along a plane that is perpendicular or substantially perpendicular to the left-and-right direction of the body frame in response to the leaning of the body frame.

6. The vehicle according to claim 5, wherein the outer surface covering portion is at least directly on the right or directly on the left of the outer peripheral surface of the link mechanism excluding the upper surface and the lower surface thereof.

7. The vehicle according to claim 1, further comprising:

a steering shaft that is supported on the body frame between the right suspension device and the left suspension device in the left-and-right direction of the body frame so as to turn about a middle steering axis that extends in the up-and-down direction of the body frame;

a handlebar that is provided at an upper end portion of the steering shaft; and a wheel turning operation transmission mechanism that turns the right suspension device about the right steering axis and turns the left suspension device about the left steering axis in association with the turning of the steering shaft that is activated in response to the operation of the handlebar; wherein the right front wheel and the left front wheel are turned by the wheel turning operation transmission mechanism; and the brake controlling operation transmission member includes a wheel turning associated deforming portion that deforms in response to the turning of the right front wheel and the left front wheel, at least a portion of which is disposed below the lower cross portion.

8. The vehicle according to claim 7, wherein a first restrictor that prevents movement of the brake controlling operation transmission member is provided at a portion of the wheel turning operation transmission mechanism that moves to maintain a parallel relationship with the lower cross portion when the body frame leans.

9. The vehicle according to claim 8, wherein at least a portion of the leaning associated deforming portion is positioned between the brake controller and the first restrictor, and at least a portion of the wheel turning associated deforming portion is positioned between the first restrictor and the brake device.

10. The vehicle according to claim 8, wherein a second restrictor that prevents movement of the brake controlling operation transmission member is provided on the upper cross portion or the lower cross portion, and at least a portion of the leaning associated deforming portion is positioned between the second restrictor and the first restrictor.

11. The vehicle according to claim 1, wherein a third restrictor that prevents movement of the brake controlling operation transmission member is provided on the body frame.

12. The vehicle according to claim 1, further comprising:

a steering shaft that is supported on the body frame between the right suspension device and the left suspension device in the left-and-right direction of the body frame and that turns about a middle steering axis that extends in the up-and-down direction of the body frame; and a fourth restrictor that prevents movement of the brake controlling operation transmission member is provided on the steering shaft or a member that moves together with the steering shaft.

* * * * *